US008207963B2

(12) United States Patent
Cotter et al.

(10) Patent No.: US 8,207,963 B2
(45) Date of Patent: Jun. 26, 2012

(54) SYSTEM AND METHOD FOR PERFORMING MOTION CAPTURE AND IMAGE RECONSTRUCTION

(75) Inventors: Tim S. Cotter, Sunnyvale, CA (US);
Stephen G. Perlman, Palo Alto, CA (US)

(73) Assignee: Onlive, Inc., Palo Alto, CA (US)

( * ) Notice: Subject to any disclaimer, the term of this patent is extended or adjusted under 35 U.S.C. 154(b) by 1146 days.

(21) Appl. No.: 11/888,377

(22) Filed: Jul. 31, 2007

(65) Prior Publication Data
US 2009/0174701 A1 Jul. 9, 2009

Related U.S. Application Data

(60) Provisional application No. 60/834,771, filed on Jul. 31, 2006.

(51) Int. Cl.
G06T 15/00 (2011.01)
G06T 17/00 (2006.01)

(52) U.S. Cl. ............................ 345/419; 345/420

(58) Field of Classification Search .................. None
See application file for complete search history.

(56) References Cited

U.S. PATENT DOCUMENTS

| 5,689,577 | A | * | 11/1997 | Arata | 382/128 |
| 5,969,822 | A | * | 10/1999 | Fright et al. | 356/608 |
| 6,072,496 | A | * | 6/2000 | Guenter et al. | 345/419 |
| 7,324,110 | B2 | * | 1/2008 | Edwards et al. | 345/473 |

(Continued)

FOREIGN PATENT DOCUMENTS

| EP | 2002/0130867 | 9/2009 |
| WO | WO 2006/011153 | 2/2006 |
| WO | WO 2006011153 A2 * | 2/2006 |

OTHER PUBLICATIONS

Brian Curless, Marc Levoy, "A Volumetric Method for Building Complex Models from Range Images," 1996, Proceedings of the 23rd Annual Conference on Computer Graphics and Interactive Techniques, pp. 303-312.*

(Continued)

Primary Examiner — Daniel Hajnik
(74) Attorney, Agent, or Firm — Blakely Sokoloff Taylor & Zafman LLP

(57) ABSTRACT

A system and method are described for performing motion capture on a subject. For example, a computer-implemented method according to one embodiment of the invention comprise: creating a scalar field for the three-dimensional (3-D) capture volume of the subject; generating a surface mesh for the scalar field; retaining good vertices and removing bad vertices of the surface mesh; and storing the good vertices for use in subsequent reconstruction of the motion of the subject. Another computer-implemented method comprises: capturing a series of image frames of the subject over a period of time each frame each frame having a plurality of vertices defining a captured surface of the subject; establishing a reference frame having one or more of the plurality of vertices; performing frame-to-frame tracking to identify vertices within the N'th frame based on the (N−1)'th frame or an earlier frame; and performing reference-to-frame tracking to identify vertices within the N'th frame based on the reference frame to counter potential drift between the frames. Yet another computer-implemented method comprises: capturing motion capture data including a plurality of images of the N vertices during a motion capture session; retrospectively identifying X of the N vertices to track across the plurality of images where X<N; and tracking the X vertices across the plurality of images.

26 Claims, 33 Drawing Sheets
(6 of 33 Drawing Sheet(s) Filed in Color)

U.S. PATENT DOCUMENTS

| | | | |
|---|---|---|---|
| 7,356,164 B2* | 4/2008 | Aliaga et al. | 382/103 |
| 7,720,259 B2* | 5/2010 | Gordon et al. | 382/103 |
| 2004/0104935 A1* | 6/2004 | Williamson et al. | 345/757 |
| 2004/0119716 A1* | 6/2004 | Park et al. | 345/473 |
| 2006/0077258 A1 | 4/2006 | Allen et al. | |
| 2006/0127836 A1* | 6/2006 | Wen | 433/24 |
| 2006/0203096 A1 | 9/2006 | LaSalle et al. | |
| 2007/0091085 A1* | 4/2007 | Wang et al. | 345/420 |

OTHER PUBLICATIONS

Brett Allen, Brian Curless, Zoran Popovic, "Articulated Body Deformation from Range Scan Data," Jul. 2002, ACM Transactions on Graphics (TOG), vol. 21, No. 3, pp. 612-619.*

Guodong Liu, Jingdan Zhang, Wei Wang, and Leonard McMillan. 2006. Human motion estimation from a reduced marker set. In Proceedings of the 2006 symposium on Interactive 3D graphics and games (I3D '06). Mar. 14-17, 2006. ACM, New York, NY, USA, 35-42. DOI=10.1145/1111411.1111418 http://doi.acm.org/10.1145/1111411.1111418.*

Sundaresan, A., Chellappa, R.: Multi-camera tracking of articulated human motion using motion and shape cues. In: Narayanan, P.J., Nayar, S.K., Shum, H-Y. (eds.) ACCV 2006. LNCS, vol. 3852, pp. 131-140. Springer, Heidelberg (Jan. 13-16, 2006).*

Hasenfratz, Jean-Marc., Lapierre, M., Gascuel, Jean-Dominique., and Boyer, E. 2003. Real-Time Capture, Reconstruction and Insertion into Virtual World of Human Actors. In Vision, Video and Graphics, Elsevier, Eurographics.*

Patent Cooperation Treaty, PCT/US2007/017188, "Notification Concerning Transmittal of International Preliminary Report on Patentability and Written Opinion of the International Searching Authority", mailed Feb. 12, 2009, 9 pages.

"Extended European Search Report", *European Patent Office— Munich Germany*, mailed Jun. 18, 2010, pp. 1-12.

Anguelov, Dragomir, et al., "SCAPE; Shape Completion and Animation of People", *ACM Transactions on Graphics*, [Online] vol. 24, No. 3, New York, NY, http://doi.acm.org/10.1145/1073204.1073207, *section 3, paragraph 2: p. 410* *section 3 paragraph 3; p. 410*, (Jul. 1, 2005), 408-416.

Muller, H., et al., "Visualization of Implicit Surfaces Using Adaptive Tethrahedrizations", *Scientific Visualization Conference*, Dagstuhl, Germany Jun. 9-13, 1997, Piscataway, NJ, IEEE, Jun. 9, 1997 IEEE., (Jun. 9, 1997), 243-2433.

Simmons, K. P., "Body Measurement Techniques: A Comparison of Three-Dimensional Body Scanning and Physical Anthropometric Methods", URL:http://www.tx.ncsu.edu/3dbodyscan/pdf_docs/microsoft%20word%20alpaper2.pdf>, (Jan. 12, 2010), p. 11; Table 3.

Wheeler, M. D., "Automatic Modeling and Localization for Object Recognition", URL:http://citeseerx.ist.psu.edu/viewdoc/download-?doi=10.1.1.71.3802&rep=rep1&type=pdf>, (Oct. 25, 1996), p. 27, paragraph 2.

Allen, Bret, et al., "Articulated Body Deformation from Range Scan Data", *ACM Transactions on Graphics (TOG)*, vol. 21, No. 3, (Jul. 2002), 612-619.

Curless, Brian, et al., "A Volumetric Method for Building Complex Models from Range Images", *Proceedings of the 23rd Annual Conference on Computer Graphics and Interactive Techniques*, (1996), 1-10.

PCT Search Report mailed Jul. 11, 2008, 4 Pages.

Written Opinion mailed Jul. 11, 2008, 7 Pages.

Co-pending application No. P364XPCT, application No. PCT/US10/37318, "*Notification Concerning Transmittal of International Preliminary Report on Patentability and Written Opinion of the International Searching Authority*", mailed Aug. 17, 2010, 8 pages.

Curless, B., et al., "A Volumetric Method for Building Complex Models From Range Images", *Computer Graphics Proceedings (SIGGRAPH)*, New Orleans, Aug. 4-9, 1996, [Computer Graphics Proceedings SIGGRAPH], New York, NY ACM, US,, (Aug. 4, 1996), 303-312.

Co-pending New Zealand Patent Application No. 574599, First examination report issued Jul. 8, 2010, 2 pages.

European Patent Application No. 07836403.1, Office Action mailed Jun. 1, 2011, 4 pages.

* cited by examiner

Lit Image 401
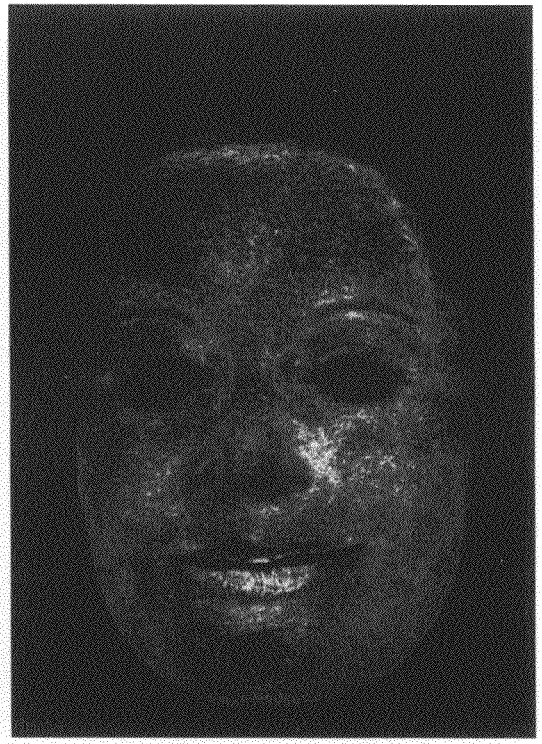
Dark Image 402
Textured 3D Surface 404
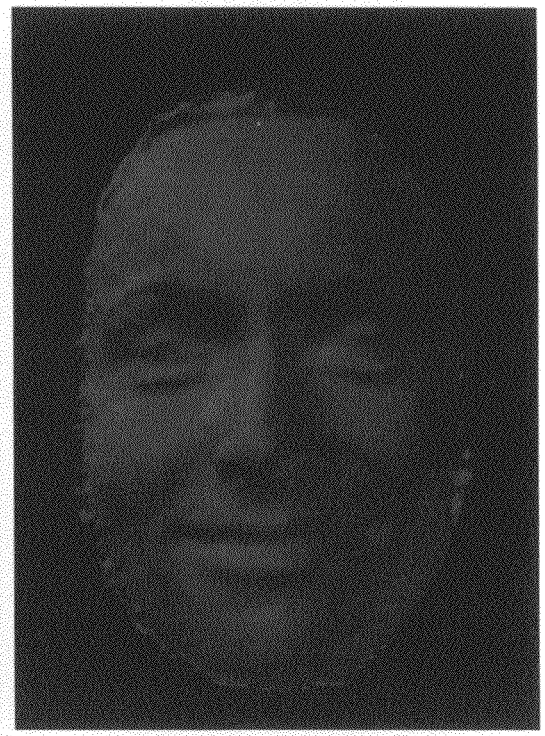
3D Surface 403
*Fig. 4*

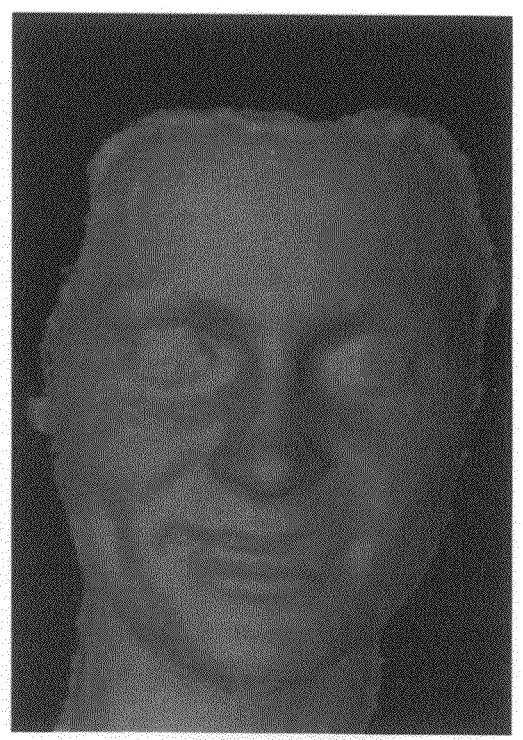
Lit Image 501    Dark Image 502    Textured 3D Surface 504    3D Surface 503
Fig. 5

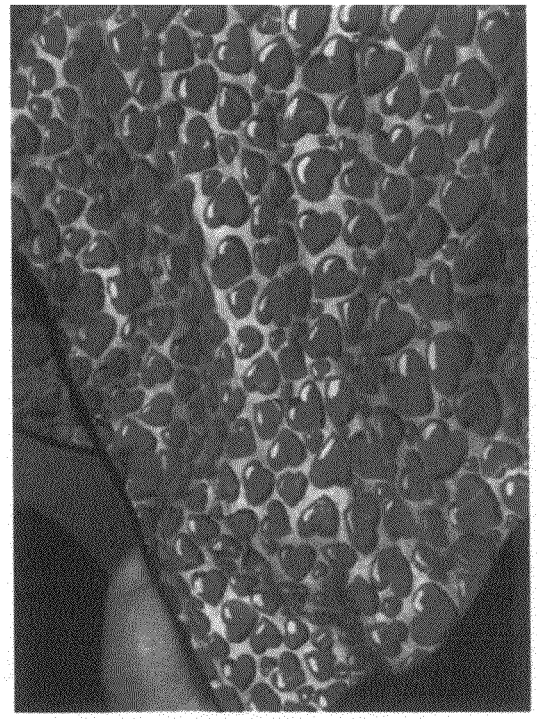
Lit Image 601
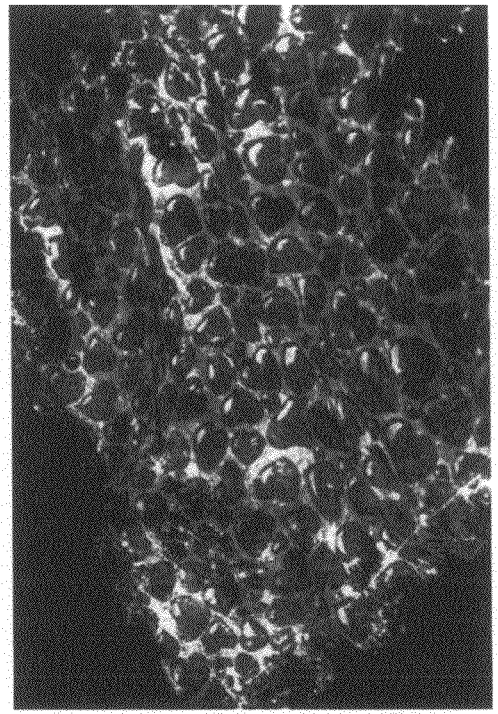
Dark Image 602
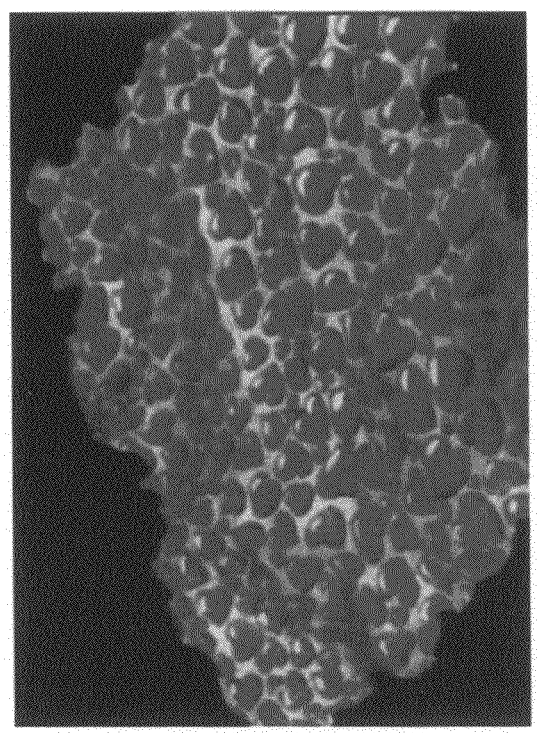
Textured 3D Surface 604
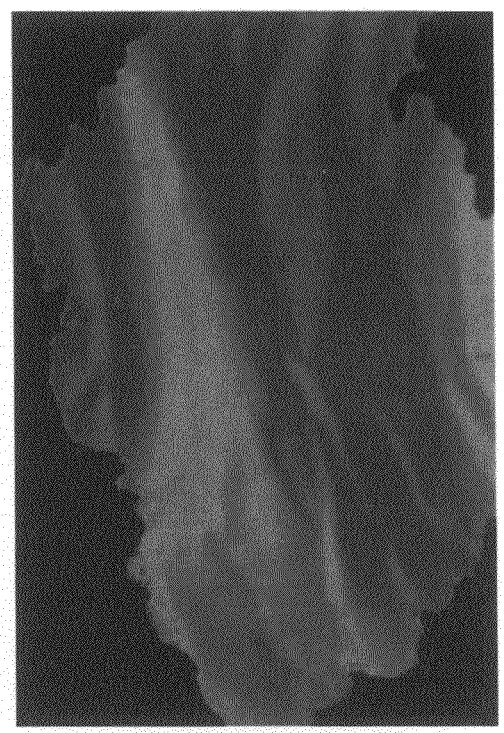
3D Surface 603
*Fig. 6*

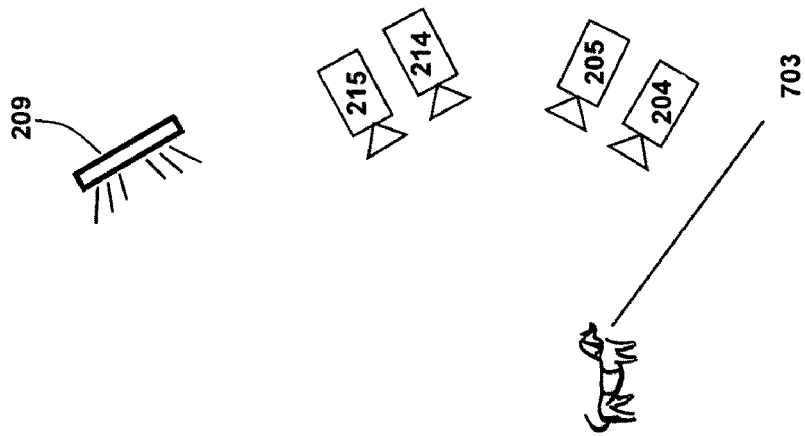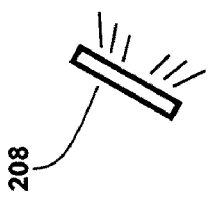
*Fig. 7e*

SYSTEM AND METHOD FOR PERFORMING MOTION CAPTURE AND IMAGE RECONSTRUCTION

PRIORITY CLAIM

This application claims the benefit of U.S. Provisional Application No. 60/834,771 entitled, "System and Method For Performing Motion", filed on Jul. 31, 2006.

The patent or application file contains at least one drawing executed in color. Copies of this patent or patent publication with color drawing(s) will be provided by the U.S. Patent and Trademark Office upon request and payment of the necessary fee.

BACKGROUND OF THE INVENTION

1. Field of the Invention

This invention relates generally to the field of motion capture. More particularly, the invention relates to an improved apparatus and method for performing motion capture and image reconstruction.

2. Description of the Related Art

"Motion capture" refers generally to the tracking and recording of human and animal motion. Motion capture systems are used for a variety of applications including, for example, video games and computer-generated movies. In a typical motion capture session, the motion of a "performer" is captured and translated to a computer-generated character.

As illustrated in FIG. 1 in a motion capture system, a plurality of motion tracking "markers" (e.g., markers 101, 102) are attached at various points on a performer's 100's body. The points are selected based on the known limitations of the human skeleton. Different types of motion capture markers are used for different motion capture systems. For example, in a "magnetic" motion capture system, the motion markers attached to the performer are active coils which generate measurable disruptions x, y, z and yaw, pitch, roll in a magnetic field.

By contrast, in an optical motion capture system, such as that illustrated in FIG. 1, the markers 101, 102 are passive spheres comprised of retro-reflective material, i.e., a material which reflects light back in the direction from which it came, ideally over a wide range of angles of incidence. A plurality of cameras 120, 121, 122, each with a ring of LEDs 130, 131, 132 around its lens, are positioned to capture the LED light reflected back from the retro-reflective markers 101, 102 and other markers on the performer. Ideally, the retro-reflected LED light is much brighter than any other light source in the room. Typically, a thresholding function is applied by the cameras 120, 121, 122 to reject all light below a specified level of brightness which, ideally, isolates the light reflected off of the reflective markers from any other light in the room and the cameras 120, 121, 122 only capture the light from the markers 101, 102 and other markers on the performer.

A motion tracking unit 150 coupled to the cameras is programmed with the relative position of each of the markers 101, 102 and/or the known limitations of the performer's body. Using this information and the visual data provided from the cameras 120-122, the motion tracking unit 150 generates artificial motion data representing the movement of the performer during the motion capture session.

A graphics processing unit 152 renders an animated representation of the performer on a computer display 160 (or similar display device) using the motion data. For example, the graphics processing unit 152 may apply the captured motion of the performer to different animated characters and/or to include the animated characters in different computer-generated scenes. In one implementation, the motion tracking unit 150 and the graphics processing unit 152 are programmable cards coupled to the bus of a computer (e.g., such as the PCI and AGP buses found in many personal computers). One well known company which produces motion capture systems is Motion Analysis Corporation (see, e.g., www.motionanalysis.com).

SUMMARY

A system and method are described for performing motion capture on a subject using fluorescent lamps. For example, a system according to one embodiment of the invention comprises: a synchronization signal generator to generate one or more synchronization signals; one or more fluorescent lamps configured to strobe on and off responsive to a first one of the one or more synchronization signals, the fluorescent lamps charging phosphorescent makeup, paint or dye applied to a subject for a motion capture session; and a plurality of cameras having shutters strobed synchronously with the strobing of the light source to capture images of the phosphorescent paint, wherein the shutters are open when the light source is off and the shutters are closed when the light source is on.

BRIEF DESCRIPTION OF THE DRAWINGS

A better understanding of the present invention can be obtained from the following detailed description in conjunction with the drawings, in which:

The patent or application file contains at least one drawing executed in color. Copies of this patent or patent publication with color drawing(s) will be provided by the U.S. Patent and Trademark Office upon request and payment of the necessary fee.

FIG. 4 is images of heavily-applied phosphorescent makeup on a model during lit and dark time intervals, as well as the resulting reconstructed 3D surface and textured 3D surface.

FIG. 5 is images of phosphorescent makeup mixed with base makeup on a model both during lit and dark time intervals, as well as the resulting reconstructed 3D surface and textured 3D surface.

FIG. 6 is images of phosphorescent makeup applied to cloth during lit and dark time intervals, as well as the resulting reconstructed 3D surface and textured 3D surface.

FIG. 7e illustrates one embodiment of the invention where a stop-motion character is captured separately from the set and other characters.

DETAILED DESCRIPTION OF PREFERRED EMBODIMENTS

Figure 1:
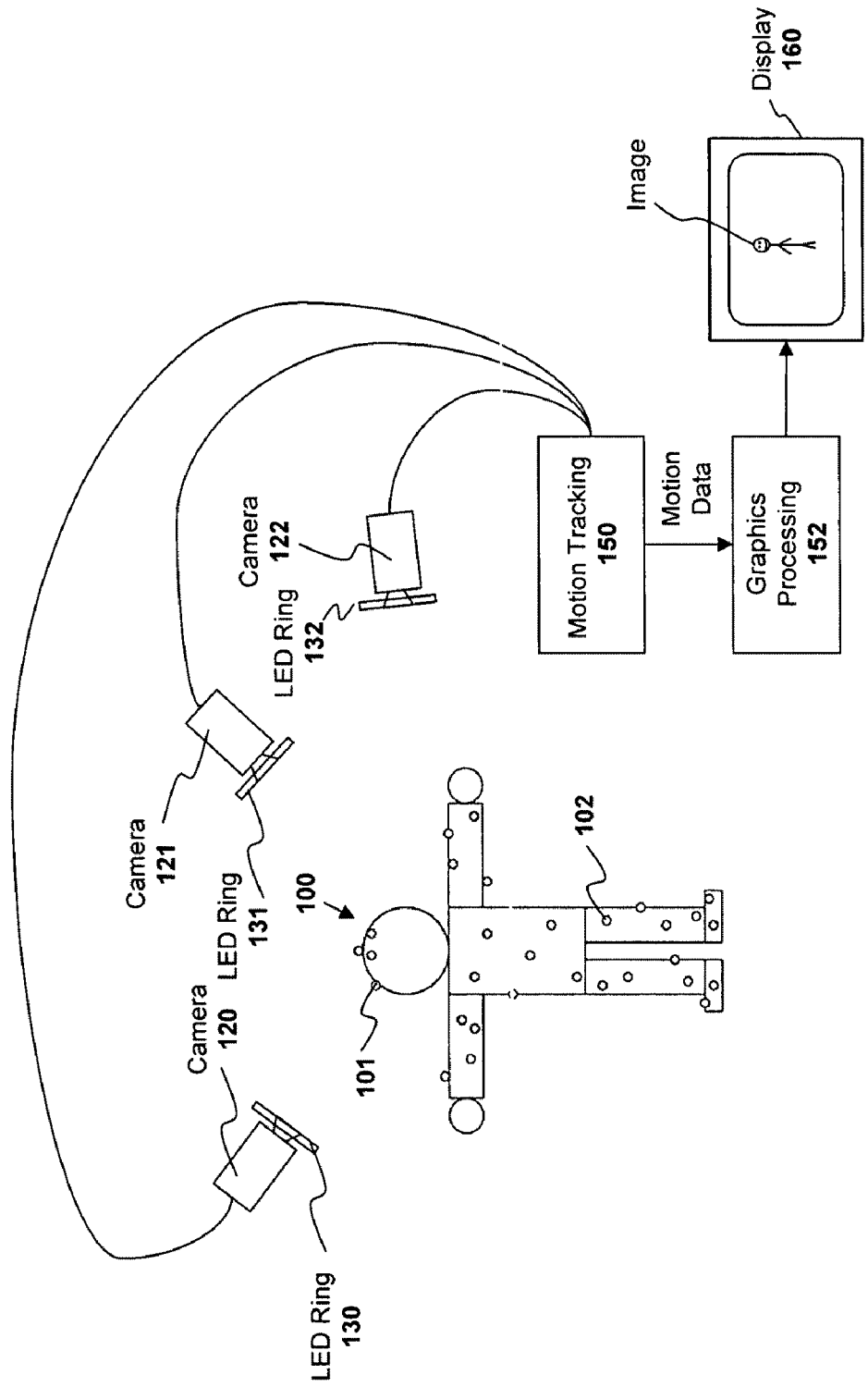
FIG. 1 illustrates a prior art motion tracking system for tracking the motion of a performer using retro-reflective markers and cameras.

Described below is an improved apparatus and method for performing motion capture using shutter synchronization and/or phosphorescent makeup, paint or dye. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

The assignee of the present application previously developed a system for performing color-coded motion capture and a system for performing motion capture using a series of reflective curves painted on a performer's face. These systems are described in the co-pending applications entitled "APPARATUS AND METHOD FOR CAPTURING THE MOTION AND/OR EXPRESSION OF A PERFORMER," Ser. Nos. 10/942,609, and 10/942,413, filed Sep. 15, 2004. These applications are assigned to the assignee of the present application and are incorporated herein by reference.

The assignee of the present application also previously developed a system for performing motion capture of random patterns applied to surfaces. This system is described in the co-pending applications entitled "APPARATUS AND METHOD FOR PERFORMING MOTION CAPTURE USING A RANDOM PATTERN ON CAPTURE SURFACES," Ser. No. 11/255,854, Filed Oct. 20, 2005. This application is assigned to the assignee of the present application and is incorporated herein by reference.

The assignee of the present application also previously developed a system for performing motion capture using shutter synchronization and phosphorescent paint. This system is described in the co-pending application entitled "APPARATUS AND METHOD FOR PERFORMING MOTION CAPTURE USING SHUTTER SYNCHRONIZATION," Ser. No. 11/077,628, Filed Mar. 10, 2005 (hereinafter "Shutter Synchronization" application). Briefly, in the Shutter Synchronization application, the efficiency of the motion capture system is improved by using phosphorescent paint or makeup and by precisely controlling synchronization between the motion capture cameras' shutters and the illumination of the painted curves. This application is assigned to the assignee of the present application and is incorporated herein by reference.

System Overview

As described in these co-pending applications, by analyzing curves or random patterns applied as makeup on a performer's face rather than discrete marked points or markers on a performer's face, the motion capture system is able to generate significantly more surface data than traditional marked point or marker-based tracking systems. The random patterns or curves are painted on the face of the performer using retro-reflective, non-toxic paint or theatrical makeup. In one embodiment of the invention, non-toxic phosphorescent makeup is used to create the random patterns or curves. By utilizing phosphorescent paint or makeup combined with synchronized lights and camera shutters, the motion capture system is able to better separate the patterns applied to the performer's face from the normally-illuminated image of the face or other artifacts of normal illumination such as highlights and shadows.

Figure 2A:
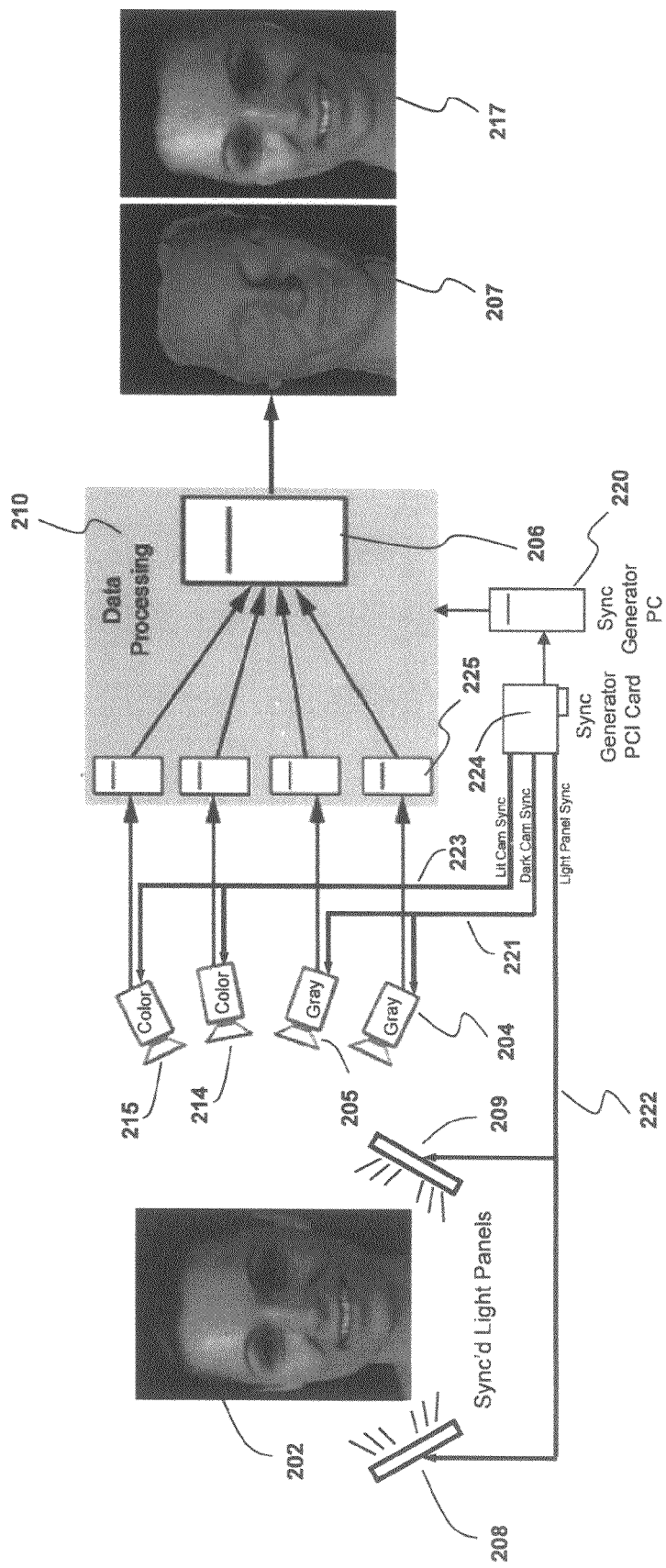
FIG. 2a illustrates one embodiment of the invention during a time interval when the light panels are lit.
Figure 2B:
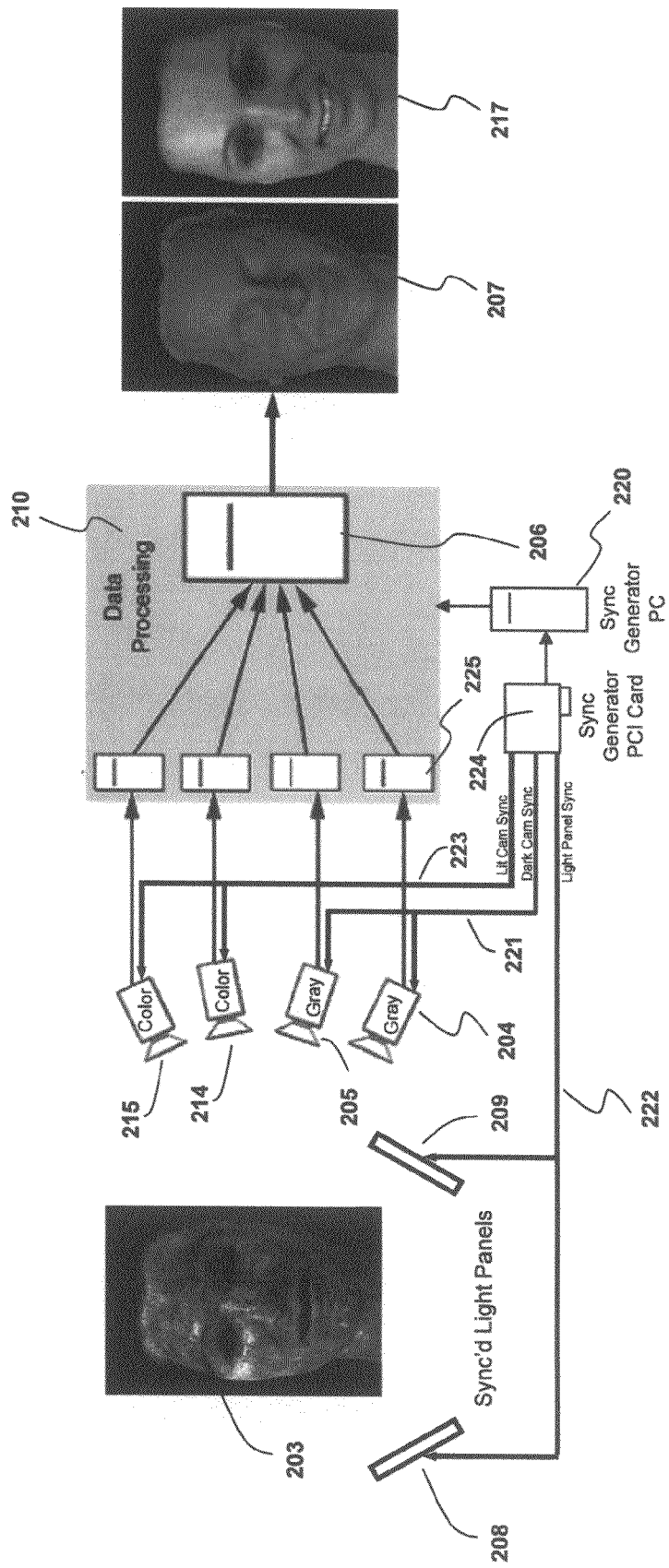
FIG. 2b illustrates one embodiment of the invention during a time interval when the light panels are dark.

FIGS. 2a and 2b illustrate an exemplary motion capture system described in the co-pending applications in which a random pattern of phosphorescent makeup is applied to a performer's face and motion capture is system is operated in a light-sealed space. When the synchronized light panels 208-209 are on as illustrated FIG. 2a, the performers' face looks as it does in image 202 (i.e. the phosphorescent makeup is only slightly visible). When the synchronized light panels 208-209 (e.g. LED arrays) are off as illustrated in FIG. 2b, the performers' face looks as it does in image 203 (i.e. only the glow of the phosphorescent makeup is visible).

Grayscale dark cameras 204-205 are synchronized to the light panels 208-209 using the synchronization signal generator PCI Card 224 (an exemplary PCI card is a PCI-6601 manufactured by National Instruments of Austin, Tex.) coupled to the PCI bus of synchronization signal generator PC 220 that is coupled to the data processing system 210 and so that all of the systems are synchronized together. Light Panel Sync signal 222 provides a TTL-level signal to the light panels 208-209 such that when the signal 222 is high (i.e. $\geq$2.0V), the light panels 208-209 turn on, and when the signal 222 is low (i.e. $\leq$0.8V), the light panels turn off. Dark Cam Sync signal 221 provides a TTL-level signal to the grayscale dark cameras 204-205 such that when signal 221 is low the camera 204-205 shutters open and each camera 204-205 captures an image, and when signal 221 is high the shutters close and the cameras transfer the captured images to camera controller PCs 205. The synchronization timing (explained in detail below) is such that the (camera 204-205 shutters open to capture a frame when the light panels 208-209 are off (the "dark" interval). As a result, grayscale dark cameras 204-205 capture images of only the output of the phosphorescent makeup. Similarly, Lit Cam Sync 223 provides TTL-level signal to color lit cameras 214-215 such that when signal 221 is low the camera 204-205 shutters open and each camera 204-205 captures an image, and when signal 221 is high the shutters close and the cameras transfer the captured images to camera controller computers 225. Color lit cameras 214-215 are synchronized (as explained in detail below) such that their shutters open to capture a frame when the light panels 208-209 are on (the "lit" interval). As a result, color lit cameras 214-215 capture images of the performers' face illuminated by the light panels.

As used herein, grayscale cameras 204-205 may be referenced as "dark cameras" or "dark cams" because their shutters normally only when the light panels 208-209 are dark. Similarly, color cameras 214-215 may be referenced as "lit cameras" or "lit cams" because normally their shutters are only open when the light panels 208-209 are lit. While grayscale and color cameras are used specifically for each lighting phase in one embodiment, either grayscale or color cameras can be used for either light phase in other embodiments.

In one embodiment, light panels 208-209 are flashed rapidly at 90 flashes per second (as driven by a 90 Hz square wave from Light Panel Sync signal 222), with the cameras 204-205 and 214-205 synchronized to them as previously described. At 90 flashes per second, the light panels 208-209 are flashing at a rate faster than can be perceived by the vast majority of humans, and as a result, the performer (as well as any observers of the motion capture session) perceive the room as being steadily illuminated and are unaware of the flashing, and the performer is able to proceed with the performance without distraction from the flashing light panels 208-209.

As described in detail in the co-pending applications, the images captured by cameras 204-205 and 214-215 are recorded by camera controllers 225 (coordinated by a centralized motion capture controller 206) and the images and images sequences so recorded are processed by data processing system 210. The images from the various grayscale dark cameras are processed so as to determine the geometry of the 3D surface of the face 207. Further processing by data processing system 210 can be used to map the color lit images captured onto the geometry of the surface of the face 207. Yet further processing by the data processing system 210 can be used to track surface points on the face from frame-to-frame.

In one embodiment, each of the camera controllers 225 and central motion capture controller 206 is implemented using a separate computer system. Alternatively, the camera controllers and motion capture controller may be implemented as software executed on a single computer system or as any combination of hardware and software. In one embodiment, the camera controller computers 225 are rack-mounted computers, each using a 945GT Speedster-A4R motherboard from MSI Computer Japan Co., Ltd. (C&K Bldg. 6F 1-17-6, Higashikanda, Chiyoda-ku, Tokyo 101-0031 Japan) with 2 Gbytes of random access memory (RAM) and a 2.16 GHz Intel Core Duo central processing unit from Intel Corporation, and a 300 GByte SATA hard disk from Western Digital, Lake Forest Calif. The cameras 204-205 and 214-215 interface to the camera controller computers 225 via IEEE 1394 cables.

In another embodiment the central motion capture controller 206 also serves as the synchronization signal generator PC 220. In yet another embodiment the synchronization signal generator PCI card 224 is replaced by using the parallel port output of the synchronization signal generator PC 220. In such an embodiment, each of the TTL-level outputs of the parallel port are controlled by an application running on synchronization signal generator PC 220, switching each TTL-level output to a high state or a low state in accordance with the desired signal timing. For example, bit 0 of the PC 220 parallel port is used to drive synchronization signal 221, bit 1 is used to drive signal 222, and bit 2 is used to drive signal 224. However, the underlying principles of the invention are not limited to any particular mechanism for generating the synchronization signals.

Figure 3:
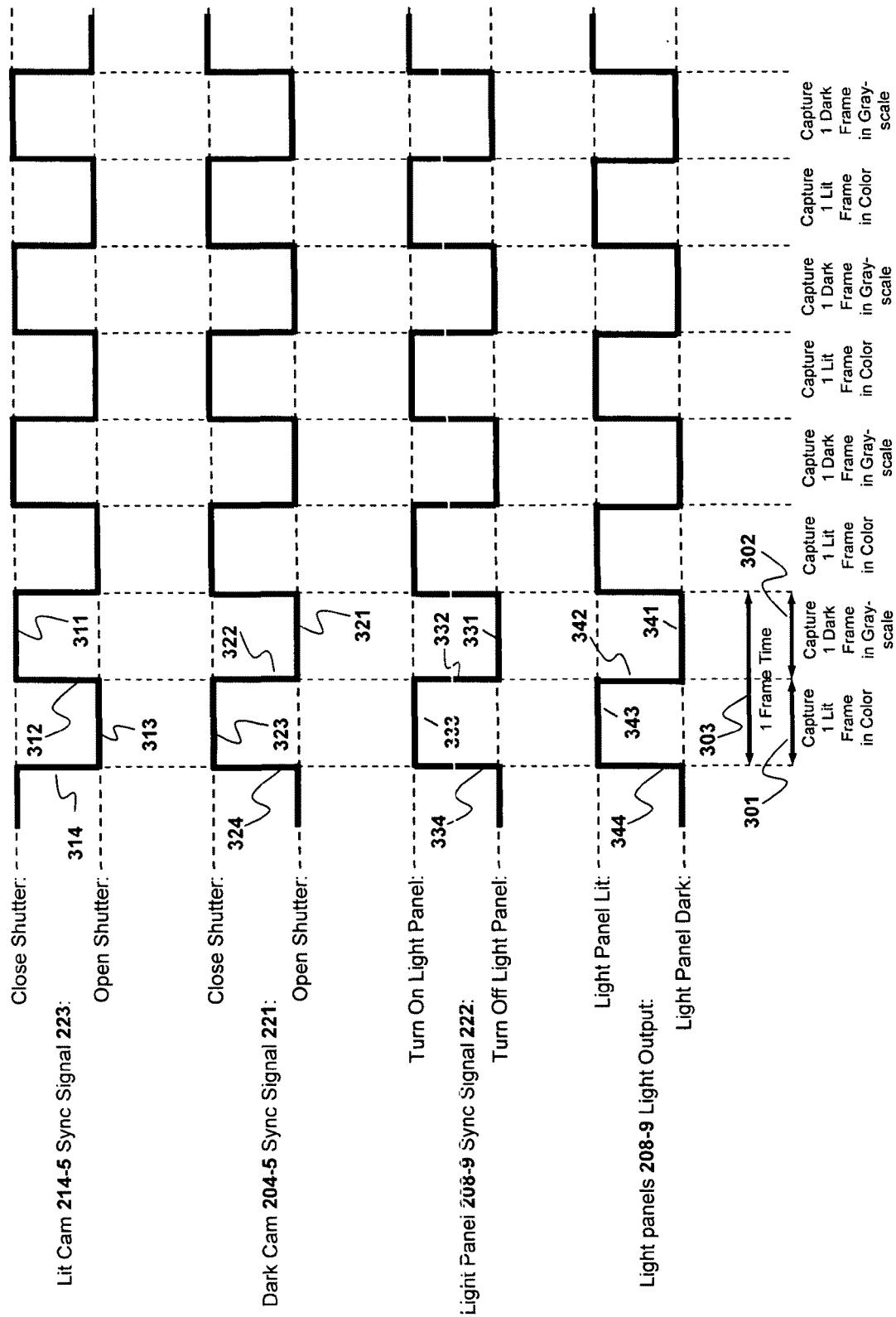
FIG. 3 is a timing diagram illustrating the synchronization between the light panels and the shutters according to one embodiment of the invention.

The synchronization between the light sources and the cameras employed in one embodiment of the invention is illustrated in FIG. 3. In this embodiment, the Light Panel and Dark Cam Sync signals 221 and 222 are in phase with each other, while the Lit Cam Sync Signal 223 is the inverse of signals 221/222. In one embodiment, the synchronization signals cycle between 0 to 5 Volts. In response to the synchronization signal 221 and 223, the shutters of the cameras 204-205 and 214-215, respectively, are periodically opened and closed as shown in FIG. 3. In response to sync signal 222, the light panels are periodically turned off and on, respectively as shown in FIG. 3. For example, on the falling edge 314 of sync signal 223 and on the rising edges 324 and 334 of sync signals 221 and 222, respectively, the lit camera 214-215 shutters are opened and the dark camera 204-215 shutters are closed and the light panels are illuminated as shown by rising edge 344. The shutters remain in their respective states and the light panels remain illuminated for time interval 301. Then, on the rising edge 312 of sync signal 223 and falling edges 322 and 332 of the sync signals 221 and 222, respectively, the lit camera 214-215 shutters are closed, the dark camera 204-215 shutters are opened and the light panels are turned off as shown by falling edge 342. The shutters and light panels are left in this state for time interval 302. The process then repeats for each successive frame time interval 303.

As a result, during the first time interval 301, a normally-lit image is captured by the color lit cameras 214-215, and the phosphorescent makeup is illuminated (and charged) with light from the light panels 208-209. During the second time interval 302, the light is turned off and the grayscale dark cameras 204-205 capture an image of the glowing phosphorescent makeup on the performer. Because the light panels are off during the second time interval 302, the contrast between the phosphorescent makeup and any surfaces in the room without phosphorescent makeup is extremely high (i.e., the rest of the room is pitch black or at least quite dark, and as a result there is no significant light reflecting off of surfaces in the room, other than reflected light from the phosphorescent emissions), thereby improving the ability of the system to differentiate the various patterns applied to the performer's face. In addition, because the light panels are on half of the time, the performer will be able to see around the room during the performance, and also the phosphorescent makeup is constantly recharged. The frequency of the synchronization signals is 1/(time interval 303) and may be set at such a high rate that the performer will not even notice that the light panels are being turned on and off. For example, at a flashing rate of 90 Hz or above, virtually all humans are unable to perceive that a light is flashing and the light appears to be continuously illuminated. In psychophysical parlance, when a high frequency flashing light is perceived by humans to be continuously illuminated, it is said that "fusion" has been achieved. In one embodiment, the light panels are cycled at 120 Hz; in another embodiment, the light panels are cycled at 140 Hz, both frequencies far above the fusion threshold of any human. However, the underlying principles of the invention are not limited to any particular frequency.

Surface Capture of Skin Using Phosphorescent Random Patterns

FIG. 4 shows images captured using the methods described above and the 3D surface and textured 3D surface reconstructed from them. Prior to capturing the images, a phosphorescent makeup was applied to a Caucasian model's face with an exfoliating sponge. Luminescent zinc sulfide with a copper activator (ZnS:Cu) is the phosphor responsible for the makeup's phosphorescent properties. This particular formulation of luminescent Zinc Sulfide is approved by the FDA color additives regulation 21 CFR Part 73 for makeup preparations. The particular brand is Fantasy F/XT Tube Makeup; Product #: FFX; Color Designation: GL; manufactured by Mehron Inc. of 100 Red Schoolhouse Rd. Chestnut Ridge, N.Y. 10977. The motion capture session that produced these images utilized 8 grayscale dark cameras (such as cameras 204-205) surrounding the model's face from a plurality of angles and 1 color lit camera (such as cameras 214-215) pointed at the model's face from an angle to provide the view seen in Lit Image 401. The grayscale cameras were model A311 f from Basler A G, An der Strusbek 60-62, 22926 Ahrensburg, Germany, and the color camera was a Basler model A311fc. The light panels 208-209 were flashed at a rate of 72 flashes per second.

Lit Image 401 shows an image of the performer captured by one of the color lit cameras 214-215 during lit interval 301, when the light panels 208-209 are on and the color lit camera 214-215 shutters are open. Note that the phosphorescent makeup is quite visible on the performer's face, particularly the lips.

Dark Image 402 shows an image of the performer captured by one of the grayscale dark cameras 204-205 during dark interval 302, when the light panels 208-209 are off and the grayscale dark camera 204-205 shutters are open. Note that only random pattern of phosphorescent makeup is visible on the surfaces where it is applied. All other surfaces in the image, including the hair, eyes, teeth, ears and neck of the performer are completely black.

3D Surface 403 shows a rendered image of the surface reconstructed from the Dark Images 402 from grayscale dark cameras 204-205 (in this example, 8 grayscale dark cameras were used, each producing a single Dark Image 402 from a different angle) pointed at the model's face from a plurality of angles. One reconstruction process which may be used to create this image is detailed in co-pending application APPARATUS AND METHOD FOR PERFORMING MOTION CAPTURE USING A RANDOM PATTERN ON CAPTURE SURFACES, Ser. No. 11/255,854, Filed Oct. 20, 2005. Note that 3D Surface 403 was only reconstructed from surfaces where there was phosphorescent makeup applied. Also, the particular embodiment of the technique that was used to produce the 3D Surface 403 fills in cavities in the 3D surface (e.g., the eyes and the mouth in this example) with a flat surface.

Textured 3D Surface 404 shows the Lit Image 401 used as a texture map and mapped onto 3D Surface 403 and rendered at an angle. Although Textured 3D Surface 404 is a computer-generated 3D image of the model's face, to the human eye it appears real enough that when it is rendered at an angle, such as it is in image 404, it creates the illusion that the model is turning her head and actually looking at an angle. Note that no phosphorescent makeup was applied to the model's eyes and teeth, and the image of the eyes and teeth are mapped onto flat surfaces that fill those cavities in the 3D surface. Nonetheless, the rest of the 3D surface is reconstructed so accurately, the resulting Textured 3D Surface 404 approaches photorealism. When this process is applied to create successive frames of Textured 3D Surfaces 404, when the frames are played back in real-time, the level of realism is such that, to the untrained eye, the successive frames look like actual video of the model, even though it is a computer-generated 3D image of the model viewed from side angle.

Since the Textured 3D Surfaces 404 produces computer-generated 3D images, such computer-generated images can manipulated with far more flexibility than actual video captured of the model. With actual video it is often impractical (or impossible) to show the objects in the video from any camera angles other than the angle from which the video was shot. With computer-generated 3D, the image can be rendered as if it is viewed from any camera angle. With actual video it is generally necessary to use a green screen or blue screen to separate an object from its background (e.g. so that a TV meteorologist can be composited in front of a weather map), and then that green- or blue-screened object can only be presented from the point of view of the camera shooting the object. With the technique just described, no green/blue screen is necessary. Phosphorescent makeup, paint, or dye is applied to the areas desired to be captured (e.g. the face, body and clothes of the meteorologist) and then the entire background will be separated from the object. Further, the object can be presented from any camera angle. For example, the meteorologist can be shown from a straight-on shot, or from an side angle shot, but still composited in front of the weather map.

Further, a 3D generated image can be manipulated in 3D. For example, using standard 3D mesh manipulation tools (such as those in Maya, sold by Autodesk, Inc.) the nose can be shortened or lengthened, either for cosmetic reasons if the performer feels her nose would look better in a different size, or as a creature effect, to make the performer look like a fantasy character like Gollum of "Lord of the Rings." More extensive 3D manipulations could add wrinkles to the performers face to make her appear to be older, or smooth out wrinkles to make her look younger. The face could also be manipulated to change the performer's expression, for Example, from a smile to a frown. Although some 2D manipulations are possible with conventional 2D video capture, they are generally limited to manipulations from the point of view of the camera. If the model turns her head during the video sequence, the 2D manipulations applied when the head is facing the camera would have to be changed when the head is turned. 3D manipulations do not need to be changed, regardless of which way the head is turned. As a result, the techniques described above for creating successive frames of Textured 3D Surface 404 in a video sequence make it possible to capture objects that appear to look like actual video, but nonetheless have the flexibility of manipulation as computer-generated 3D objects, offering enormous advantages in production of video, motion pictures, and also video games (where characters may be manipulated by the player in 3D).

Note that in FIG. 4 the phosphorescent makeup is visible on the model's face in Lit Image 401 and appears like a yellow powder has been spread on her face. It is particularly prominent on her lower lip, where the lip color is almost entirely changed from red to yellow. These discolorations appear in Textured 3D Surface 404, and they would be even more prominent on a dark-skinned model who is, for example, African in race. Many applications (e.g. creating a fantasy 3D character like Gollum) only require 3D Surface 403, and Textured 3D Surface 404 would only serve as a reference to the director of the motion capture session or as a reference to 3D animators manipulating the 3D Surface 403. But in some applications, maintaining the actual skin color of the model's skin is important and the discolorations from the phosphorescent makeup are not desirable.

Surface Capture Using Phosphorescent Makeup Mixed with Base

FIG. 5 shows a similar set of images as FIG. 4, captured and created under the same conditions: with 8 grayscale dark cameras (such as 204-205), 1 color camera (such as 214-215), with the Lit Image 501 captured by the color lit camera during the time interval when the Light Array 208-9 is on, and the Dark Image 502 captured by one of the 8 grayscale dark cameras when the Light Array 208-9. 3D Surface 503 is reconstructed from the 8 Dark Images 502 from the 8 grayscale dark cameras, and Textured 3D Surface 504 is a rendering of the Lit Image 501 texture-mapped onto 3D Surface 503 (and unlike image 404, image 504 is rendered from a camera angle similar to the camera angle of the color lit camera that captured Lit Image 501).

However, there is a notable differences between the images of FIG. 5 and FIG. 4: The phosphorescent makeup that is noticeably visible in Lit Image 401 and Textured 3D Surface 404 is almost invisible in Lit Image 501 and Textured 3D Surface 504. The reason for this is that, rather than applying the phosphorescent makeup to the model in its pure form, as was done in the motion capture session of FIG. 4, in the embodiment illustrated in FIG. 5 the phosphorescent makeup was mixed with makeup base and was then applied to the model. The makeup base used was "Clean Makeup" in "Buff Beige" color manufactured by Cover Girl, and it was mixed with the same phosphorescent makeup used in the FIG. 4 shoot in a proportion of 80% phosphorescent makeup and 20% base makeup.

Note that mixing the phosphorescent makeup with makeup base does reduce the brightness of the phosphorescence during the Dark interval 302. Despite this, the phosphorescent brightness is still sufficient to produce Dark Image 502, and there is enough dynamic range in the dark images from the 8 grayscale dark cameras to reconstruct 3D Surface 503. As previously noted, some applications do not require an accurate capture of the skin color of the model, and in that case it is advantageous to not mix the phosphorescent makeup with base, and then get the benefit of higher phosphorescent brightness during the Dark interval 302 (e.g. higher brightness allows for a smaller aperture setting on the camera lens, which allows for larger depth of field). But some applications do require an accurate capture of the skin color of the model. For such applications, it is advantageous to mix the phosphorescent makeup with base (in a color suited for the model's skin tone) makeup, and work within the constraints of lower phosphorescent brightness. Also, there are applications where some phosphor visibility is acceptable, but not the level of visibility seen in Lit Image 401. For such applications, a middle ground can be found in terms of skin color accuracy and phosphorescent brightness by mixing a higher percentage of phosphorescent makeup relative to the base.

In another embodiment, luminescent zinc sulfide (ZnS:Cu) in its raw form is mixed with base makeup and applied to the model's face.

Surface Capture of Fabric with Phosphorescent Random Patterns

In another embodiment, the techniques described above are used to capture cloth. FIG. 6 shows a capture of a piece of cloth (part of a silk pajama top) with the same phosphorescent makeup used in FIG. 4 sponged onto it. The capture was done under the exact same conditions with 8 grayscale dark cameras (such as 204-205) and 1 color lit camera (such as 214-215). The phosphorescent makeup can be seen slightly discoloring the surface of Lit Frame 601, during lit interval 301, but it can be seen phosphorescing brightly in Dark Frame 602, during dark interval 302. From the 8 cameras of Dark Frame 602, 3D Surface 603 is reconstructed using the same techniques used for reconstructing the 3D Surfaces 403 and 503. And, then Lit Image 601 is texture-mapped onto 3D Surface 603 to produce Textured 3D Surface 604.

FIG. 6 shows a single frame of captured cloth, one of hundreds of frames that were captured in a capture session while the cloth was moved, folded and unfolded. And in each frame, each area of the surface of the cloth was captured accurately, so long as at least 2 of the 8 grayscale cameras had a view of the area that was not overly oblique (e.g. the camera optical axis was within 30 degrees of the area's surface normal). In some frames, the cloth was contorted such that there were areas within deep folds in the cloth (obstructing the light from the light panels 208-209), and in some frames the cloth was curved such that there were areas that reflected back the light from the light panels 208-209 so as to create a highlight (i.e. the silk fabric was shiny). Such lighting conditions would make it difficult, if not impossible, to accurately capture the surface of the cloth using reflected light during lit interval 301 because shadow areas might be too dark for an accurate capture (e.g. below the noise floor of the camera sensor) and some highlights might be too bright for an accurate capture (e.g. oversaturating the sensor so that it reads the entire area as solid white). But, during the dark interval 302, such areas are readily captured accurately because the phosphorescent makeup emits light quite uniformly, whether deep in a fold or on an external curve of the cloth.

Because the phosphor charges from any light incident upon it, including diffused or reflected light that is not directly from the light panels 208-209, even phosphor within folds gets charged (unless the folds are so tightly sealed no light can get into them, but in such cases it is unlikely that the cameras can see into the folds anyway). This illustrates a significant advantage of utilizing phosphorescent makeup (or paint or dye) for creating patterns on (or infused within) surfaces to be captured: the phosphor is emissive and is not subject to highlights and shadows, producing a highly uniform brightness level for the patterns seen by the grayscale dark cameras 204-205, that neither has areas too dark nor areas too bright.

Another advantage of dyeing or painting a surface with phosphorescent dye or paint, respectively, rather than applying phosphorescent makeup to the surface is that with dye or paint the phosphorescent pattern on the surface can be made permanent throughout a motion capture session. Makeup, by its nature, is designed to be removable, and a performer will normally remove phosphorescent makeup at the end of a day's motion capture shoot, and if not, almost certainly before going to bed. Frequently, motion capture sessions extend across several days, and as a result, normally a fresh application of phosphorescent makeup is applied to the performer each day prior to the motion capture shoot. Typically, each fresh application of phosphorescent makeup will result in a different random pattern. One of the techniques disclosed in co-pending applications is the tracking of vertices ("vertex tracking") of the captured surfaces. Vertex tracking is accomplished by correlating random patterns from one captured frame to the next. In this way, a point on the captured surface can be followed from frame-to-frame. And, so long as the random patterns on the surface stay the same, a point on a captured surface even can be tracked from shot-to-shot. In the case of random patterns made using phosphorescent makeup, it is typically practical to leave the makeup largely undisturbed (although it is possible for some areas to get smudged, the bulk of the makeup usually stays unchanged until removed) during one day's-worth of motion capture shooting, but as previously mentioned it normally is removed at the end of the day. So, it is typically impractical to maintain the same phosphorescent random pattern (and with that, vertex tracking based on tracking a particular random pattern) from day-to-day. But when it comes to non-skin objects like fabric, phosphorescent dye or paint can be used to create a random pattern. Because dye and paint are essentially permanent, random patterns will not get smudged during the motion capture session, and the same random patterns will be unchanged from day-to-day. This allows vertex tracking of dyed or painted objects with random patterns to track the same random pattern through the duration of a multi-day motion capture session (or in fact, across multiple motion capture sessions spread over long gaps in time if desired).

Skin is also subject to shadows and highlights when viewed with reflected light. There are many concave areas (e.g., eye sockets) that often are shadowed. Also, skin may be shiny and cause highlights, and even if the skin is covered with makeup to reduce its shininess, performers may sweat during a physical performance, resulting in shininess from sweaty skin. Phosphorescent makeup emits uniformly both from shiny and matte skin areas, and both from convex areas of the body (e.g. the nose bridge) and concavities (e.g. eye sockets). Sweat has little impact on the emission brightness of phosphorescent makeup. Phosphorescent makeup also charges while folded up in areas of the body that fold up (e.g. eyelids) and when it unfolds (e.g. when the performer blinks) the phosphorescent pattern emits light uniformly.

Returning back to FIG. 6, note that the phosphorescent makeup can be seen on the surface of the cloth in Lit Frame 601 and in Textured 3D Surface 604. Also, while this is not apparent in the images, although it may be when the cloth is in motion, the phosphorescent makeup has a small impact on the pliability of the silk fabric. In another embodiment, instead of using phosphorescent makeup (which of course is formulated for skin application) phosphorescent dye is used to create phosphorescent patterns on cloth. Phosphorescent dyes are available from a number of manufacturers. For example, it is common to find t-shirts at novelty shops that have glow-in-the-dark patterns printed onto them with phosphorescent dyes. The dyes can also can be formulated manually by mixing phosphorescent powder (e.g. ZnS:Cu) with off-the-shelf clothing dyes, appropriate for the given type of fabric. For example, Dharma Trading Company with a store at 1604 Fourth Street, San Rafael, Calif. stocks a large number of dyes, each dye designed for certain fabrics types (e.g. Dharma Fiber Reactive Procion Dye is for all natural fibers, Sennelier Tinfix Design—French Silk Dye is for silk and wool), as well as the base chemicals to formulate such dyes. When phosphorescent powder is used as the pigment in such formulations, then a dye appropriate for a given fabric type is produced and the fabric can be dyed with phosphorescent pattern while minimizing the impact on the fabric's pliability.

Figure 7A:
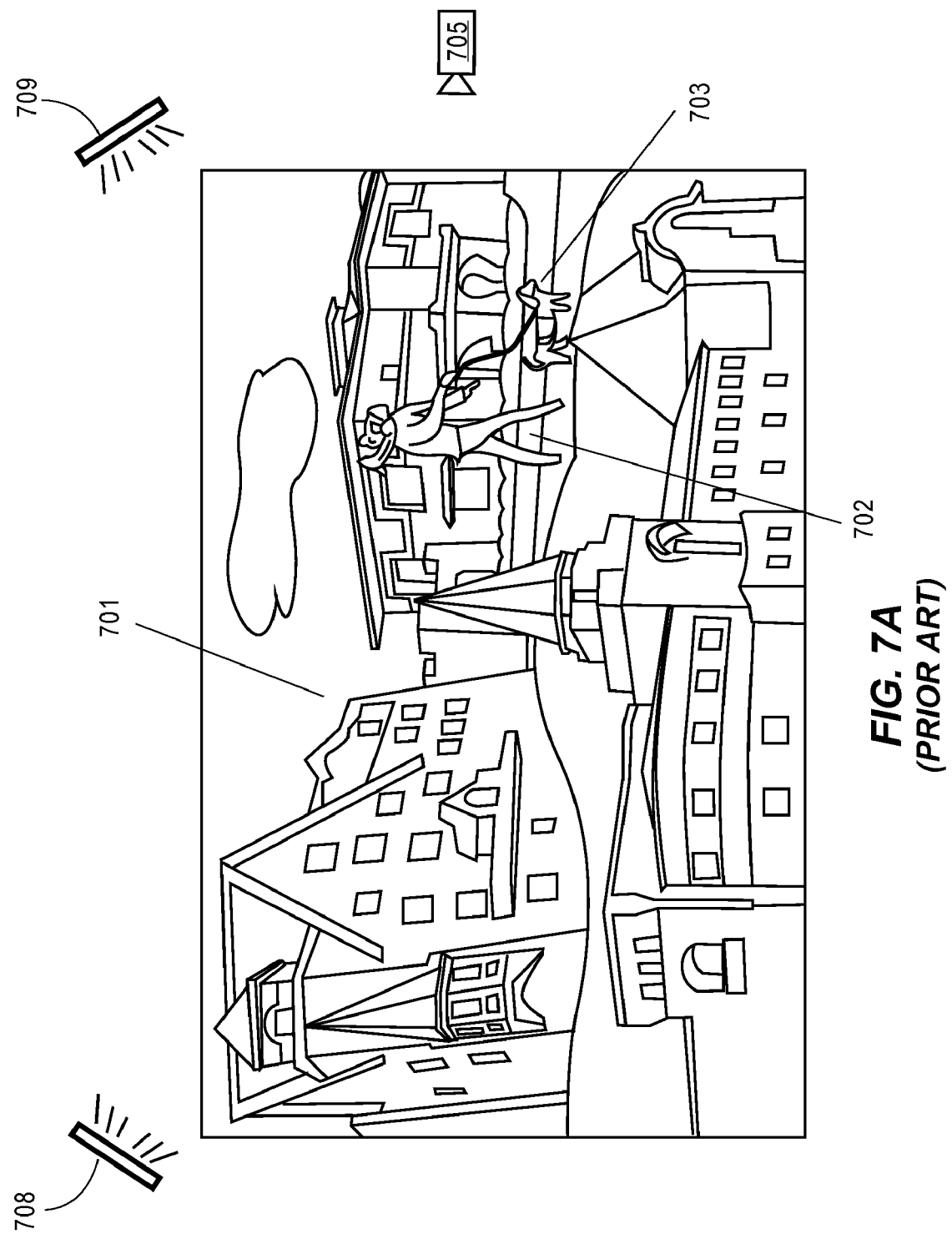
FIG. 7a illustrates a prior art stop-motion animation stage.

Surface Capture of Stop-Motion Animation Characters with Phosphorescent Random Patterns In another embodiment, phosphor is embedded in silicone or a moldable material such as modeling clay in characters, props and background sets used for stop-motion animation. Stop-motion animation is a technique used in animated motion pictures and in motion picture special effects. An exemplary prior art stop-motion animation stage is illustrated in FIG. 7a. Recent stop-motion animations are feature films Wallace & Gromit in The Curse of the Were-Rabbit (Academy Award-winning best animated feature film released in 2005) (hereafter referenced as WG) and Corpse Bride (Academy Award-nominated best animated feature film released in 2005) (hereafter referred to as CB). Various techniques are used in stop-motion animation. In WG the characters 702-703 are typically made of modeling clay, often wrapped around a metal armature to give the character structural stability. In CB the characters 702-703 are created from puppets with mechanical armatures which are then covered with molded silicone (e.g. for a face), or some other material (e.g. for clothing). The characters 702-703 in both films are placed in complex sets 701 (e.g. city streets, natural settings, or in buildings), the sets are lit with lights such as 708-709, a camera such as 705 is placed in position, and then one frame is shot by the camera 705 (in modern stop-motion animation, typically, a digital camera). Then the various characters (e.g. the man with a leash 702 and the dog 703) that are in motion in the scene are moved very slightly. In the case of WB, often the movement is achieved by deforming the clay (and potentially the armature underneath it) or by changing a detailed part of a character 702-703 (e.g. for each frame swapping in a different mouth shape on a character 702-703 as it speaks). In the case of CB, often motion is achieved by adjusting the character puppet 702-703 armature (e.g. a screwdriver inserted in a character puppet's 702-703 ear might turn a screw that actuates the armature causing the character's 702-703 mouth to open). Also, if the camera 705 is moving in the scene, then the camera 705 is placed on a mechanism that allows it to be moved, and it is moved slightly each frame time. After all the characters 702-703 and the camera 705 in a scene have been moved, another frame is captured by the camera 705. This painstaking process continues frame-by-frame until the shot is completed.

There are many difficulties with the stop-motion animation process that both limit the expressive freedom of the animators, limit the degree of realism in motion, and add to the time and cost of production. One of these difficulties is animating many complex characters 702-703 within a complex set 701 on a stop-motion animation stage such as that shown in FIG. 7a. The animators often need to physically climb into the sets, taking meticulous care not to bump anything inadvertently, and then make adjustments to character 702-703 expressions, often with sub-millimeter precision. When characters 702-703 are very close to each other, it gets even more difficult. Also, sometimes characters 702-703 need to be placed in a pose where a character 702-703 can easily fall over (e.g. a character 702-703 is doing a hand stand or a character 702-

703 is flying). In these cases the character 702-703 requires some support structure that may be seen by the camera 705, and if so, needs to be erased from the shot in post-production.

Figure 7B:
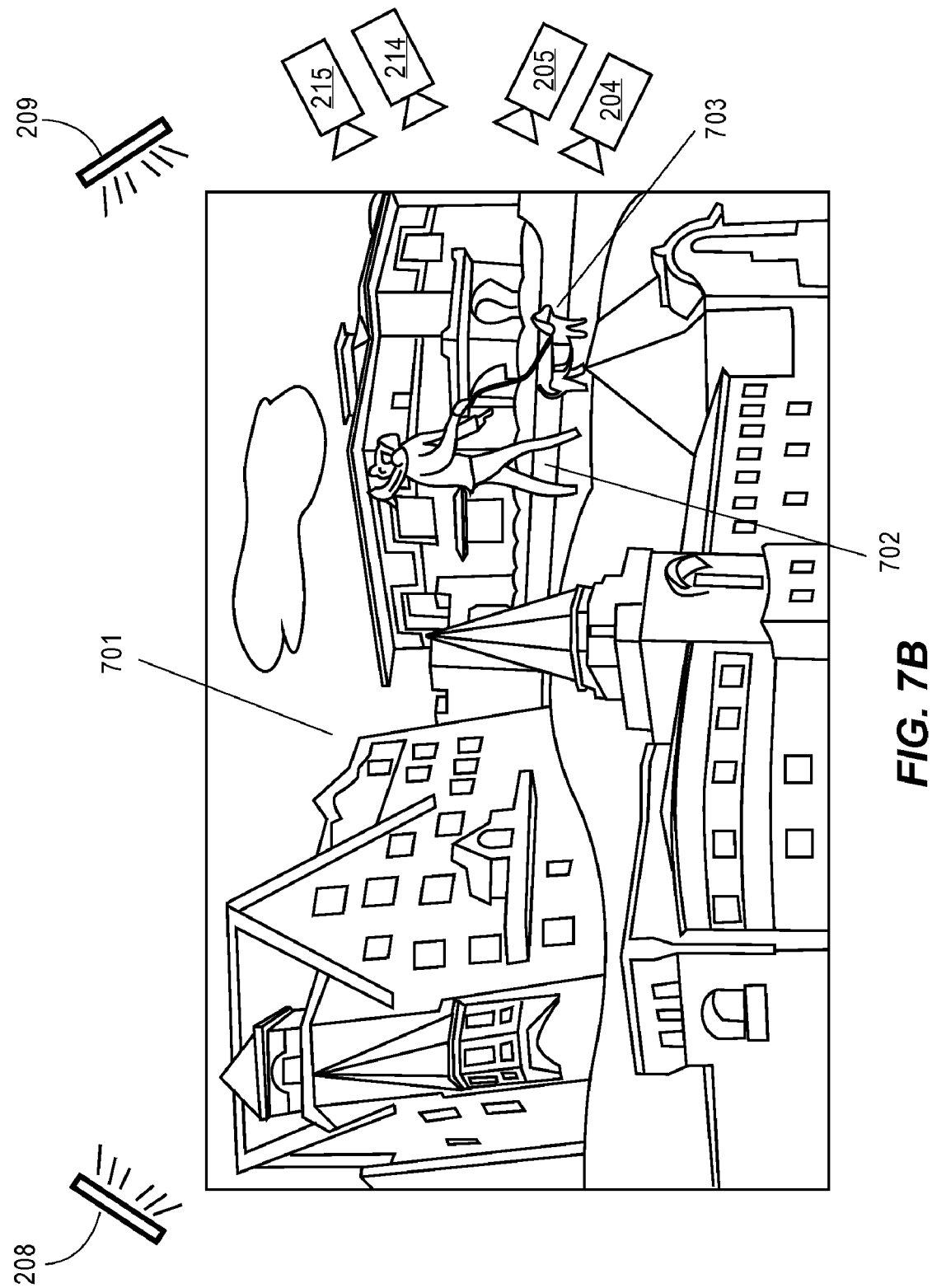
FIG. 7b illustrates one embodiment of the invention where stop-motion characters and the set are captured together.

In one embodiment illustrated by the stop-motion animation stage in FIG. 7b, phosphorescent phosphor (e.g. zinc sulfide) in powder form can be mixed (e.g. kneaded) into modeling clay resulting in the clay surface phosphorescing in darkness with a random pattern. Zinc sulfide powder also can be mixed into liquid silicone before the silicone is poured into a mold, and then when the silicone dries and solidifies, it has zinc sulfide distributed throughout. In another embodiment, zinc sulfide powder can be spread onto the inner surface of a mold and then liquid silicone can be poured into the mold to solidify (with the zinc sulfide embedded on the surface). In yet another embodiment, zinc sulfide is mixed in with paint that is applied to the surface of either modeling clay or silicone. In yet another embodiment, zinc sulfide is dyed into fabric worn by characters 702-703 or mixed into paint applied to props or sets 701. In all of these embodiments the resulting effect is that the surfaces of the characters 702-703, props and sets 701 in the scene phosphoresce in darkness with random surface patterns.

At low concentrations of zinc sulfide in the various embodiments described above, the zinc sulfide is not significantly visible under the desired scene illumination when light panels 208-208 are on. The exact percentage of zinc sulfide depends on the particular material it is mixed with or applied to, the color of the material, and the lighting circumstances of the character 702-703, prop or set 701. But, experimentally, the zinc sulfide concentration can be continually reduced until it is no longer visually noticeable in lighting situations where the character 702-703, prop or set 701 is to be used. This may result in a very low concentration of zinc sulfide and very low phosphorescent emission. Although this normally would be a significant concern with live action frame capture of dim phosphorescent patterns, with stop-motion animation, the dark frame capture shutter time can be extremely long (e.g. 1 second or more) because by definition, the scene is not moving. With a long shutter time, even very dim phosphorescent emission can be captured accurately.

Once the characters 702-703, props and the set 701 in the scene are thus prepared, they look almost exactly as they otherwise would look under the desired scene illumination when light panels 208-209 are on, but they phosphoresce in random patterns when the light panels 208-209 are turned off. At this point all of the characters 702-703, props and the set 701 of the stop-motion animation can now be captured 3D using a configuration like that illustrated in FIGS. 2a and 2b and described in the co-pending applications. (FIGS. 7b-7e illustrate stop-motion animation stages with light panels 208-209, dark cameras 204-205 and lit cameras 214-215 from FIGS. 2a and 2b surrounding the stop-motion animation characters 702-703 and set 701. For clarity, the connections to devices 208-209, 204-205 and 214-215 have been omitted from FIGS. 7b-7e, but in they would be hooked up as illustrated in FIGS. 2a and 2b.) Dark cameras 204-205 and lit cameras 214-215 are placed around the scene illustrated in FIG. 7b so as to capture whatever surfaces will be needed to be seen in the final animation. And then, rather than rapidly switching sync signals 221-223 at a high capture frame rate (e.g. 90 fps), the sync signals are switched very slowly, and in fact may be switched by hand.

In one embodiment, the light panels 208-209 are left on while the animators adjust the positions of the characters 702-703, props or any changes to the set 701. Note that the light panels 208-209 could be any illumination source, including incandescent lamps, because there is no requirement in stop-motion animation for rapidly turning on and off the illumination source. Once the characters 702-703, props and set 701 are in position for the next frame, lit cam sync signal 223 is triggered (by a falling edge transition in the presently preferred embodiment) and all of the lit cameras 214-215 capture a frame for a specified duration based on the desired exposure time for the captured frames. In other embodiments, different cameras may have different exposure times based on individual exposure requirements.

Next, light panels 208-209 are turned off (either by sync signal 222 or by hand) and the lamps are allowed to decay until the scene is in complete darkness (e.g. incandescent lamps may take many seconds to decay). Then, dark cam sync signal 221 is triggered (by a falling edge transition in the presently preferred embodiment) and all of the dark cameras 208-209 capture a frame of the random phosphorescent patterns for a specified duration based on the desired exposure time for the captured frames. Once again, different cameras have different exposure times based on individual exposure requirements. As previously mentioned, in the case of very dim phosphorescent emissions, the exposure time may be quite long (e.g., a second or more). The upper limit of exposure time is primarily limited by the noise accumulation of the camera sensors. The captured dark frames are processed by data processing system 210 to produce 3D surface 207 and then to map the images captured by the lit cameras 214-215 onto the 3D surface 207 to create textured 3D surface 217. Then, the light panels, 208-9 are turned back on again, the characters 702-703, props and set 701 are moved again, and the process described in this paragraph is repeated until the entire shot is completed.

The resulting output is the successive frames of textured 3D surfaces of all of the characters 702-703, props and set 701 with areas of surfaces embedded or painted with phosphor that are in view of at least 2 dark cameras 204-205 at a non-oblique angle (e.g., <30 degrees from the optical axis of a camera). When these successive frames are played back at the desired frame rate (e.g., 24 fps), the animated scene will come to life, but unlike frames of a conventional stop-motion animation, the animation will be able to be viewed from any camera position, just by rendering this textured 3D surfaces from a chosen camera position. Also, if the camera position of the final animation is to be in motion during a frame sequence (e.g. if a camera is following a character 702-703), it is not necessary to have a physical camera moving in the scene. Rather, for each successive frame, the textured 3D surfaces of the scene are simply rendered from the desired camera position for that frame, using a 3D modeling/animation application software such as Maya (from Autodesk, Inc.).

Figure 7C:
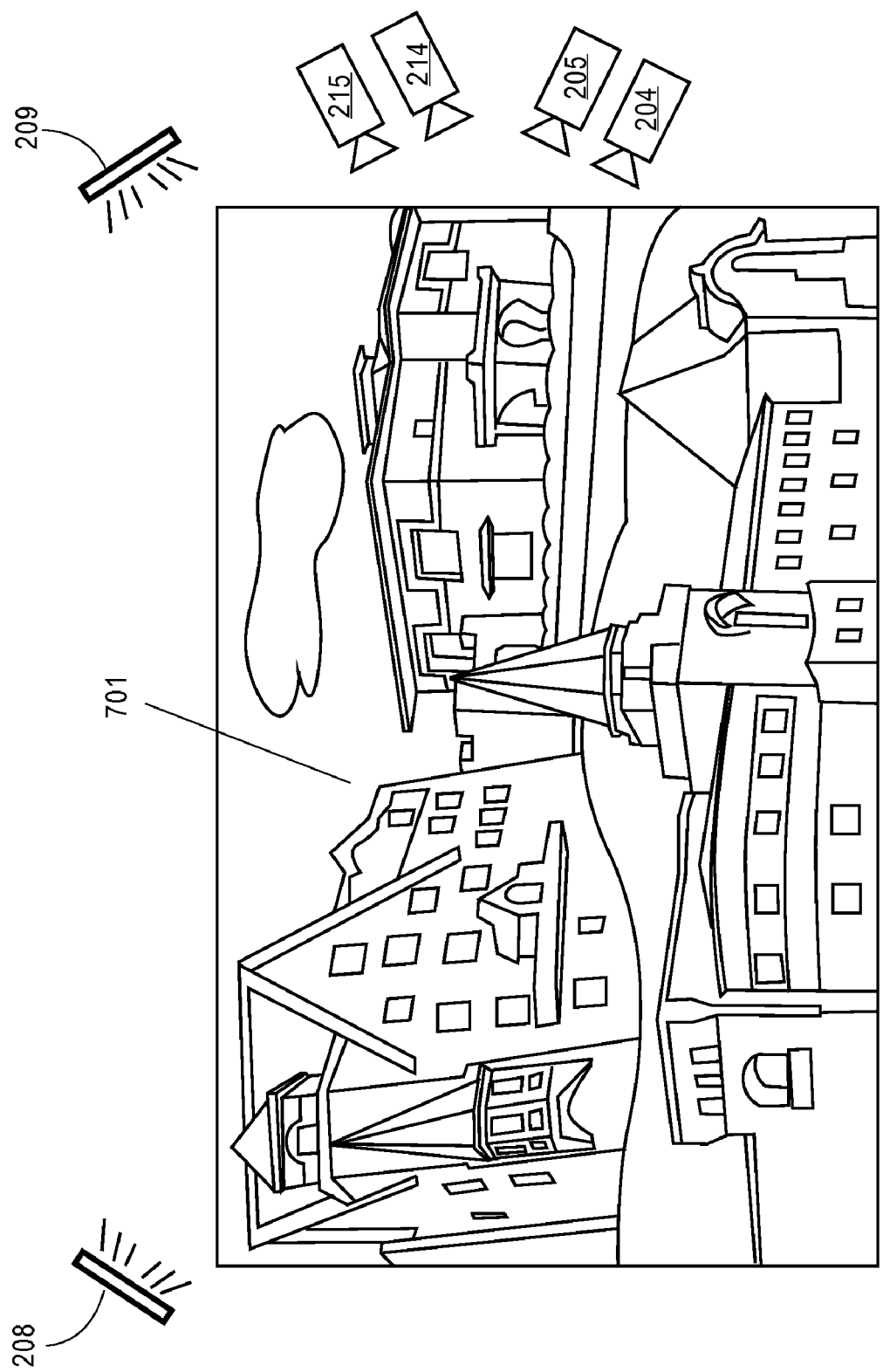
FIG. 7c illustrates one embodiment of the invention where the stop-motion set is captured separately from the characters.
Figure 7D:
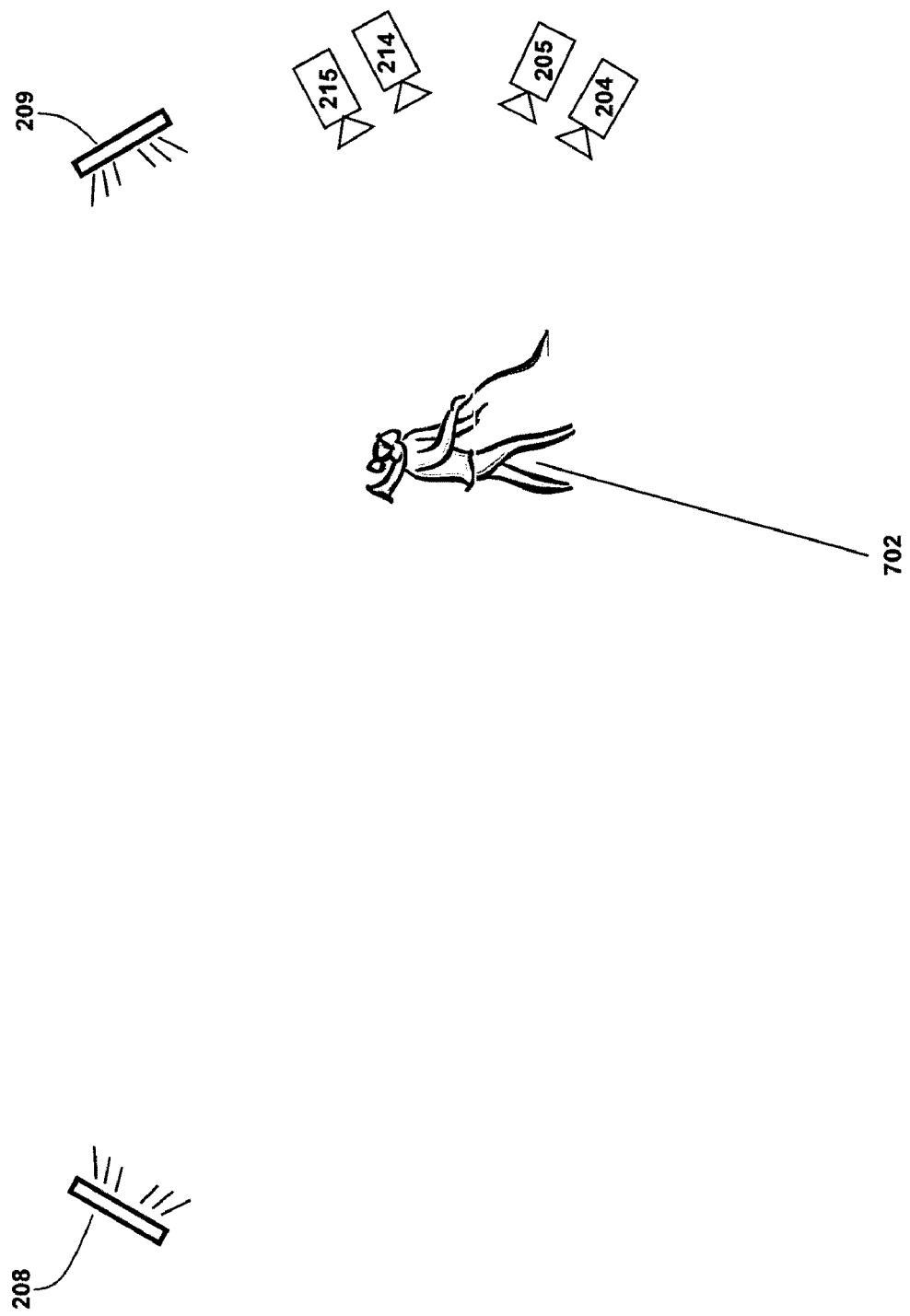
FIG. 7d illustrates one embodiment of the invention where a stop-motion character is captured separately from the set and other characters.

In another embodiment, illustrated in FIGS. 7c-7e, some or all of the different characters 702-703, props, and/or sets 701 within a single stop-motion animation scene are shot separately, each in a configuration such as FIGS. 2a and 2b. For example, if a scene had man with leash 702 and his dog 703 walking down a city street set 701, the city street set 701, the man with leash 702, and the dog 703 would be shot individually, each with separate motion capture systems as illustrated in FIG. 7c (for city street set 701, FIG. 7d (for man with leash 702) and FIG. 7e (for dog 703)a. The stop-motion animation of the 2 characters 702-703 and 1 set 701 would each then be separately captured as individual textured 3D surfaces 217, in the manner described above. Then, with a 3D modeling and/or animation application software the 2 characters 702-703 and 1 set 701 would be rendered together into a 3D scene. In one embodiment, the light panel 208-209 lighting the characters 702-703 and the set 701 could be configured to be the same, so the man with leash 702 and the dog 703 appear to be illuminated in the same environment as the set 701. In another embodiment, flat lighting (i.e. uniform lighting to minimize shadows and highlights) is used, and then lighting (including shadows and highlights) is simulated by the 3D modeling/animation application software. Through the 3D modeling/animation application software the animators will be able to see how the characters 702-703 look relative to each other and the set 701, and will also be able to look at the characters 702-703 and set 701 from any camera angle they wish, without having to move any of the physical cameras 204-205 or 214-215 doing the capture.

This approach provides significant advantages to stop-motion animation. The following are some of the advantages of this approach: (a) individual characters 702-703 may be manipulated individually without worrying about the animator bumping into another character 702-703 or the characters 702-703 bumping into each other, (b) the camera position of the rendered frames may be chosen arbitrarily, including having the camera position move in successive frames, (c) the rendered camera position can be one where it would not be physically possible to locate a camera 705 in a conventional stop-motion configuration (e.g. directly between 2 characters 702-703 that are close together, where there is no room for a camera 705), (d) the lighting, including highlights and shadows can be controlled arbitrarily, including creating lighting situations that are not physically possible to realize (e.g. making a character glow), (e) special effects can be applied to the characters 702-703 (e.g. a ghost character 702-703 can be made translucent when it is rendered into the scene), (f) a character 702-703 can remain in a physically stable position on the ground while in the scene it is not (e.g. a character 702-703 can be captured in an upright position, while it is rendered into the scene upside down in a hand stand, or rendered into the scene flying above the ground), (g) parts of the character 702-703 can be held up by supports that do not have phosphor on them, and as such will not be captured (and will not have to be removed from the shot later in post-production), (h) detail elements of a character 702-703, like mouth positions when the character 702-703 is speaking, can be rendered in by the 3D modeling/animation application, so they do not have be attached and then removed from the character 702-703 during the animation, (i) characters 702-703 can be rendered into computer-generated 3D scenes (e.g. the man with leash 702 and dog 703 can be animated as clay animations, but the city street set 701 can be a computer-generated scene), (j) 3D motion blur can be applied to the objects as they move (or as the rendered camera position moves), resulting in a smoother perception of motion to the animation, and also making possible faster motion without the perception of jitter.

Additional Phosphorescent Phosphors

In another embodiment, different phosphors other than ZnS:Cu are used as pigments with dyes for fabrics or other non-skin objects. ZnS:Cu is the preferred phosphor to use for skin applications because it is FDA-approved as a cosmetic pigment. But a large variety of other phosphors exist that, while not approved for use on the skin, are in some cases approved for use within materials handled by humans. One such phosphor is $SrAl_2O_4:Eu^{2+},Dy^{3+}$. Another is $SrAl_2O_4:Eu^{2+}$. Both phosphors have a much longer afterglow than ZnS:Cu for a given excitation.

Optimizing Phosphorescent Emission

Figure 8:
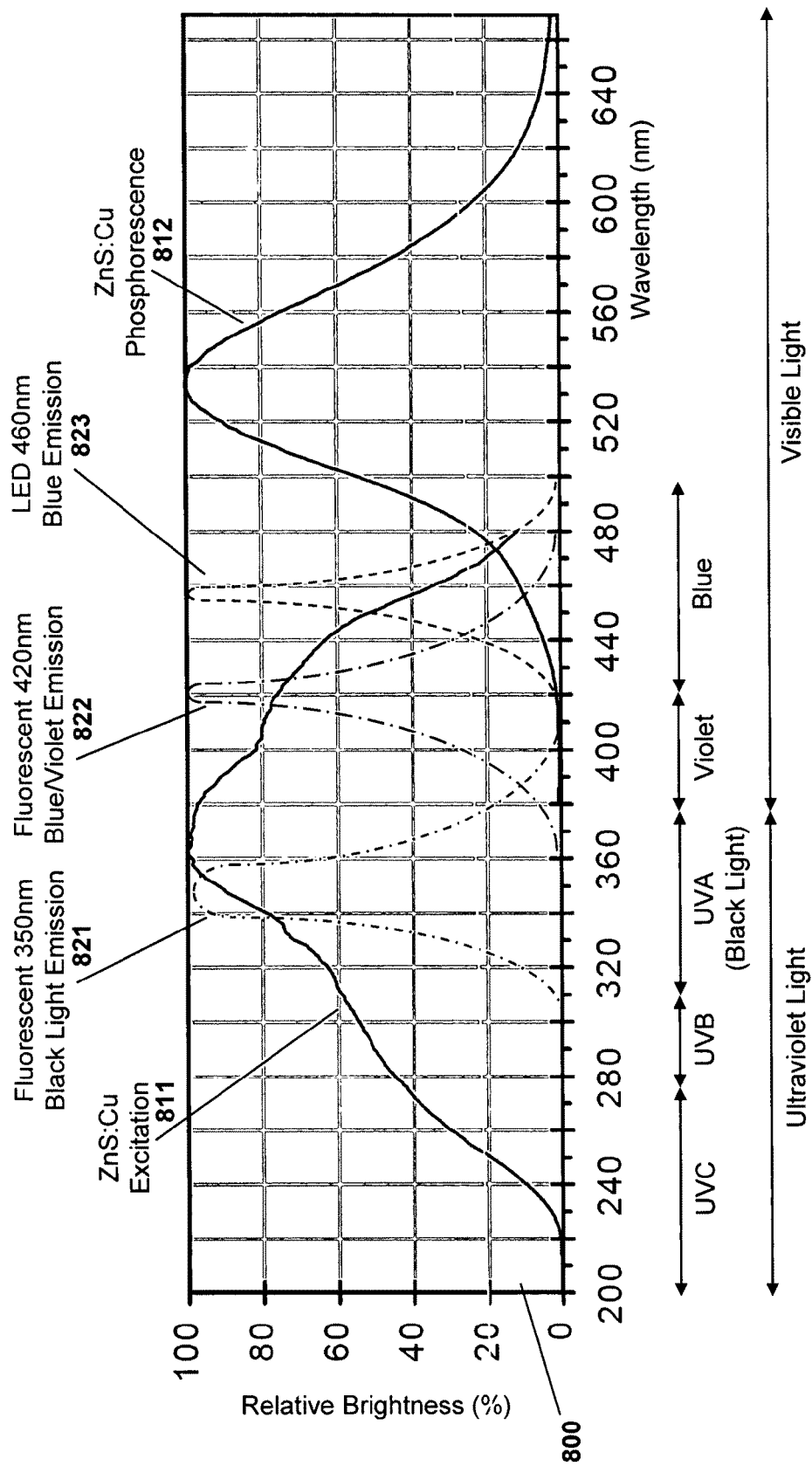
FIG. 8 is a chart showing the excitation and emission spectra of ZnS:Cu phosphor as well as the emission spectra of certain fluorescent and LED light sources.

Many phosphors that phosphoresce in visible light spectra are charged more efficiently by ultraviolet light than by visible light. This can be seen in chart 800 of FIG. 8 which show approximate excitation and emission curves of ZnS:Cu (which we shall refer to hereafter as "zinc sulfide") and various light sources. In the case of zinc sulfide, its excitation curve 811 spans from about 230 nm to 480 nm, with its peak at around 360 nm. Once excited by energy in this range, its phosphorescence curve 812 spans from about 420 nm to 650 nm, producing a greenish glow. The zinc sulfide phosphorescence brightness 812 is directly proportional to the excitation energy 811 absorbed by the zinc sulfide. As can be seen by excitation curve 811, zinc sulfide is excited with varying degrees of efficiency depending on wavelength. For example, at a given brightness from an excitation source (i.e. in the case of the presently preferred embodiment, light energy from light panels 208-209) zinc sulfide will absorb only 30% of the energy at 450 nm (blue light) that it will absorb at 360 nm (UVA light, commonly called "black light"). Since it is desirable to get the maximum phosphorescent emission 812 from the zinc sulfide (e.g. brighter phosphorescence will allow for smaller lens apertures and longer depth of field), clearly it is advantageous to excite the zinc sulfide with as much energy as possible. The light panels 208-209 can only produce up to a certain level of light output before the light becomes uncomfortable for the performers. So, to maximize the phosphorescent emission output of the zinc sulfide, ideally the light panels 208-209 should output light at wavelengths that are the most efficient for exciting zinc sulfide.

Other phosphors that may be used for non-skin phosphorescent use (e.g. for dyeing fabrics) also are excited best by ultraviolet light. For example, $SrAl_2O_4:Eu^{2+},Dy^{3+}$ and $SrAl_2O_4:Eu^{2+}$ are both excited more efficiently with ultraviolet light than visible light, and in particular, are excited quite efficiently by UVA (black light).

As can be seen in FIG. 3, a requirement for a light source used for the light panels 208-209 is that the light source can transition from completely dark to fully lit very quickly (e.g. on the order of a millisecond or less) and from fully lit to dark very quickly (e.g. also on the order of a millisecond or less). Most LEDs fulfill this requirement quite well, typically turning on an off on the order of microseconds. Unfortunately, though, current LEDs present a number of issues for use in general lighting. For one thing, LEDs currently available have a maximum light output of approximately 35 W. The BL-43F0-0305 from Lamina Ceramics, 120 Hancock Lane, Westampton, N.J. 08060 is one such RGB LED unit. For another, currently LEDs have special power supply requirements (in the case of the BL-43F0-0305, different voltage supplies are need for different color LEDs in the unit). In addition, current LEDs require very large and heavy heatsinks and produce a great deal of heat. Each of these issues results in making LEDs expensive and somewhat unwieldy for lighting an entire motion capture stage for a performance. For example, if 3500 Watts were needed to light a stage, 100 35 W LED units would be needed.

But, in addition to these disadvantages, the only very bright LEDs currently available are white or RGB LEDs. In the case of both types of LEDs, the wavelengths of light emitted by the LED does not overlap with wavelengths where the zinc sulfide is efficiently excited. For example, in FIG. 8 the emission curve 823 of the blue LEDs in the BL-43F0-0305 LED unit is centered around 460 nm. It only overlaps with the tail end of the zinc sulfide excitation curve 811 (and the Red and Green LEDs don't excite the zinc sulfide significantly at all). So, even if the blue LEDs are very bright (to the point where they are as bright as is comfortable to the performer), only a small percentage of that light energy will excite the zinc sulfide, resulting in a relatively dim phosphorescence. Violet and UVA ("black light") LEDs do exist, which would excite the zinc sulfide more efficiently, but they only currently are available at very low power levels, on the order of 0.1 Watts. To achieve 3500 Watts of illumination would require 35,000 such 0.1 Watt LEDs, which would be quite impractical and prohibitively expensive.

Fluorescent Lamps As a Flashing Illumination Source

Other lighting sources exist that output light at wavelengths that are more efficiently absorbed by zinc sulfide. For example, fluorescent lamps (e.g. 482-S9 from Kino-Flo, Inc. 2840 North Hollywood Way, Burbank, Calif. 91505) are available that emit UVA (black light) centered around 350 nm with an emission curve similar to 821, and Blue/violet fluorescent lamps (e.g. 482-S10-S from Kino-Flo) exist that emit bluish/violet light centered around 420 nm with an emission curve similar to 822. The emission curves 821 and 822 are much closer to the peak of the zinc sulfide excitation curve 811, and as a result the light energy is far more efficiently absorbed, resulting in a much higher phosphorescent emission 812 for a given excitation brightness. Such fluorescent bulbs are quite inexpensive (typically $15/bulb for a 48" bulb), produce very little heat, and are very light weight. They are also available in high wattages. A typical 4-bulb fluorescent fixture produces 160 Watts or more. Also, theatrical fixtures are readily available to hold such bulbs in place as staging lights. (Note that UVB and UVC fluorescent bulbs are also available, but UVB and UVC exposure is known to present health hazards under certain conditions, and as such would not be appropriate to use with human or animal performers without suitable safety precautions.)

The primary issue with using fluorescent lamps is that they are not designed to switch on and off quickly. In fact, ballasts (the circuits that ignite and power fluorescent lamps) typically turn the lamps on very slowly, and it is common knowledge that fluorescent lamps may take a second or two until they are fully illuminated.

Figure 9:
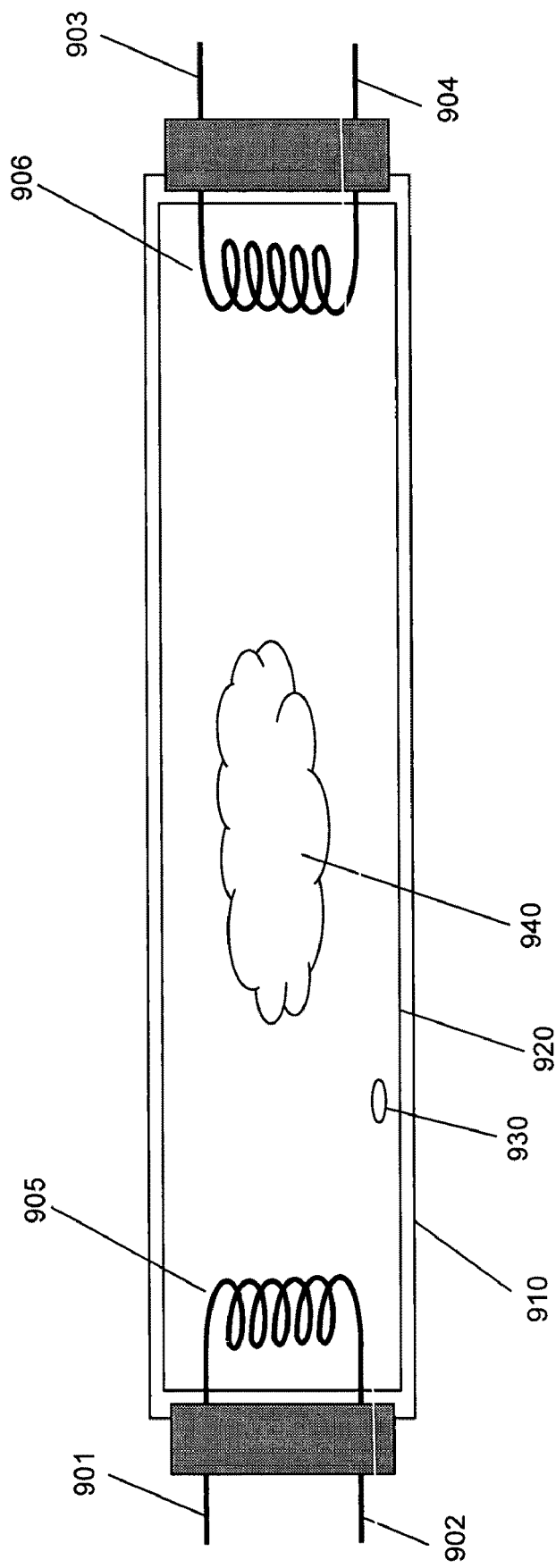
FIG. 9 is an illustration of a prior art fluorescent lamp.

FIG. 9 shows a diagrammatic view of a prior art fluorescent lamp. The elements of the lamp are contained within a sealed glass bulb 910 which, in this example, is in the shape of a cylinder (commonly referred to as a "tube"). The bulb contains an inert gas 940, typically argon, and a small amount of mercury 930. The inner surface of the bulb is coated with a phosphor 920. The lamp has 2 electrodes 905-906, each of which is coupled to a ballast through connectors 901-904. When a large voltage is applied across the electrodes 901-904, some of the mercury in the tube changes from a liquid to a gas, creating mercury vapor, which, under the right electrical circumstances, emits ultraviolet light. The ultraviolet light excites the phosphor coating the inner surface of the bulb. The phosphor then fluoresces light at a higher wavelength than the excitation wavelength. A wide range of phosphors are available for fluorescent lamps with different wavelengths. For example, phosphors that are emissive at UVA wavelengths and all visible light wavelengths are readily available off-the-shelf from many suppliers.

Figure 10:
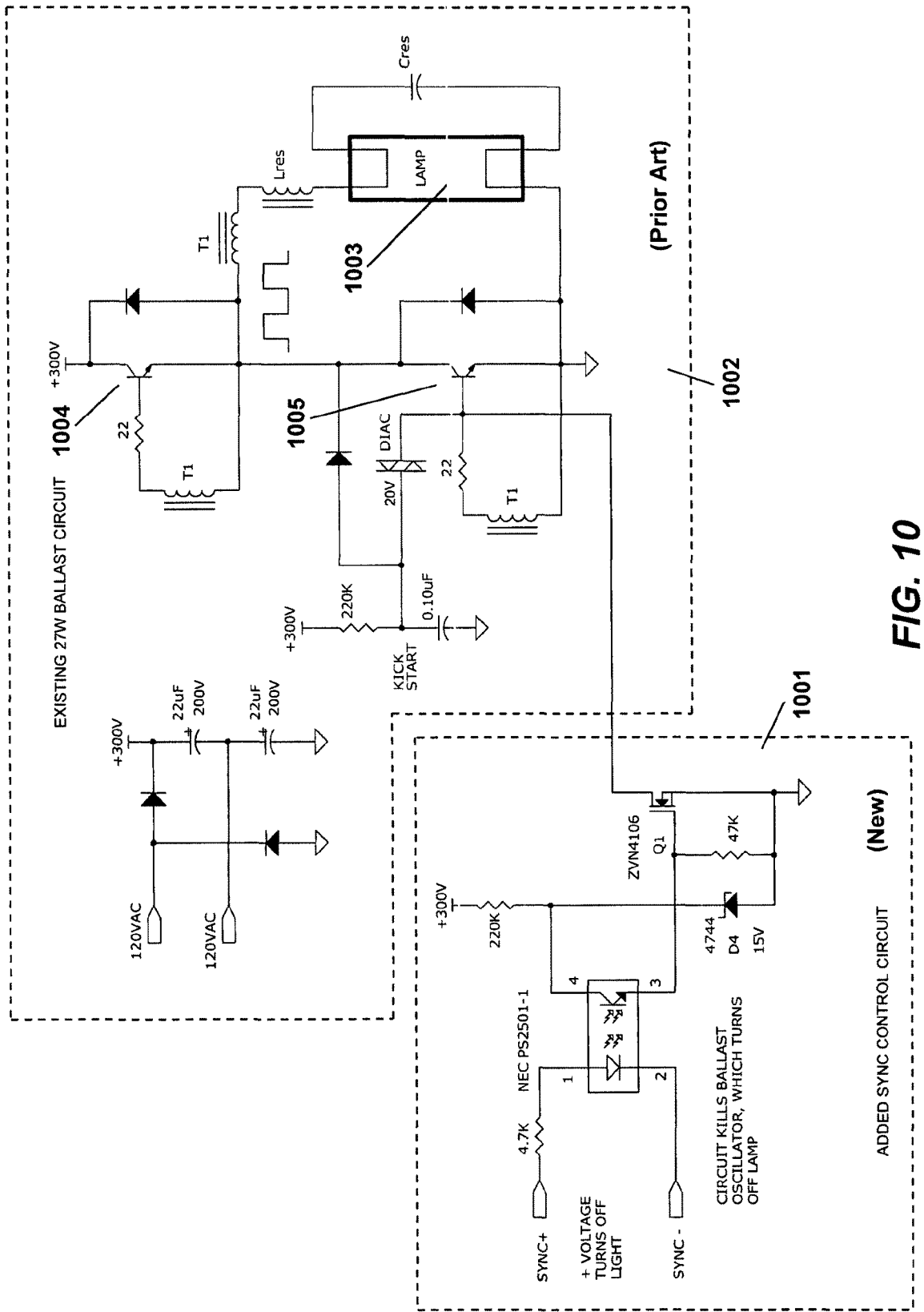
FIG. 10 is a circuit diagram of a prior art fluorescent lamp ballast as well as one embodiment of a synchronization control circuit to modify the ballast for the purposes of the present invention.

Standard fluorescent ballasts are not designed to switch fluorescent lamps on and off quickly, but it is possible to modify an existing ballast so that it does. FIG. 10 is a circuit diagram of a prior art 27 Watt fluorescent lamp ballast 1002 modified with an added sync control circuit 1001 of the present invention.

For the moment, consider only the prior art ballast circuit 1002 of FIG. 10 without the modification 1001. Prior art ballast 1002 operates in the following manner: A voltage doubler circuit converts 120 VAC from the power line into 300 volts DC. The voltage is connected to a half bridge oscillator/driver circuit, which uses two NPN power transistors 1004-1005. The half bridge driver, in conjunction with a multi-winding transformer, forms an oscillator. Two of the transformer windings provide high drive current to the two power transistors 1004-1005. A third winding of the transformer is in line with a resonant circuit, to provide the needed feedback to maintain oscillation. The half bridge driver generates a square-shaped waveform, which swings from +300 volts during one half cycle, to zero volts for the next half cycle. The square wave signal is connected to an "LC" (i.e. inductor-capacitor) series resonant circuit. The frequency of the circuit is determined by the inductance Lres and the capacitance Cres. The fluorescent lamp 1003 is connected across the resonant capacitor. The voltage induced across the resonant capacitor from the driver circuit provides the needed high voltage AC to power the fluorescent lamp 1003. To kick the circuit into oscillation, the base of the power transistor 1005 is connected to a simple relaxation oscillator circuit. Current drawn from the 300 v supply is routed through a resistor and charges up a 0.1 uF capacitor. When the voltage across the capacitor reaches about 20 volts, a DIAC (a bilateral trigger diode) quickly switches and supplies power transistor 1005 with a current spike. This spike kicks the circuit into oscillation.

Synchronization control circuit 1001 is added to modify the prior art ballast circuit 1002 described in the previous paragraph to allow rapid on-and-off control of the fluorescent lamp 1003 with a sync signal. In the illustrated embodiment in FIG. 10, a sync signal, such as sync signal 222 from FIG. 2, is electrically coupled to the SYNC+ input. SYNC− is coupled to ground. Opto-isolator NEC PS2501-1 isolates the SYNC+ and SYNC− inputs from the high voltages in the circuit. The opto-isolator integrated circuit consists of a light emitting diode (LED) and a phototransistor. The voltage differential between SYNC+ and SYNC− when the sync signal coupled to SYNC+ is at a high level (e.g. $\geq 2.0V$) causes the LED in the opto-isolator to illuminate and turn on the phototransistor in the opto-isolator. When this phototransistor is turned on, voltage is routed to the gate of an n-channel MOSFET Q1 (Zetex Semiconductor ZVN4106F DMOS FET). MOSFET Q1 functions as a low resistance switch, shorting out the base-emitter voltage of power transistor 1005 to disrupt the oscillator, and turn off fluorescent lamp 1003. To turn the fluorescent lamp back on, the sync signal (such as 222) is brought to a low level (e.g. <0.8V), causing the LED in the opto-isolator to turn off, which turns off the opto-isolator phototransistor, which turns off MOSFET Q1 so it no longer shorts out the base-emitter voltage of power transistor 1005. This allows the kick start circuit to initialize ballast oscillation, and the fluorescent lamp 1003 illuminates.

This process repeats as the sync signal coupled to SYNC+ oscillates between high and low level. The synch control circuit 1001 combined with prior art ballast 1002 will switch fluorescent lamp 1003 on and off reliably, well in excess of 120 flashes per second. It should be noted that the underlying principles of the invention are not limited to the specific set of circuits illustrated in FIG. 10.

Figure 11:
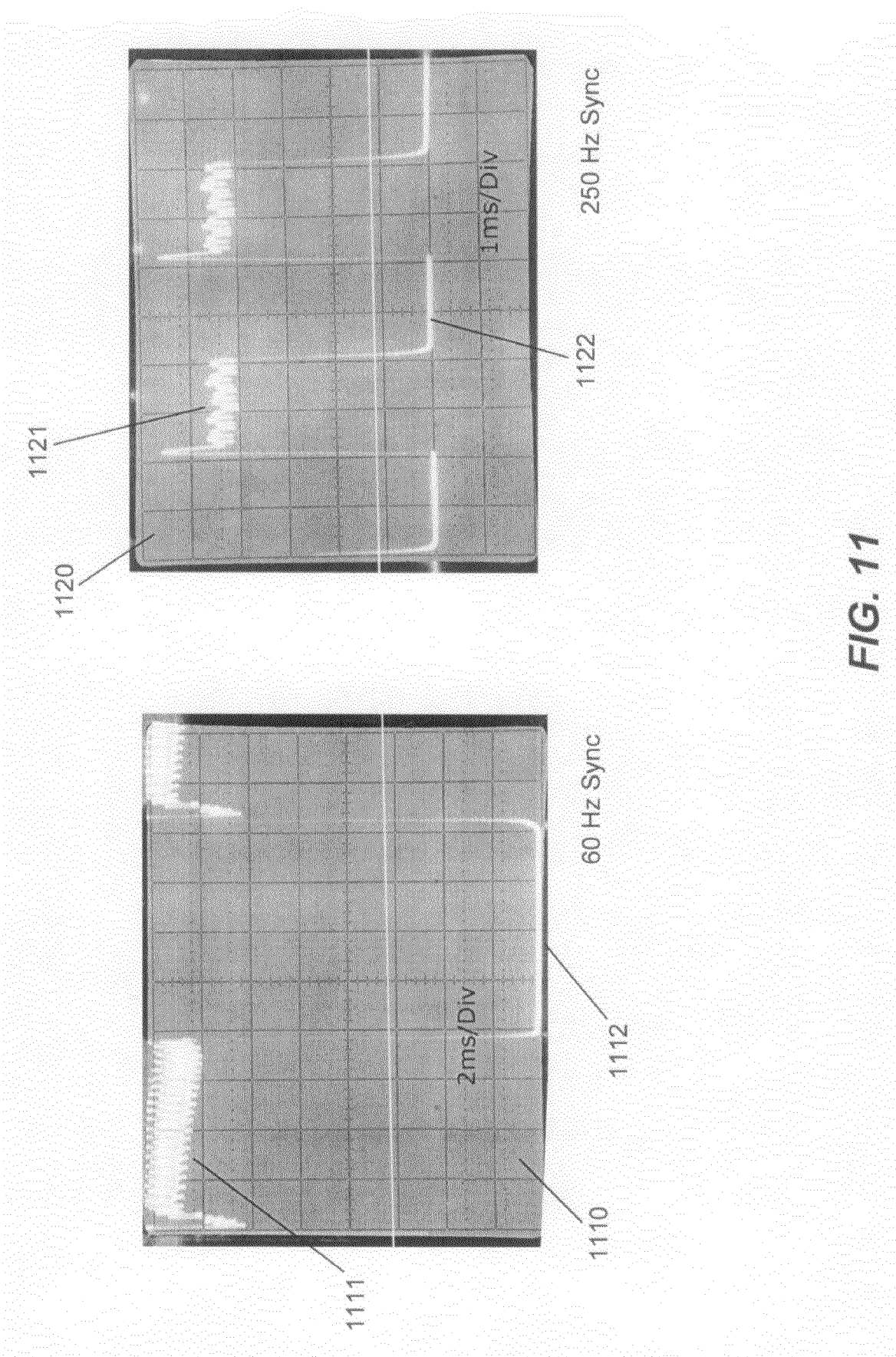
FIG. 11 is oscilloscope traces showing the light output of a fluorescent lamp driven by a fluorescent lamp ballast modified by the synchronization control circuit of FIG. 9.

FIG. 11 shows the light output of fluorescent lamp 1003 when synch control circuit 1001 is coupled to prior art ballast 1002 and a sync signal 222 is coupled to circuit 1001 as described in the previous paragraph. Traces 1110 and 1120 are oscilloscope traces of the output of a photodiode placed on the center of the bulb of a fluorescent lamp using the prior art ballast circuit 1002 modified with the sync control circuit 1001 of the present invention. The vertical axis indicates the brightness of lamp 1003 and the horizontal axis is time. Trace 1110 (with 2 milliseconds/division) shows the light output of fluorescent lamp 1003 when sync signal 222 is producing a 60 Hz square wave. Trace 1120 (with the oscilloscope set to 1 millisecond/division and the vertical brightness scale reduced by 50%) shows the light output of lamp 1003 under the same test conditions except now sync signal 222 is producing a 250 Hz square wave. Note that the peak 1121 and minimum 1122 (when lamp 1003 is off and is almost completely dark) are still both relatively flat, even at a much higher switching frequency. Thus, the sync control circuit 1001 modification to prior art ballast 1002 produces dramatically different light output than the unmodified ballast 1002, and makes it possible to achieve on and off switching of fluorescent lamps at high frequencies as required by the motion capture system illustrated in FIG. 2 with timing similar to that of FIG. 3.

Although the modified circuit shown in FIG. 10 will switch a fluorescent lamp 1003 on and off rapidly enough for the requirements of a motion capture system such as that illustrated in FIG. 2, there are certain properties of fluorescent lamps that may be modified for use in a practical motion capture system.

Figure 12:
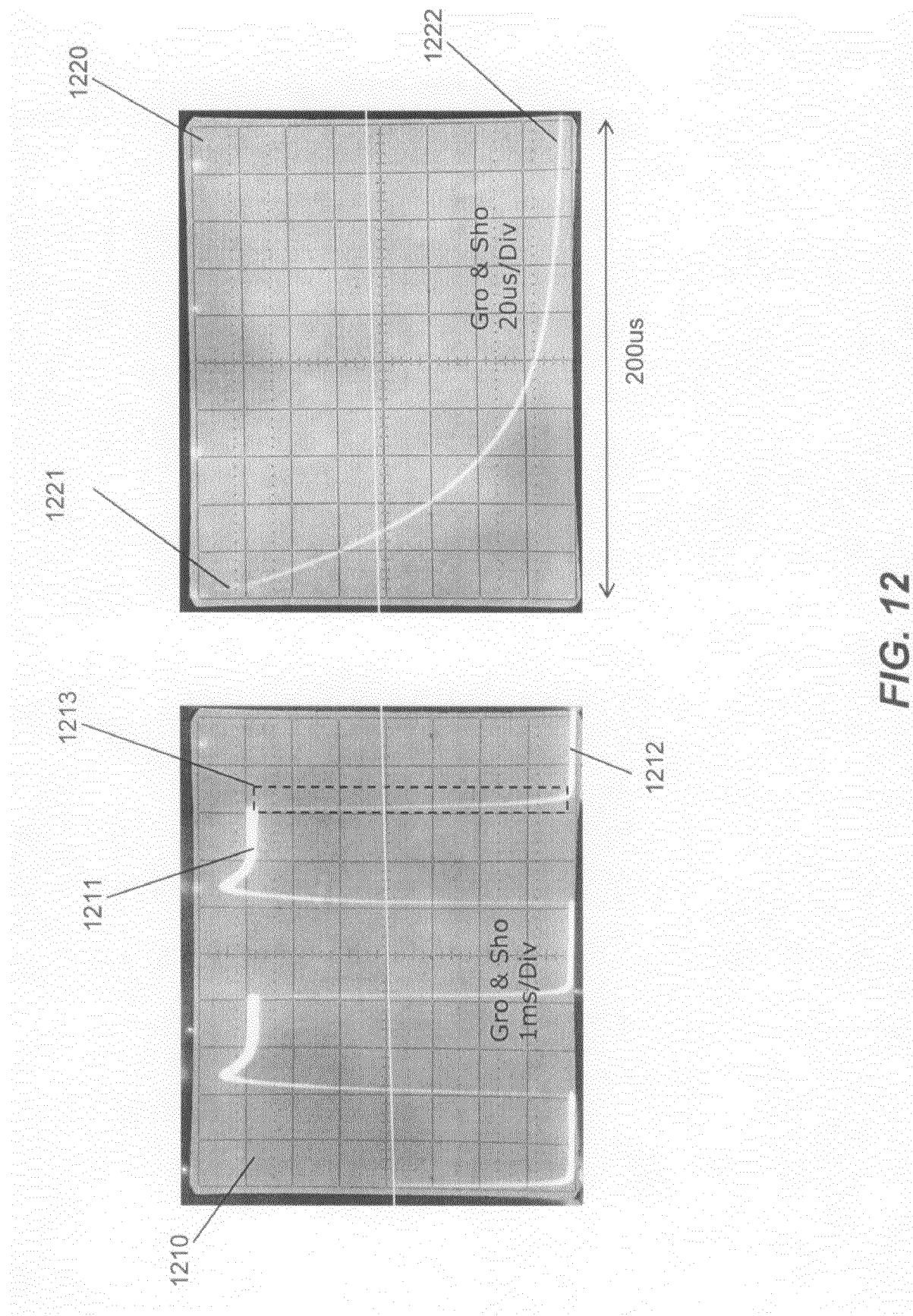
FIG. 12 is oscilloscope traces showing the decay curve of the light output of a fluorescent lamp driven by a fluorescent lamp ballast modified by the synchronization control circuit of FIG. 9.

FIG. 12 illustrates one of these properties. Traces 1210 and 1220 are the oscilloscope traces of the light output of a General Electric Gro and Sho fluorescent lamp 1003 placed in circuit 1002 modified by circuit 1001, using a photodiode placed on the center of the bulb. Trace 1210 shows the light output at 1 millisecond/division, and Trace 1220 shows the light output at 20 microseconds/division. The portion of the waveform shown in Trace 1220 is roughly the same as the dashed line area 1213 of Trace 1210. Sync signal 222 is coupled to circuit 1002 as described previously and is producing a square wave at 250 Hz. Peak level 1211 shows the light output when lamp 1003 is on and minimum 1212 shows the light output when lamp 1003 is off. While Trace 1210 shows the peak level 1211 and minimum 1212 as fairly flat, upon closer inspection with Trace 1220, it can be seen that when the lamp 1003 is turned off, it does not transition from fully on to completely off instantly. Rather, there is a decay curve of approximately 200 microseconds (0.2 milliseconds) in duration. This is apparently due to the decay curie of the phosphor coating the inside of the fluorescent bulb (i.e. when the lamp 1003 is turned off, the phosphor continues to fluoresce for a brief period of time). So, when sync signal 222 turns off the modified ballast 1001-1002, unlike LED lights which typically switch off within a microsecond, fluorescent lamps take a short interval of time until they decay and become dark.

There exists a wide range of decay periods for different brands and types of fluorescent lamps, from as short as 200 microseconds, to as long as over a millisecond. To address this property of fluorescent lamps, one embodiment of the invention adjusts signals 221-223. This embodiment will be discussed shortly.

Another property of fluorescent lamps that impacts their usability with a motion capture system such as that illustrated in FIG. 2 is that the electrodes within the bulb are effectively incandescent filaments that glow when they carry current through them, and like incandescent filaments, they continue to glow for a long time (often a second or more) after current is removed from them. So, even if they are switched on and off rapidly (e.g. at 90 Hz) by sync signal 222 using ballast 1002 modified by circuit 1001, they continue to glow for the entire dark interval 302. Although the light emitted from the fluorescent bulb from the glowing electrodes is very dim relative to the fully illuminated fluorescent bulb, it is still is a significant amount of light, and when many fluorescent bulbs are in use at once, together the electrodes add up to a significant amount of light contamination during the dark interval 302, where it is advantageous for the room to be as dark as possible.

Figure 13:
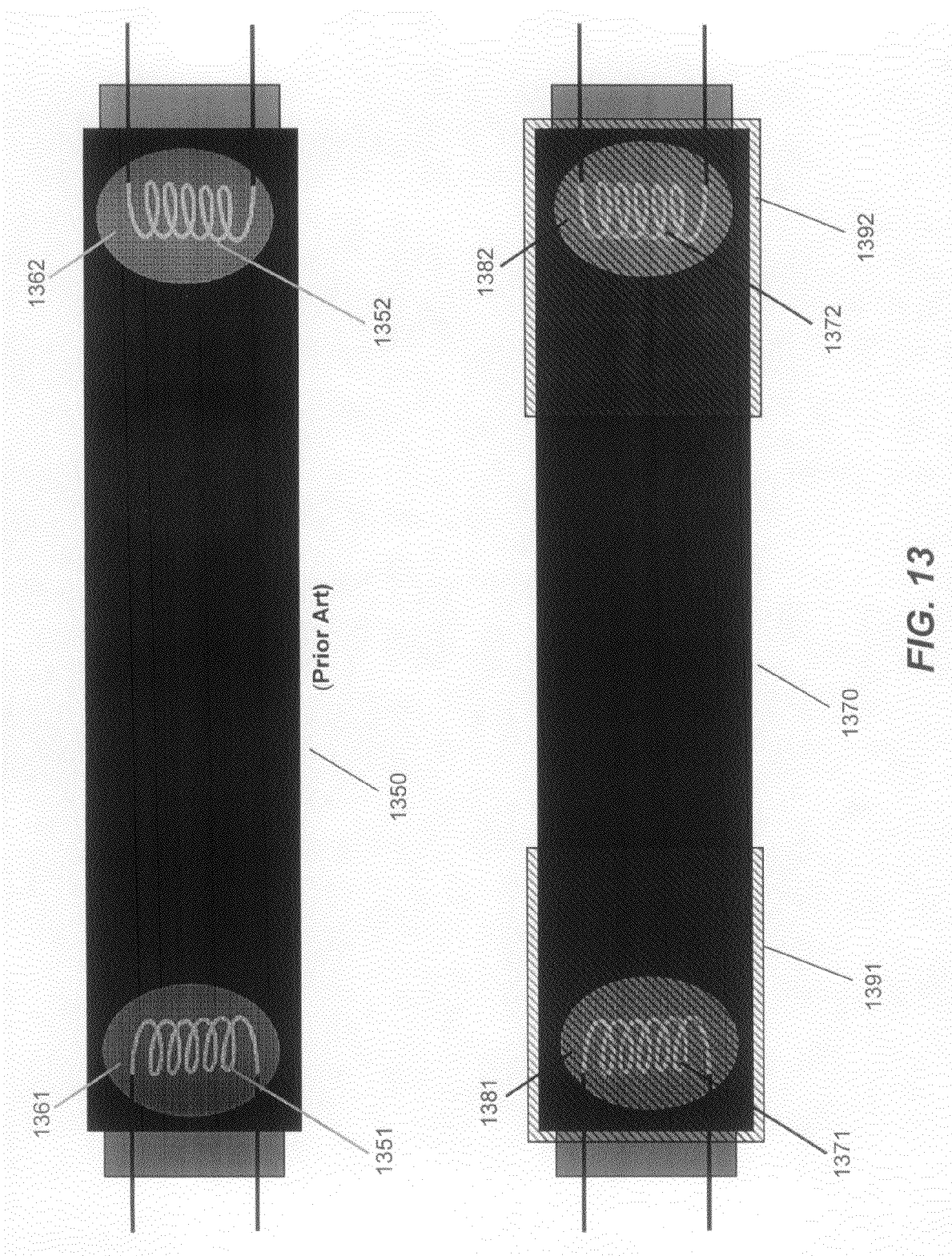
FIG. 13 is a illustration of the afterglow of a fluorescent lamp filament and the use of gaffer's tape to cover the filament.

FIG. 13 illustrates one embodiment of the invention which addresses this problem. Prior art fluorescent lamp 1350 is shown in a state 10 milliseconds after the lamp as been shut off. The mercury vapor within the lamp is no longer emitting ultraviolet light and the phosphor lining the inner surface of the bulb is no longer emitting a significant amount of light. But the electrodes 1351-1352 are still glowing because they are still hot. This electrode glowing results in illuminated regions 1361-1362 near the ends of the bulb of fluorescent lamp 1350.

Fluorescent lamp 1370 is a lamp in the same state as prior art lamp 1350, 10 milliseconds after the bulb 1370 has been shut off, with its electrodes 1371-1372 still glowing and producing illuminated regions 1381-1382 near the ends of the bulb of fluorescent lamp 1370, but unlike prior art lamp 1350, wrapped around the ends of lamp 1370 is opaque tape 1391 and 1392 (shown as see-through with slanted lines for the sake of illustration). In the presently preferred embodiment black gaffers' tape is used, such as 4" P-665 from Permacel, A Nitto Denko Company, US Highway No. 1, P.O. Box 671, New Brunswick, N.J. 08903. The opaque tape 1391-1392 serves to block almost all of the light from glowing electrodes 1371-1372 while blocking only a small amount of the overall light output of the fluorescent lamp when the lamp is on during lit interval 301. This allows the fluorescent lamp to become much darker during dark interval 302 when being flashed on and off at a high rate (e.g. 90 Hz). Other techniques can be used to block the light from the glowing electrodes, including other types of opaque tape, painting the ends of the bulb with an opaque paint, or using an opaque material (e.g. sheets of black metal) on the light fixtures holding the fluorescent lamps so as to block the light emission from the parts of the fluorescent lamps containing electrodes.

Returning now to the light decay property of fluorescent lamps illustrated in FIG. 12, if fluorescent lamps are used for light panels 208-209, the synchronization signal timing shown in FIG. 3 will not produce optimal results because when Light Panel sync signal 222 drops to a low level on edge 332, the fluorescent light panels 208-209 will take time to become completely dark (i.e. edge 342 will gradually drop to dark level). If the Dark Cam Sync Signal triggers the grayscale cameras 204-205 to open their shutters at the same time as edge 322, the grayscale camera will capture some of the scene lit by the afterglow of light panels 208-209 during its decay interval. Clearly, FIG. 3's timing signals and light output behavior is more suited for light panels 208-209 using a lighting source like LEDs that have a much faster decay than fluorescent lamps.

Synchronization Timing for Fluorescent Lamps

Figure 14:
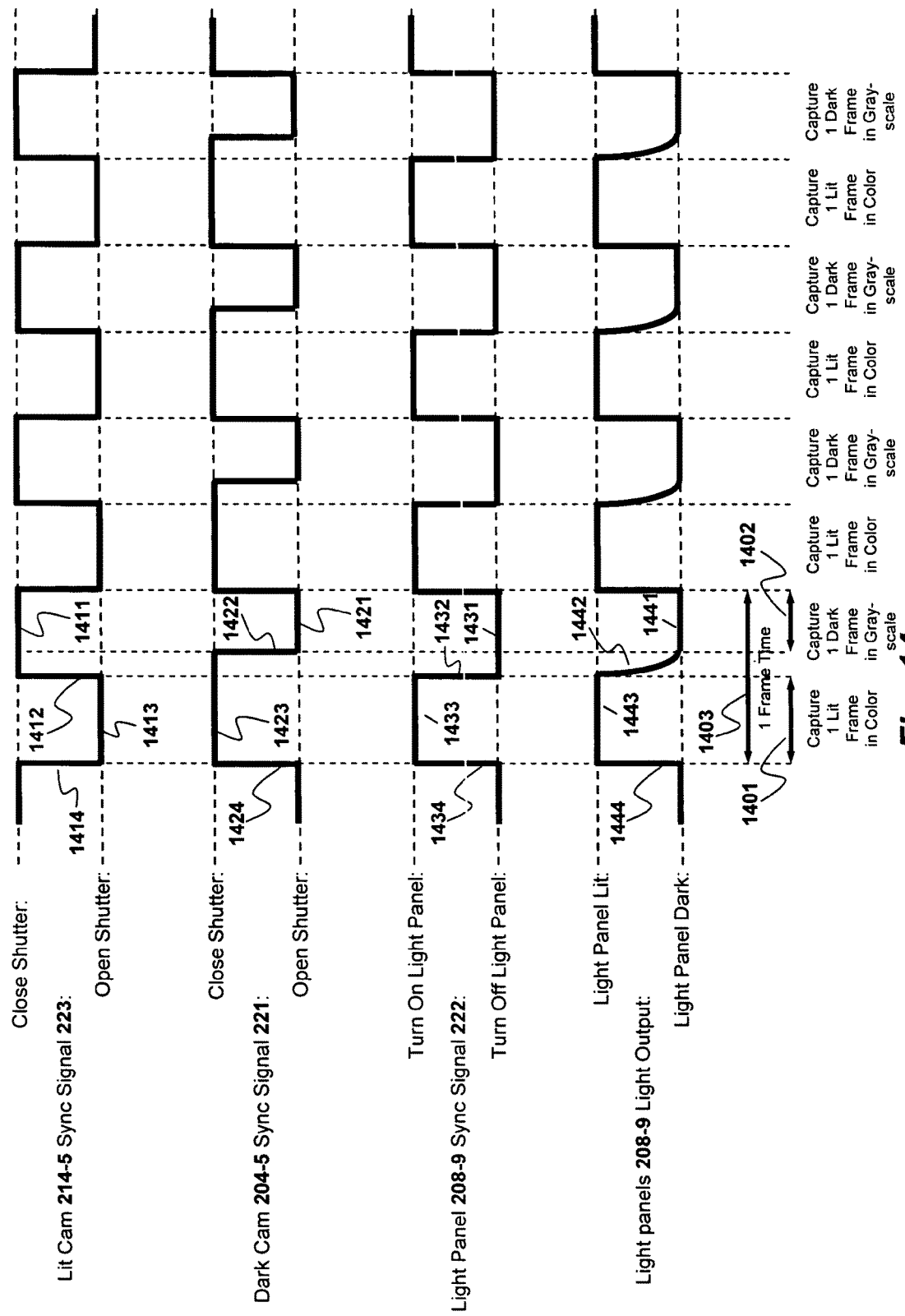
FIG. 14 is a timing diagram illustrating the synchronization between the light panels and the shutters according to one embodiment of the invention.

FIG. 14 shows timing signals which are better suited for use with fluorescent lamps and the resulting light panel 208-209 behavior (note that the duration of the decay curve 1442 is exaggerated in this and subsequent timing diagrams for illustrative purposes). The rising edge 1434 of sync signal 222 is roughly coincident with rising edge 1414 of lit cam sync signal 223 (which opens the lit camera 214-215 shutters) and with falling edge 1424 of dark cam sync signal 223 (which closes the dark camera 204-205 shutters). It also causes the fluorescent lamps in the light panels 208-209 to illuminate quickly. During lit time interval 1401, the lit cameras 214-215 capture a color image illuminated by the fluorescent lamps, which are emitting relatively steady light as shown by light output level 1443.

At the end of lit time interval 1401, the falling edge 1432 of sync signal 222 turns off light panels 208-209 and is roughly coincident with the rising edge 1412 of lit cam sync signal 223, which closes the shutters of the lit cameras 214-215. Note, however, that the light output of the light panels 208-209 does not drop from lit to dark immediately, but rather slowly drops to dark as the fluorescent lamp phosphor decays as shown by edge 1442. When the light level of the fluorescent lamps finally reaches; dark level 1441, dark cam sync signal 221 is dropped from high to low as shown by edge 1422, and this opens the shutters of dark cameras 204-205. This way the dark cameras 204-205 only capture the emissions from the phosphorescent makeup, paint or dye, and do not capture the reflection of light from any objects illuminated by the fluorescent lamps during the decay interval 1442. So, in this embodiment the dark interval 1402 is shorter than the lit interval 1401, and the dark camera 204-205 shutters are open for a shorter period of time than the lit camera 214-215 shutters.

Figure 15:
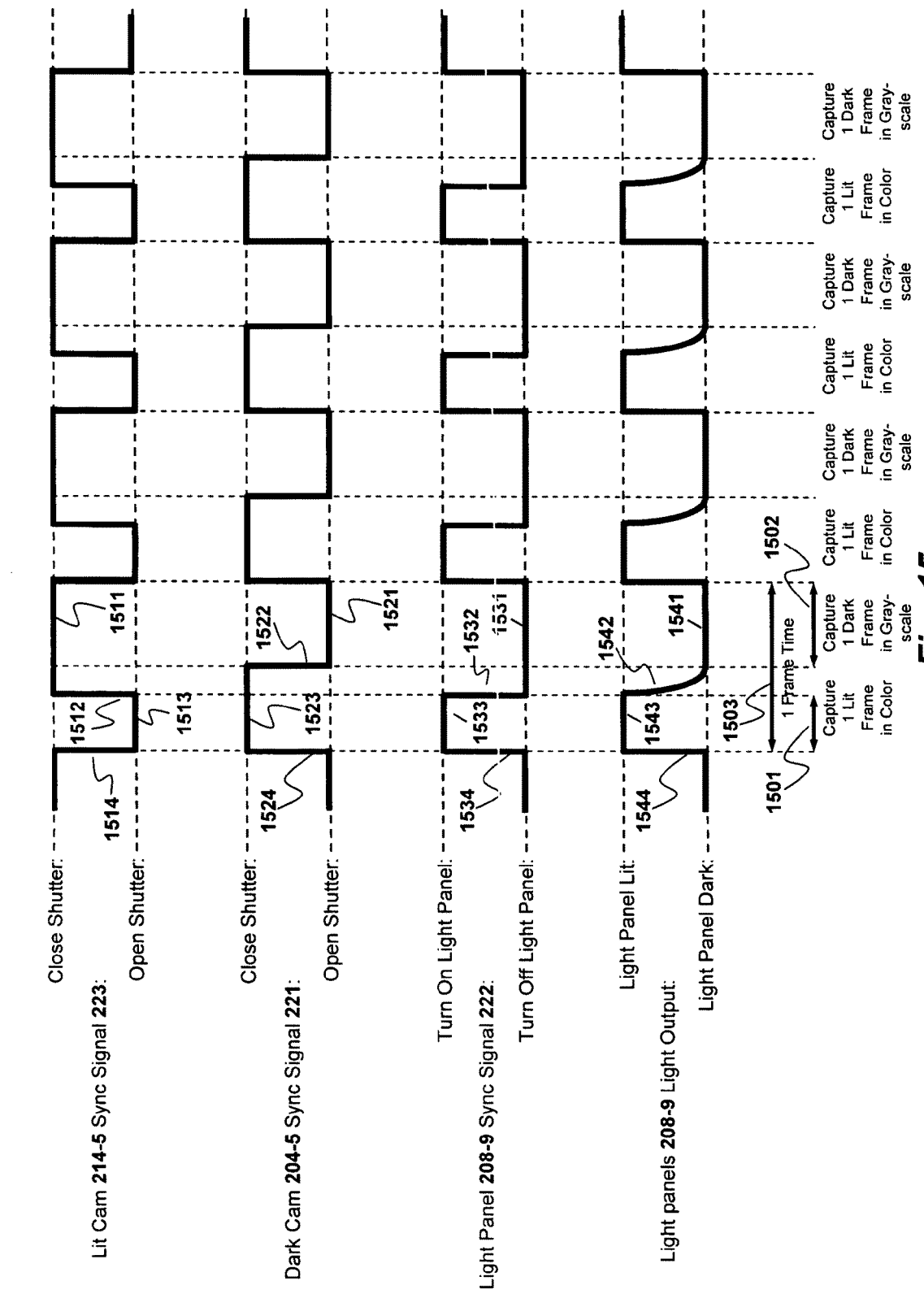
FIG. 15 is a timing diagram illustrating the synchronization between the light panels and the shutters according to one embodiment of the invention.

Another embodiment is illustrated in FIG. 15 where the dark interval 1502 is longer than the lit interval 1501. The advantage of this embodiment is it allows for a longer shutter time for the dark cameras 204-205. In this embodiment, light panel sync signal 222 falling edge 1532 occurs earlier which causes the light panels 208-209 to turn off. Lit cam sync signal 223 rising edge 1512 occurs roughly coincident with falling edge 1532 and closes the shutters on the lit cameras 214-5. The light output from the light panel 208-209 fluorescent lamps begins to decay as shown by edges 1542 and finally reaches dark level 1541. At this point dark cam sync signal 221 is transitions to a low state on edge 1522, and the dark cameras 204-205 open their shutters and capture the phosphorescent emissions.

Note that in the embodiments shown in both FIGS. 14 and 15 the lit camera 214-215 shutters were only open while the light output of the light panel 208-209 fluorescent lamps was at maximum. In another embodiment, the lit camera 214-215 shutters can be open during the entire time the fluorescent lamps are emitting any light, so as to maximize the amount of light captured. In this situation, however, the phosphorescent makeup, paint or dye in the scene will become more prominent relative to the non-phosphorescent areas in the scene because the phosphorescent areas will continue to emit light fairly steadily during the fluorescent lamp decay while the non-phosphorescent areas will steadily get darker. The lit cameras 214-215 will integrate this light during the entire time their shutters are open.

In yet another embodiment the lit cameras 214-215 leave their shutters open for some or all of the dark time interval 1502. In this case, the phosphorescent areas in the scene will appear very prominently relative to the non-phosphorescent areas since the lit cameras 214-215 will integrate the light during the dark time interval 1502 with the light from the lit time interval 1501.

Because fluorescent lamps are generally not sold with specifications detailing their phosphor decay characteristics, it is necessary to determine the decay characteristics of fluorescent lamps experimentally. This can be readily done by adjusting the falling edge 1522 of sync signal 221 relative to the falling edge 1532 of sync signal 222, and then observing the output of the dark cameras 204-205. For example, in the embodiment shown in FIG. 15, if edge 1522 falls too soon after edge 1532 during the fluorescent light decay 1542, then non-phosphorescent objects will be captured in the dark cameras 204-205. If the edge 1522 is then slowly delayed relative to edge 1532, the non-phosphorescent objects in dark camera 204-205 will gradually get darker until the entire image captured is dark, except for the phosphorescent objects in the image. At that point, edge 1522 will be past the decay interval 1542 of the fluorescent lamps. The process described in this paragraph can be readily implemented in an application on a general-purpose computer that controls the output levels of sync signals 221-223.

In another embodiment the decay of the phosphor in the fluorescent lamps is such that even after edge 1532 is delayed as long as possible after 1522 to allow for the dark cameras 204-205 to have a long enough shutter time to capture a bright enough image of phosphorescent patterns in the scene, there is still a small amount of light from the fluorescent lamp illuminating the scene such that non-phosphorescent objects in the scene are slightly visible. Generally, this does not present a problem for the pattern processing techniques described in the co-pending applications identified above. So long as the phosphorescent patterns in the scene are substantially brighter than the dimly-lit non-fluorescent objects in the scene, the pattern processing techniques will be able to adequately correlate and process the phosphorescent patterns and treat the dimly lit non-fluorescent objects as noise.

Synchronizing Cameras with Lower Frame Rates than The Light Panel Flashing Rate

Figure 16:
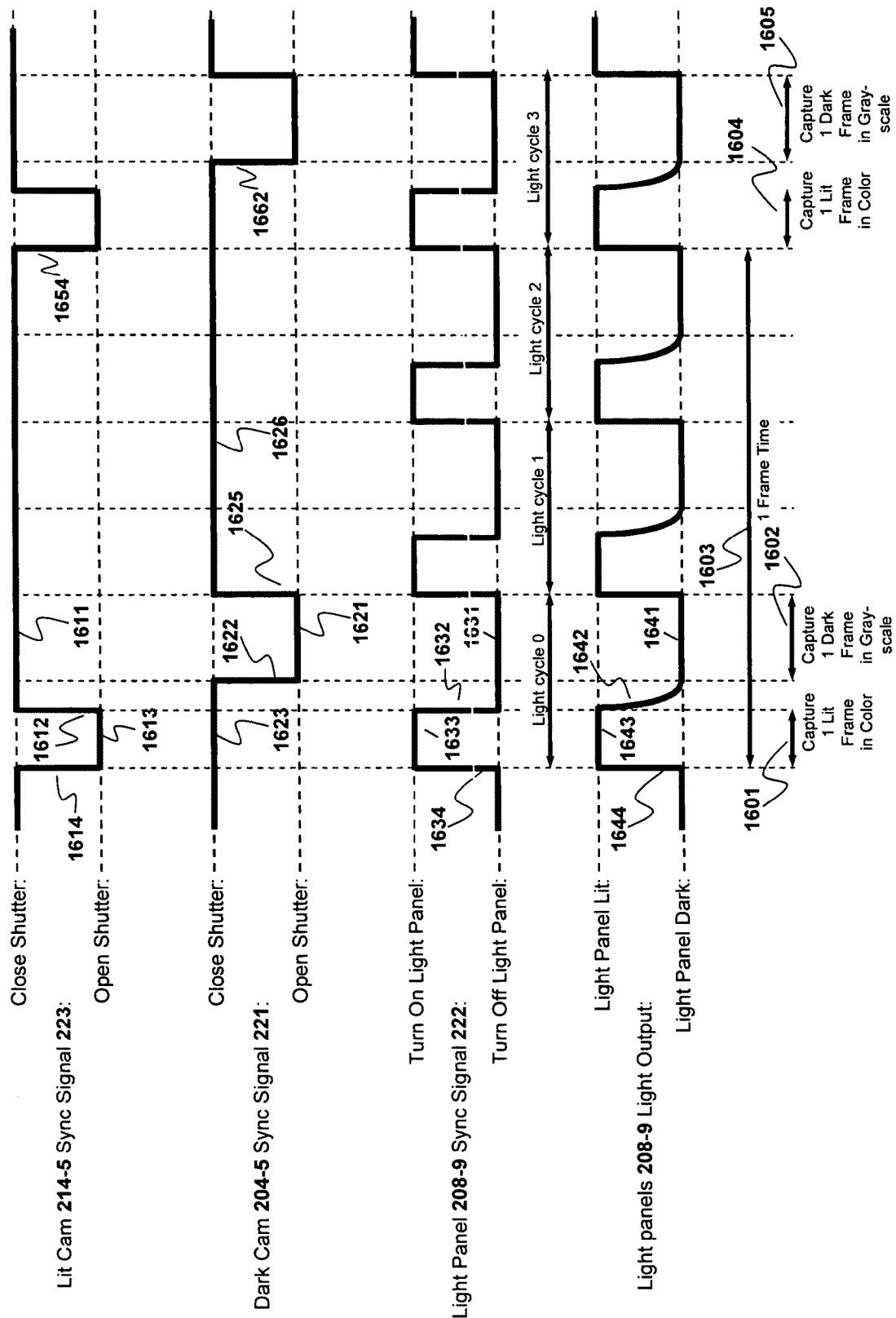
FIG. 16 is a timing diagram illustrating the synchronization between the light panels and the shutters according to one embodiment of the invention.

In another embodiment the lit cameras 214-215 and dark cameras 204-205 are operated at a lower frame rate than the flashing rate of the light panels 208-209. For example, the capture frame rate may be 30 frames per second (fps), but so as to keep the flashing of the light panels 208-209 about the threshold of human perception, the light panels 208-209 are flashed at 90 flashes per second. This situation is illustrated in FIG. 16. The sync signals 221-3 are controlled the same as the are in FIG. 15 for lit time interval 1601 and dark time interval 1602 (light cycle 0), but after that, only light panel 208-9 sync signal 222 continues to oscillate for light cycles 1 and 2. Sync signals 221 and 223 remain in constant high state 1611 and 1626 during this interval. Then during light cycle 3, sync signals 221 and 223 once again trigger with edges 1654 and 1662, opening the shutters of lit cameras 214-215 during lit time interval 1604, and then opening the shutters of dark cameras 204-205 during dark time interval 1605.

Figure 17:
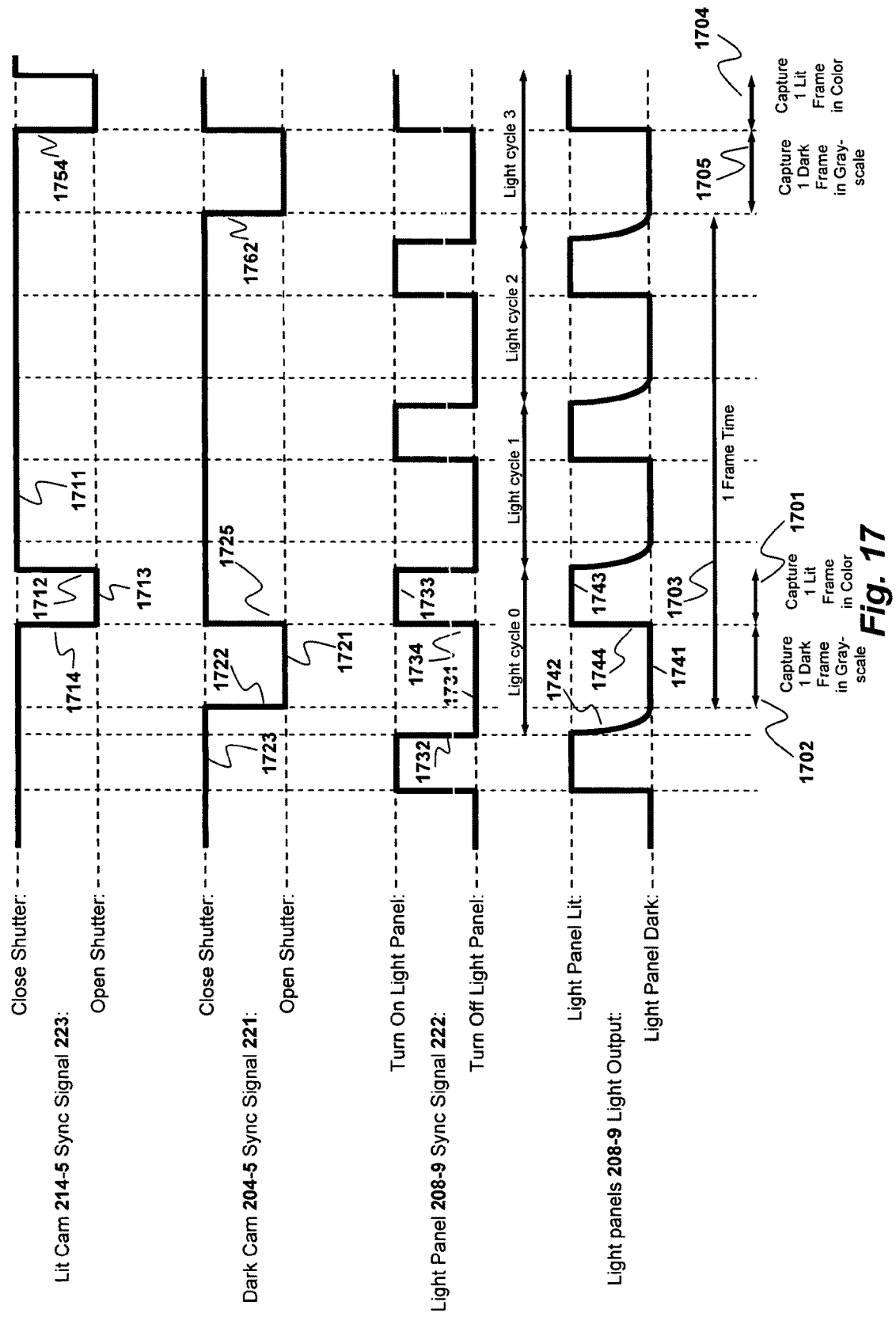
FIG. 17 is a timing diagram illustrating the synchronization between the light panels and the shutters according to one embodiment of the invention.

In another embodiment where the lit cameras 214-215 and dark cameras 204-205 are operated at a lower frame rate than the flashing rate of the light panels 208-209, sync signal 223 causes the lit cameras 214-215 to open their shutters after sync signal 221 causes the dark cameras 204-205 to open their shutters. This is illustrated in FIG. 17. An advantage of this timing arrangement over that of FIG. 16 is the fluorescent lamps transition from dark to lit (edge 1744) more quickly than they decay from lit to dark (edge 1742). This makes it possible to abut the dark frame interval 1702 more closely to the lit frame interval 1701. Since captured lit textures are often used to be mapped onto 3D surfaces reconstructed from dark camera images, the closer the lit and dark captures occur in time, the closer the alignment will be if the captured object is in motion.

Figure 18:
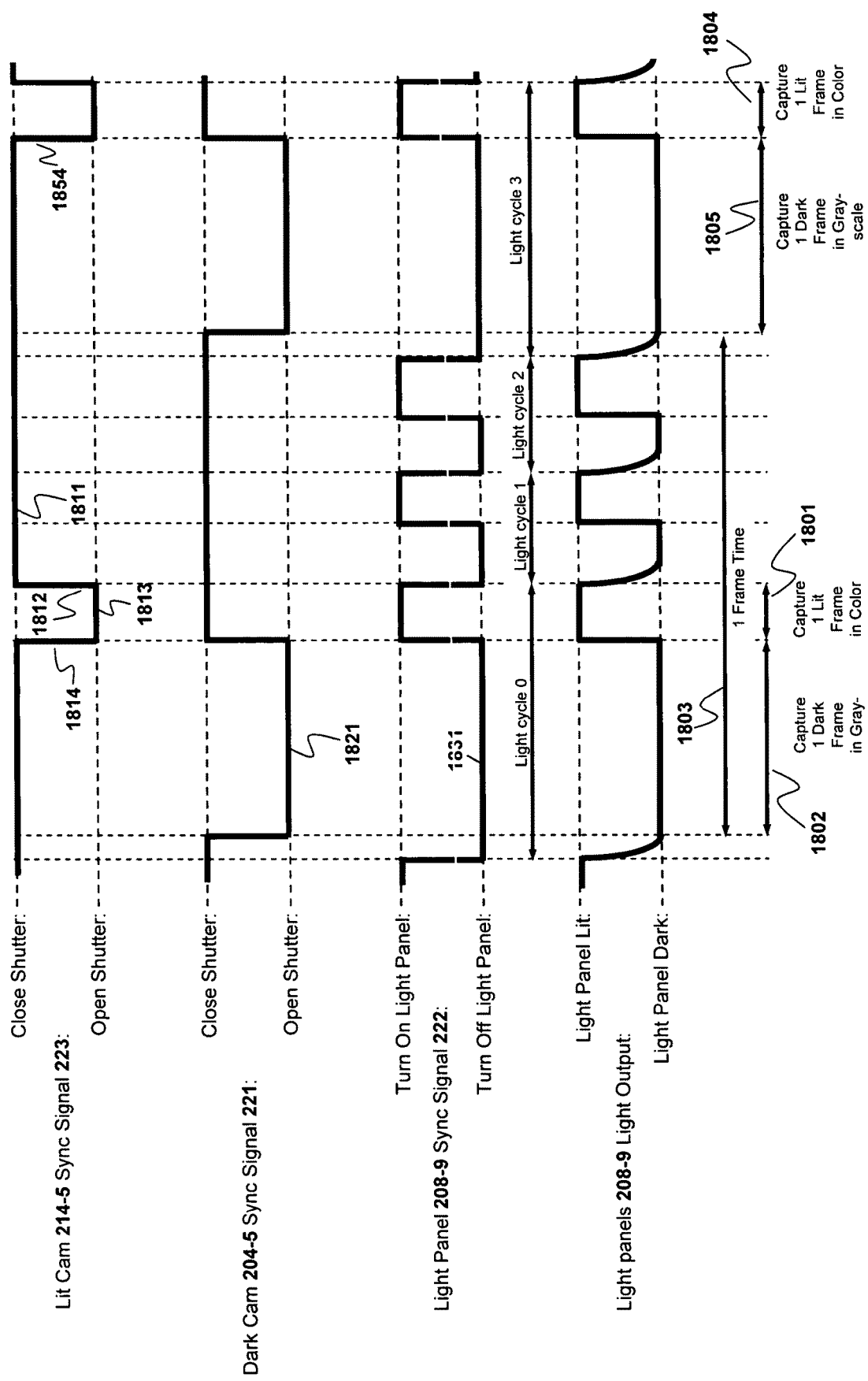
FIG. 18 is a timing diagram illustrating the synchronization between the light panels and the shutters according to one embodiment of the invention.

In another embodiment where the lit cameras 214-215 and dark cameras 204-205 are operated at a lower frame rate than the flashing rate of the light panels 208-209, the light panels 208-209 are flashed with varying light cycle intervals so as to allow for longer shutter times for either the dark cameras 204-205 or lit cameras 214-215, or to allow for longer shutters times for both cameras. An example of this embodiment is illustrated in FIG. 18 where the light panels 208-209 are flashed at 3 times the frame rate of cameras 204-205 and 214-215, but the open shutter interval 1821 of the dark cameras 204-205 is equal to almost half of the entire frame time 1803. This is accomplished by having light panel 208-209 sync signal 222 turn off the light panels 208-209 for a long dark interval 1802 while dark cam sync signal 221 opens the dark shutter for the duration of long dark interval 1802. Then sync signal 222 turns the light panels 208-209 on for a brief lit interval 1801, to complete light cycle 0 and then rapidly flashes the light panels 208-209 through light cycles 1 and 2. This results in the same number of flashes per second as the embodiment illustrated in FIG. 17, despite the much longer dark interval 1802. The reason this is a useful configuration is that the human visual system will still perceive rapidly flashing lights (e.g. at 90 flashes per second) as being lit continuously, even if there are some irregularities to the flashing cycle times. By varying the duration of the lit and dark intervals of the light panels 208-209, the shutter times of either the dark cameras 204-205, lit cameras 214-215 or both can be lengthened or shortened, while still maintaining the human perception that light panels 208-209 are continuously lit.

High Aggregate Frame Rates from Cascaded Cameras

Figure 19:
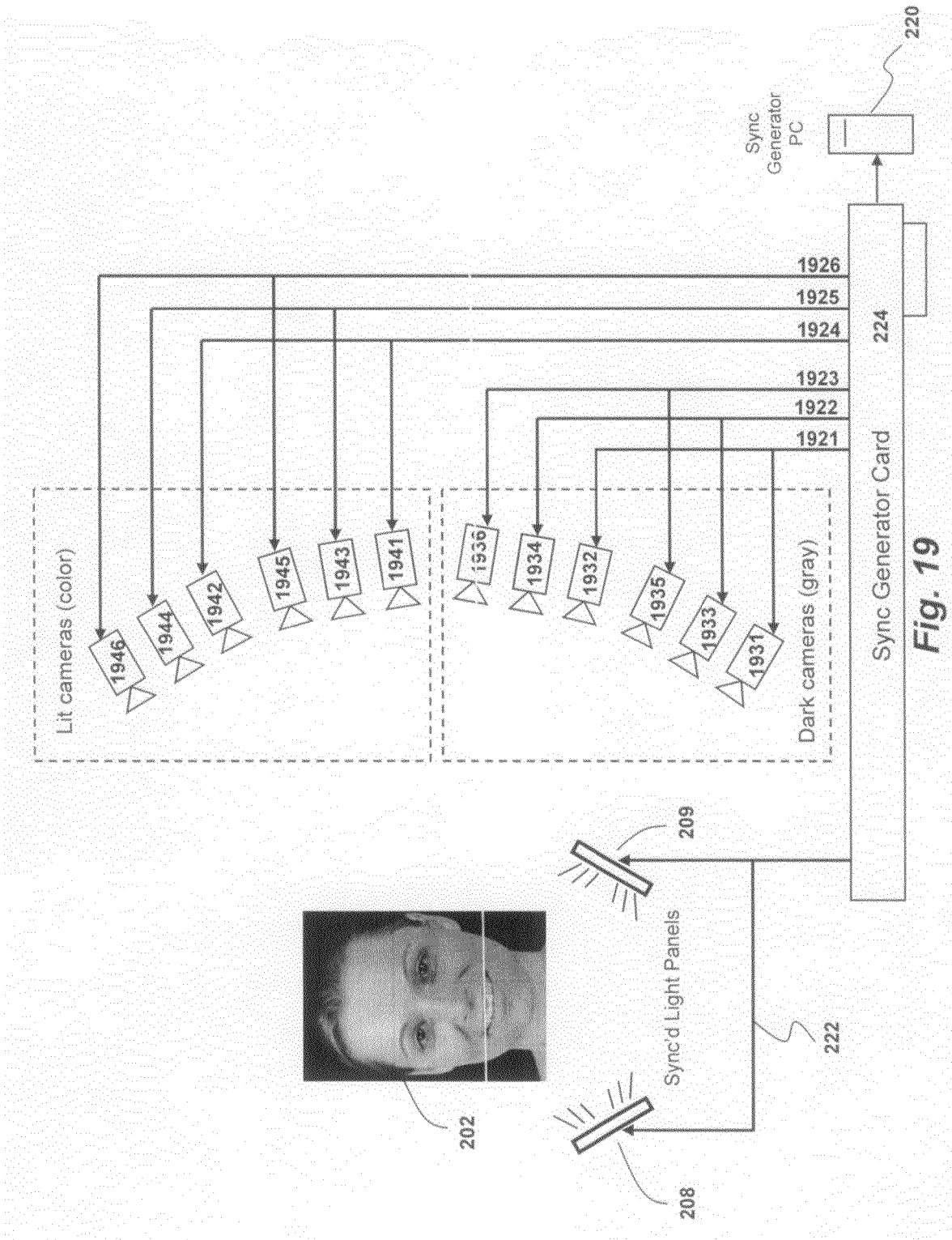
FIG. 19 illustrates one embodiment: of the camera, light panel, and synchronization subsystems of the invention during a time interval when the light panels are lit.

FIG. 19 illustrates another embodiment where lit cameras 1941-1946 and dark cameras 1931-1936 are operated at a lower frame rate than the flashing rate of the light panels 208-209. FIG. 19 illustrates a similar motion capture system configuration as FIG. 2a, but given space limitations in the diagram only the light panels, the cameras, and the synchronization subsystem is shown. The remaining components of FIG. 2a that are not shown (i.e. the interfaces from the cameras to their camera controllers and the data processing subsystem, as well as the output of the data processing subsystem) are a part of the full configuration that is partially shown in FIG. 19, and they are coupled to the components of FIG. 19 in the same manner as they are to the components of FIG. 2a. Also, FIG. 19 shows the Light Panels 208-209 in their "lit" state. Light Panels 208-209 can be switched off by sync signal 222 to their "dark" state, in which case performer 202 would no longer be lit and only the phosphorescent pattern applied to her face would be visible, as it is shown in FIG. 2b.

FIG. 19 shows 6 lit cameras 1941-1946 and 6 dark cameras 1931-1936. In the presently preferred embodiment color cameras are used for the lit cameras 1941-1946 and grayscale cameras are used for the dark camera 1931-1936, but either type could be used for either purpose. The shutters on the cameras 1941-1946 and 1931-1936 are driven by sync signals 1921-1926 from sync generator PCI card 224. The sync generator card is installed in sync generator PC 220, and operates as previously described. (Also, in another embodiment it may be replaced by using the parallel port outputs of sync generator PC 220 to drive sync signals 1921-1926, and in this case, for example, bit 0 of the parallel port would drive sync signal 222, and bits 1-6 of the parallel port would drive sync signals 1921-1926, respectively.)

Figure 20:
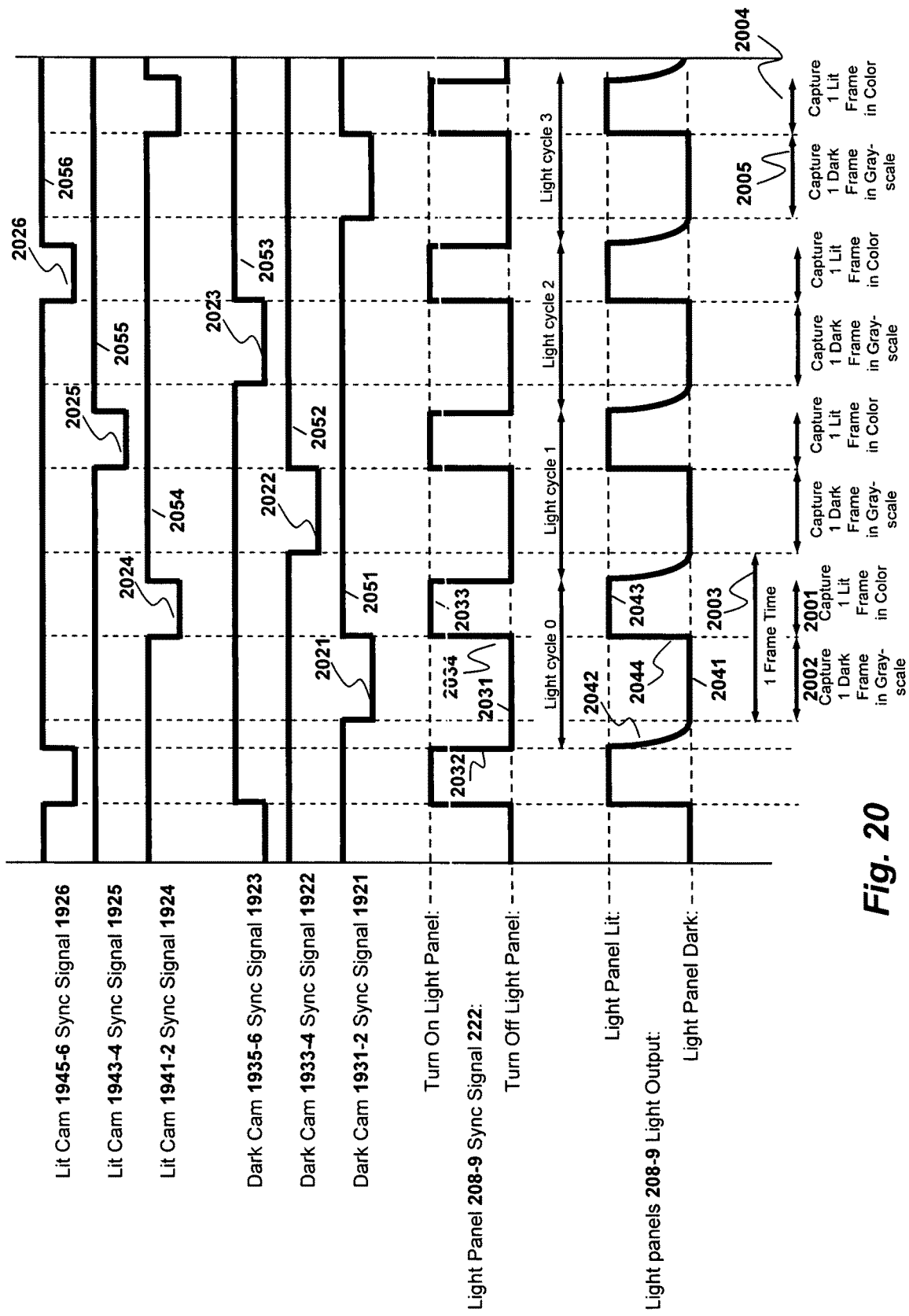
FIG. 20 is a timing diagram illustrating the synchronization between the light panels and the shutters according to one embodiment of the invention.

Unlike the previously described embodiments, where there is one sync signal 221 for the dark cameras and one sync signal 223 for the lit cameras, in the embodiment illustrated in FIG. 19, there are 3 sync signals 1921-1923 for the dark cameras and 3 sync signals 1924-1926 for the dark cameras. The timing for these sync signals 1921-1926 is shown in FIG. 20. When the sync signals 1921-1926 are in a high state they causes the shutters of the cameras attached to them to be closed, when the sync signals are in a low state, they cause the shutters of the cameras attached to them to be open.

In this embodiment, as shown in FIG. 20, the light panels 208-209 are flashed at a uniform 90 flashes per second, as controlled by sync signal 222. The light output of the light panels 208-209 is also shown, including the fluorescent lamp decay 2042. Each camera 1931-1936 and 1941-1946 captures images at 30 frames per second (fps), exactly at a 1:3 ratio with the 90 flashes per second rate of the light panels. Each camera captures one image per each 3 flashes of the light panels, and their shutters are sequenced in a "cascading" order, as illustrated in FIG. 20. A sequence of 3 frames is captured in the following manner:

Sync signal 222 transitions with edge 2032 from a high to low state 2031. Low state 2031 turns off light panels 208-209, which gradually decay to a dark state 2041 following decay curve 2042. When the light panels are sufficiently dark for the purposes of providing enough contrast to separate the phosphorescent makeup, paint, or dye from the non-phosphorescent surfaces in the scene, sync signal 1921 transitions to low state 2021. This causes dark cameras 1931-1932 to open their shutters and capture a dark frame. After the time interval 2002, sync signal 222 transitions with edge 2034 to high state 2033 which causes the light panels 208-209 to transition with edge 2044 to lit state 2043. Just prior to light panels 208-209 becoming lit, sync signal 1921 transitions to high state 2051 closing the shutter of dark cameras 1931-1932. Just after the light panels 208-209 become lit, sync signal 1924 transition to low state 2024, causing the shutters on the lit cameras 1941-1942 to open during time interval 2001 and capture a lit frame. Sync signal 222 transitions to a low state, which turns off the light panels 208-9, and sync signal 1924 transitions to a high state at the end of time interval 2001, which closes the shutters on lit cameras 1941-1942.

The sequence of events described in the preceding paragraphs repeats 2 more times, but during these repetitions sync signals 1921 and 1924 remain high, keeping their cameras shutters closed. For the first repetition, sync signal 1922 opens the shutter of dark cameras 1933-1934 while light panels 208-209 are dark and sync signal 1925 opens the shutter of lit cameras 1943-1944 while light panels 208-209 are lit. For the second repetition, sync signal 1923 opens the shutter of dark cameras 1935-1936 while light panels 208-209 are dark and sync signal 1926 opens the shutter of lit cameras 1945-1946 while light panels 208-209 are lit.

Then, the sequence of events described in the prior 2 paragraphs continues to repeat while the motion capture session illustrated in FIG. 19 is in progress, and thus a "cascading" sequence of camera captures allows 3 sets of dark and 3 sets of lit cameras to capture motion at 90 fps (i.e. equal to the light panel flashing rate of 90 flashes per second), despite the fact each cameras is only capturing images at 30 fps. Because each camera only captures 1 of every 3 frames, the captured frames stored by the data processing system 210 are then interleaved so that the stored frame sequence at 90 fps has the frames in proper order in time. After that interleaving operation is complete, the data processing system will output reconstructed 3D surfaces 207 and textured 3D surfaces 217 at 90 fps.

Although the "cascading" timing sequence illustrated in FIG. 20 will allow cameras to operate at 30 fps while capturing images at an aggregate rate of 90 fps, it may be desirable to be able to switch the timing to sometimes operate all of the cameras 1921-1923 and 1924-1926 synchronously. An example of such a situation is for the determination of the relative position of the cameras relative to each other. Precise knowledge of the relative positions of the dark cameras 1921-

1923 is used for accurate triangulation between the cameras, and precise knowledge of the position of the lit cameras 1924-1926 relative to the dark cameras 1921-1923 is used for establishing how to map the texture maps captured by the lit cameras 1924-1926 onto the geometry reconstructed from the images captured by the dark cameras 1921-1923. One prior art method (e.g. that is used to calibrate cameras for the motion capture cameras from Motion Analysis Corporation) to determine the relative position of fixed cameras is to place a known object (e.g. spheres on the ends of a rods in a rigid array) within the field of view of the cameras, and then synchronously (i.e. with the shutters of all cameras opening and closing simultaneously) capture successive frames of the image of that known object by all the cameras as the object is in motion. By processing successive frames from all of the cameras, it is possible to calculate the relative position of the cameras to each other. But for this method to work, all of the cameras need to be synchronized so that they capture images simultaneously. If the camera shutters do not open simultaneously, then when each non-simultaneous shutter opens, its camera will capture the moving object at a different position in space than other cameras whose shutters open at different times. This will make it more difficult (or impossible) to precisely determine the relative position of all the cameras to each other.

Figure 21:
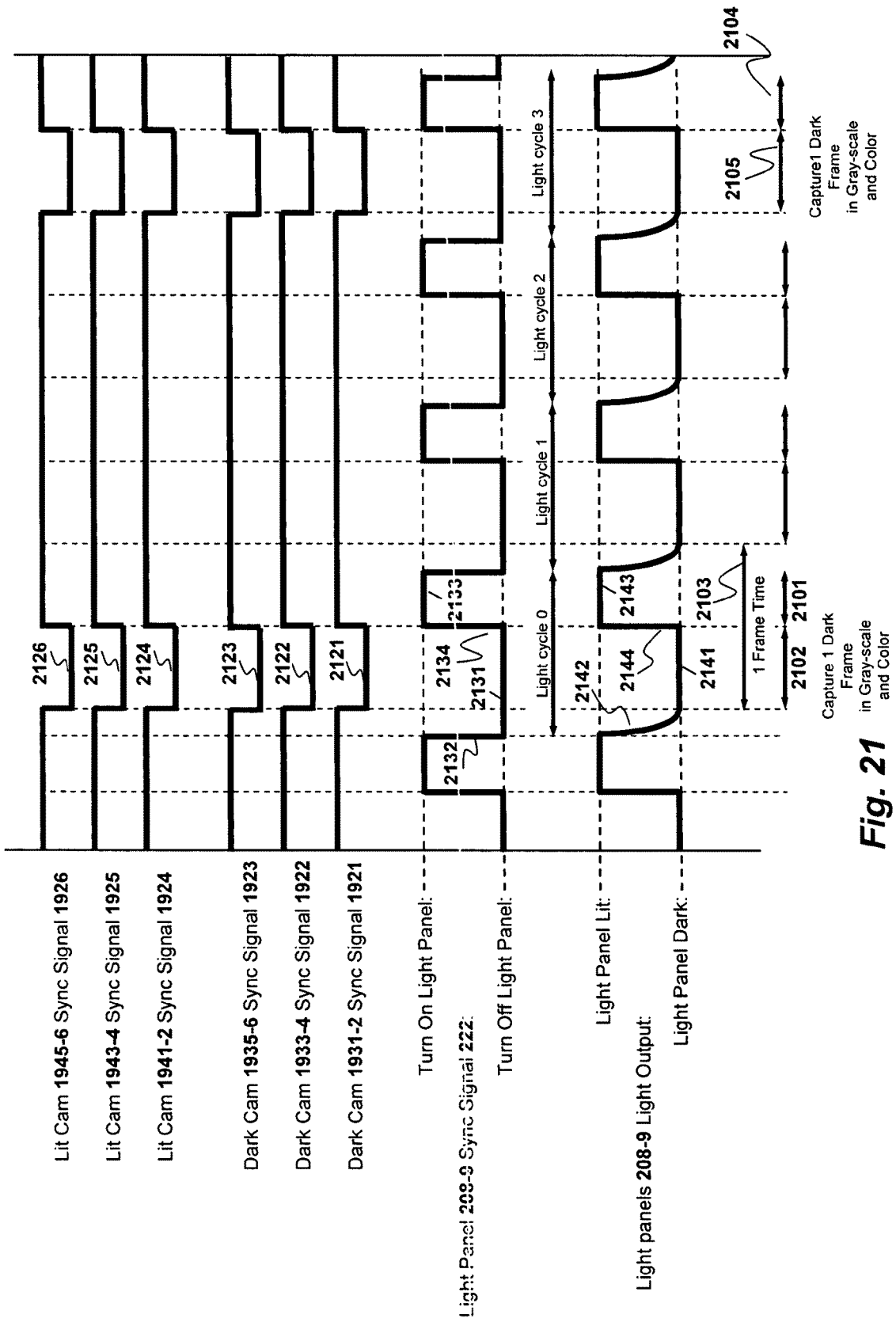
FIG. 21 is a timing diagram illustrating the synchronization between the light panels and the shutters according to one embodiment of the invention.

FIG. 21 illustrates in another embodiment how the sync signals 1921-6 can be adjusted so that all of the cameras 1931-1936 and 1941-1946 open their shutters simultaneously. Sync signals 1921-1926 all transition to low states 2121-2126 during dark time interval 2102. Although the light panels 208-209 would be flashed 90 flashes a second, the cameras would be capturing frames synchronously to each other at 30 fps. (Note that in this case, the lit cameras 1941-1946 which, in the presently preferred embodiment are color cameras, also would be capturing frames during the dark interval 2102 simultaneously with the dark cameras 1931-1936.) Typically, this synchronized mode of operation would be done when a calibration object (e.g. an array of phosphorescent spheres) was placed within the field of view of some or all of the cameras, and potentially moved through successive frames, usually before or after a motion capture of a performer. In this way, the relative position of the cameras could determined while the cameras are running synchronously at 30 fps, as shown in FIG. 21. Then, the camera timing would be switched to the "cascading" timing shown in FIG. 20 to capture a performance at 90 fps. When the 90 fps frames are reconstructed by data processing system 210, then camera position information, determined previously (or subsequently) to the 90 fps capture with the synchronous mode time shown in FIG. 21, will be used to both calculate the 3D surface 207 and map the captured lit frame textures onto the 3D surface to create textured 3D surface 217

When a scene is shot conventionally using prior art methods and cameras are capturing only 2D images of that scene, the "cascading" technique to use multiple slower frame rate cameras to achieve a higher aggregate frame rate as illustrated in FIGS. 19 and 20 will not produce high-quality results. The reason for this is each camera in a "cascade" (e.g. cameras 1931, 1933 and 1935) will be viewing the scene from a different point of view. If the captured 30 fps frames of each camera are interleaved together to create a 90 fps sequence of successive frames in time, then when the 90 fps sequence is viewed, it will appear to jitter, as if the camera was rapidly jumping amongst multiple positions. But when slower frame rate cameras are "cascaded" to achieve a higher aggregate frame rate as illustrate in FIGS. 19 and 20 for the purpose capturing the 3D surfaces of objects in a scene, as described herein and in combination with the methods described in the co-pending applications, the resulting 90 fps interleaved 3D surfaces 207 and textured 3D surfaces 217 do not exhibit jitter at all, but rather look completely stable. The reason is the particular position of the cameras 1931-1936 and 1941-1946 does not matter in the reconstruction 3D surfaces, just so long as the at least a pair of dark cameras 1931-1936 during each dark frame interval 2002 has a non-oblique view (e.g. <30 degrees) of the surface area (with phosphorescent makeup, paint or dye) to be reconstructed. This provides a significant advantage over conventional prior art 2D motion image capture (i.e. commonly known as video capture), because typically the highest resolution sensors commercially available at a given time have a lower frame rate than commercially available lower resolution sensors. So, 2D motion image capture at high resolutions is limited to the frame rate of a single high resolution sensor. A 3D motion surface capture at high resolution, under the principles described herein, is able to achieve n times the frames rate of a single high resolution sensor, where n is the number of camera groups "cascaded" together, per the methods illustrated in FIGS. 19 and 20.

Color Mapping of Phosphor Brightness

Ideally, the full dynamic range, but not more, of dark cameras 204-205 should be utilized to achieve the highest quality pattern capture. For example, if a pattern is captured that is too dark, noise patterns in the sensors in cameras 204-205 may become as prominent as captured patterns, resulting in incorrect 3D reconstruction. If a pattern is too bright, some areas of the pattern may exceed the dynamic range of the sensor, and all pixels in such areas will be recorded at the maximum brightness level (e.g. 255 in an 8-bit sensor), rather than at the variety or brightness levels that actually make up that area of the pattern. This also will result in incorrect 3D reconstruction. So, prior to capturing a pattern, per the techniques described herein, it is advantageous to try to make sure the brightness of the pattern throughout is not too dark, nor too bright (e.g. not reaching the maximum brightness level of the camera sensor).

Figure 22:
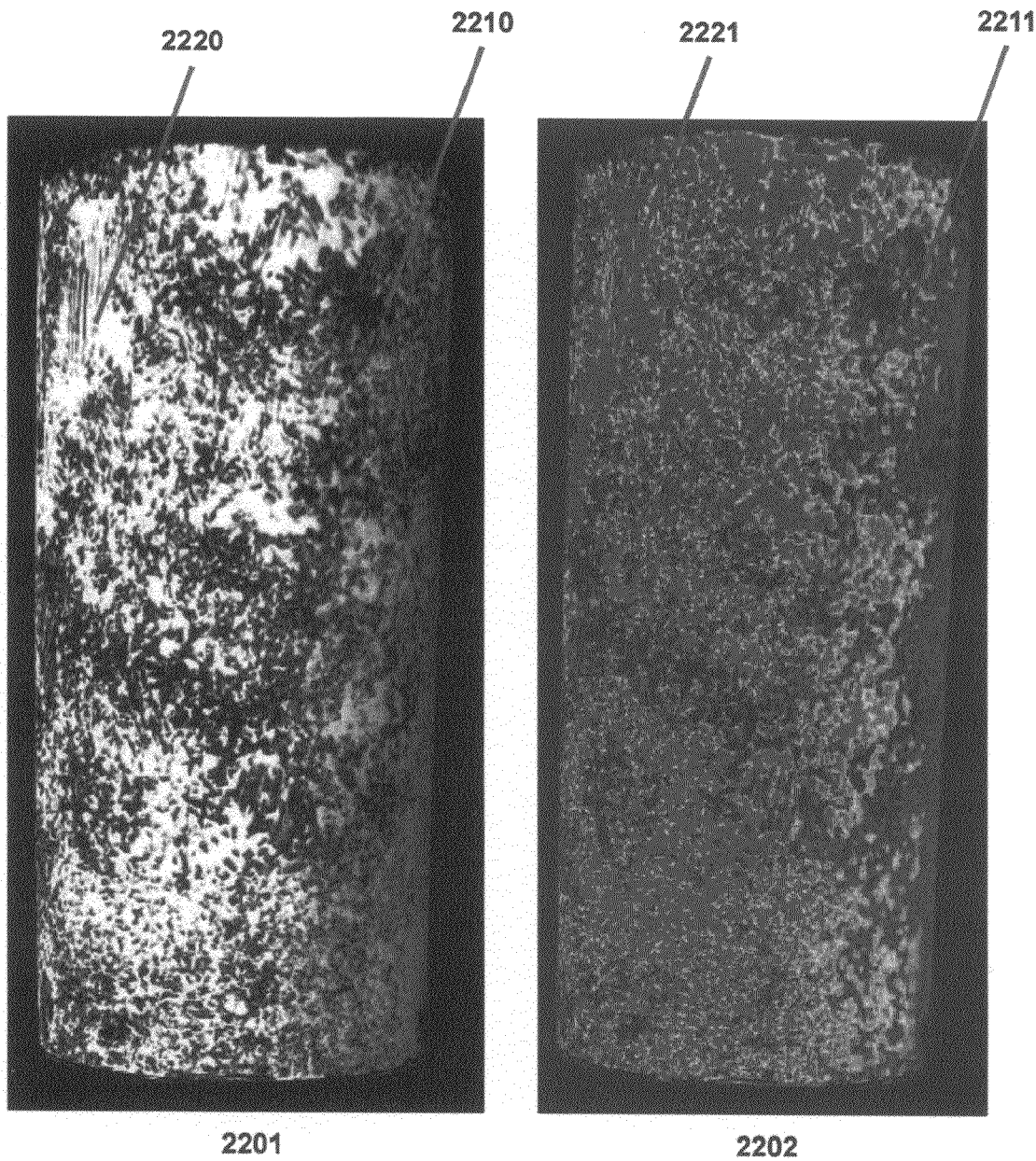
FIG. 22 illustrates one embodiment of the invention where color is used to indicate phosphor brightness.

When phosphorescent makeup is applied to a performer, or when phosphorescent makeup, paint or dye is applied to an object, it is difficult for the human eye to evaluate whether the phosphor application results in a pattern captured by the dark cameras 204-205 that is bright enough in all locations or too bright in some locations. FIG. 22 image 2201 shows a cylinder covered in a random pattern of phosphor. It is difficult, when viewing this image on a computer display (e.g. an LCD monitor) to determine precisely if there are parts of the pattern that are too bright (e.g. location 2220) or too dark (e.g. location 2210). There are many reasons for this. Computer monitors often do not have the same dynamic range as a sensor (e.g. a computer monitor may only display 128 unique gray levels, while the sensor captures 256 gray levels). The brightness and/or contrast may not be set correctly on the monitor. Also, the human eye may have trouble determining what constitutes a maximum brightness level because the brain may adapt to the brightness it sees, and consider whatever is the brightest area on the screen to be the maximum brightness. For all of these reasons, it is helpful to have an objective measure of brightness that humans can readily evaluate when applying phosphorescent makeup, paint or dye. Also, it is helpful to have an objective measure brightness as the lens aperture and/or gain is adjusted on dark cameras 204-205 and/or the brightness of the light panels 208-209 is adjusted.

Image 2202 shows such an objective measure. It shows the same cylinder as image 2201, but instead of showing the brightness of each pixel of the image as a grayscale level (in this example, from 0 to 255), it shows it as a color. Each color represents a range of brightness. For example, in image 2202 blue represents brightness ranges 0-32, orange represents brightness ranges 192-223 and dark red represents brightness ranges 224-255. Other colors represent other brightness ranges. Area 2211, which is blue, is now clearly identifiable as an area that is very dark, and area 2221, which is dark red, is now clearly identifiable as an area that is very bright. These determinations can be readily made by the human eye, even if the dynamic range of the display monitor is less than that of the sensor, or if the display monitor is incorrectly adjusted, or if the brain of the observer adapts to the brightness of the display. With this information the human observer can change the application of phosphorescent makeup, dye or paint. The human observer can also adjust the aperture and/or the gain setting on the cameras 204-205 and/or the brightness of the light panels 208-209.

In one embodiment image 2202 is created by application software running on one camera controller computer 225 and is displayed on a color LCD monitor attached to the camera controller computer 225. The camera controller computer 225 captures a frame from a dark camera 204 and places the pixel values of the captured frame in an array in its RAM. For example, if the dark cameras 204 is a 640×480 grayscale camera with 8 bits/pixel, then the array would be a 640×480 array of 8-bit bytes in RAM. Then, the application takes each pixel value in the array and uses it as an index into a lookup table of colors, with as many entries as the number of possible pixel values. With 8 bits/pixel, the lookup table has 256 entries. Each of the entries in the lookup table is pre-loaded (by the user or the developer of the application) with the desired Red, Green, Blue (RGB) color value to be displayed for the given brightness level. Each brightness level may be given a unique color, or a range of brightness levels can share a unique color. For example, for image 2202, lookup table entries 0-31 are all loaded with the RGB value for blue, entries 192-223 are loaded with the RGB value for orange and entries 224-255 are loaded with the RGB value for dark red. Other entries are loaded with different RGB color values. The application uses each pixel value from the array (e.g. 640× 480 of 8-bit grayscale values) of the captured frame as an index into this color lookup take, and forms a new array (e.g. 640×480 of 24-bit RGB values) of the looked-up colors. This new array of look-up colors is then displayed, producing a color image such as 1102.

If a color camera (either lit camera 214 or dark camera 204) is used to capture the image to generate an image such as 2202, then one step is first performed after the image is captured find before it is processed as described in the preceding paragraph. The captured RGB output of the camera is stored in an array in camera controller computer 225 RAM (e.g. 640×480 with 24 bits/pixel). The application running on camera controller computer 225 then calculates the average brightness of each pixel by averaging the Red, Green and Blue values of each pixel (i.e. Average=(R+G+B)/3), and places those averages in a new array (e.g. 640×480 with 8 bits/pixel). This array of Average pixel brightnesses (the "Average array") will soon be processed as if it were the pixel output of a grayscale camera, as described in the prior paragraph, to produce a color image such as 2202. But, first there is one more step: the application examines each pixel in the captured RGB array to see if any color channel of the pixel (i.e. R, G, or B) is at a maximum brightness value (e.g. 255). If any channel is, then the application sets the value in the Average array for that pixel to the maximum brightness value (e.g. 255). The reason for this is that it is possible for one color channel of a pixel to be driven beyond maximum brightness (but only output a maximum brightness value), while the other color channels are driven by relatively dim brightness. This may result in an average calculated brightness for that pixel that is a middle-range level (and would not be considered to be a problem for good-quality pattern capture). But, if any of the color channels has been overdriven in a given pixel, then that will result in an incorrect pattern capture. So, by setting the pixel value in the Average array to maximum brightness, this produces a color images 2202 where that pixel is shown to be at the highest brightness, which would alert a human observer of image 1102 of the potential of a problem for a high-quality pattern capture.

It should be noted that the underlying principles of the invention are not limited to the specific color ranges and color choices illustrated in FIG. 22. Also, other methodologies can be used to determine the colors in 2202, instead of using only a single color lookup table. For example, in one embodiment the pixel brightness (or average brightness) values of a captured image is used to specify the hue of the color displayed. In another embodiment, a fixed number of lower bits (e.g. 4) of the pixel brightness (or average brightness) values of a captured image are set to zeros, and then the resulting numbers are used to specify the hue for each pixel. This has the effect of assigning each single hue to a range of brightnesses.

Surface Reconstruction from Multiple Range Data Sets

Correlating lines or random patterns captured by one camera with images from other cameras as described above provides range information for each camera. In one embodiment of the invention, range information from multiple cameras is combined in three steps: (1) treat the 3d capture volume as a scalar field; (2) use a "Marching Cubes" (or a related "Marching Tetrahedrons") algorithm to find the isosurface of the scalar field and create a polygon mesh representing the surface of the subject; and (3) remove false surfaces and simplify the mesh. Details associated with each of these steps is provided below.

The scalar value of each point in the capture volume (also called a voxel) is the weighted sum of the scalar values from each camera. The scalar value for a single camera for points near the reconstructed surface is the best estimate of the distance of that point to the surface. The distance is positive for points inside the object and negative for points outside the object. However, points far from the surface are given a small negative value even if they are inside the object.

Figure 23:
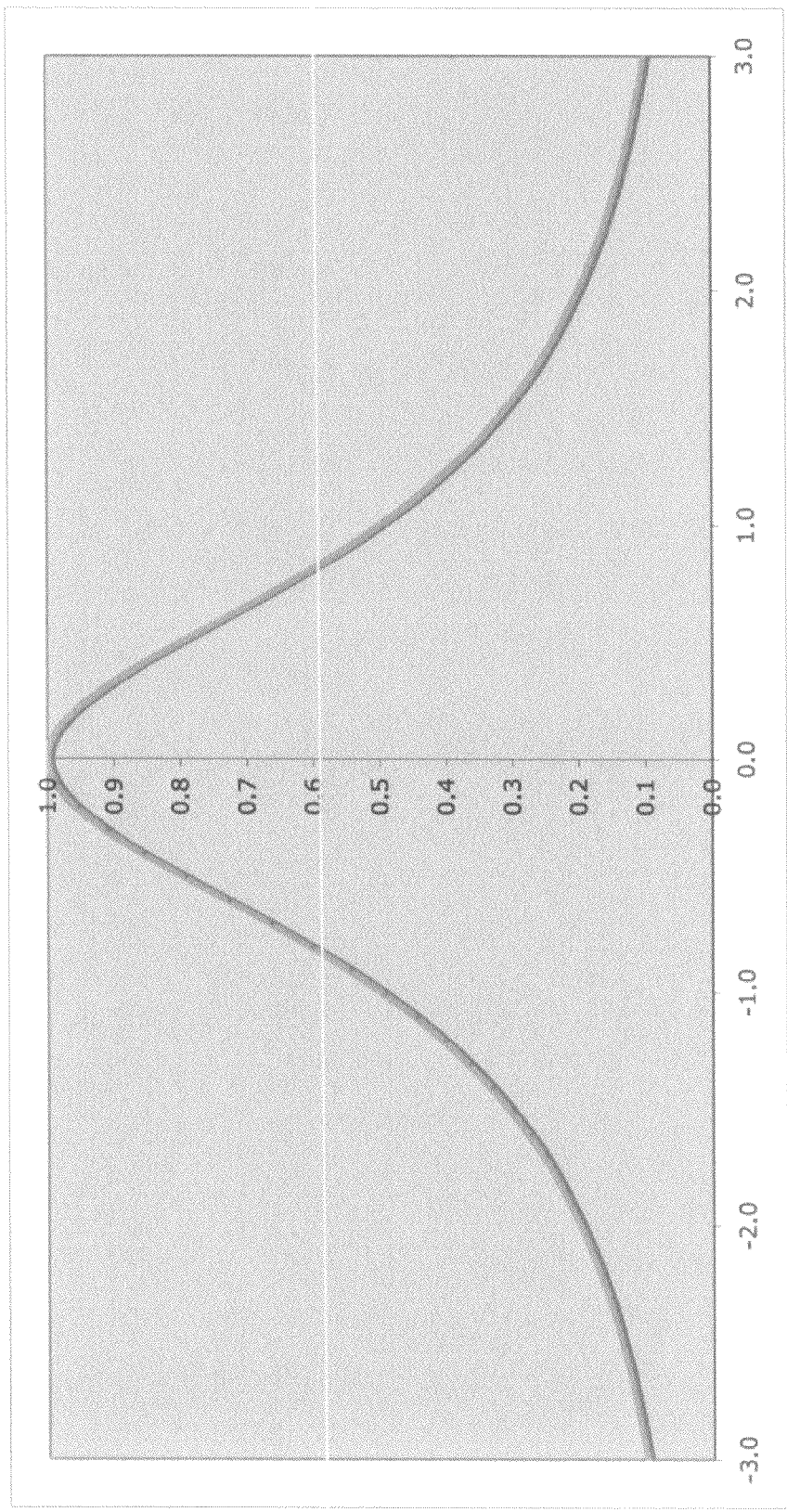
FIG. 23 illustrates weighting as a function of distance from surface.

The weight used for each camera has two components. Cameras that lie in the general direction of the normal to the surface are given a weight of 1. Cameras that lie 90 degrees to the normal are given a weight of 0. A function is used of the form: $n_i = \cos^2 a_i$, where $n_i$ is the normal weighting function, and $a_i$ is the angle between the camera's direction and the surface normal. This is illustrated graphically in FIG. 23.

Figure 24:
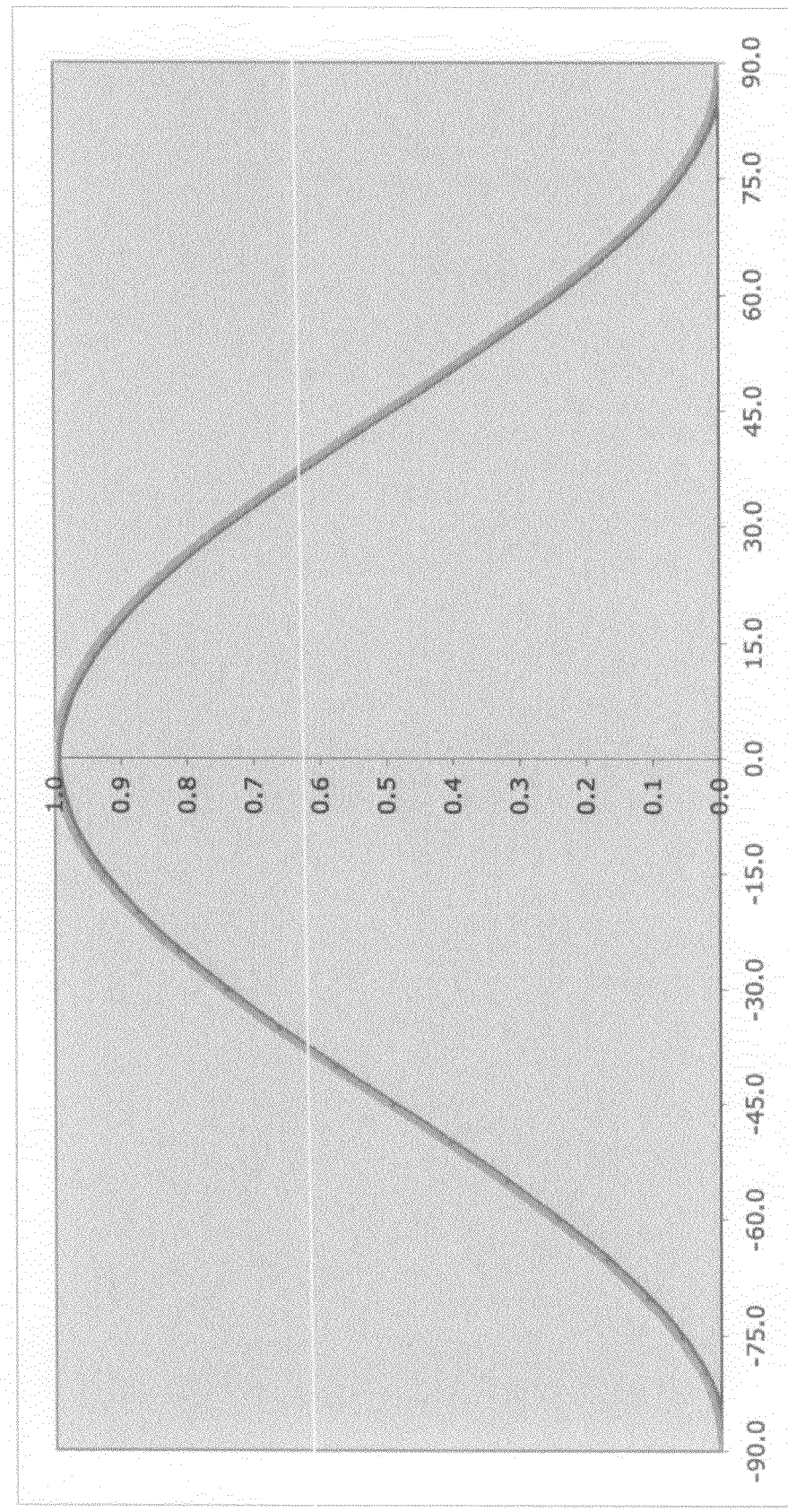
FIG. 24 illustrates weighting as a function of surface normal.
Figure 25:
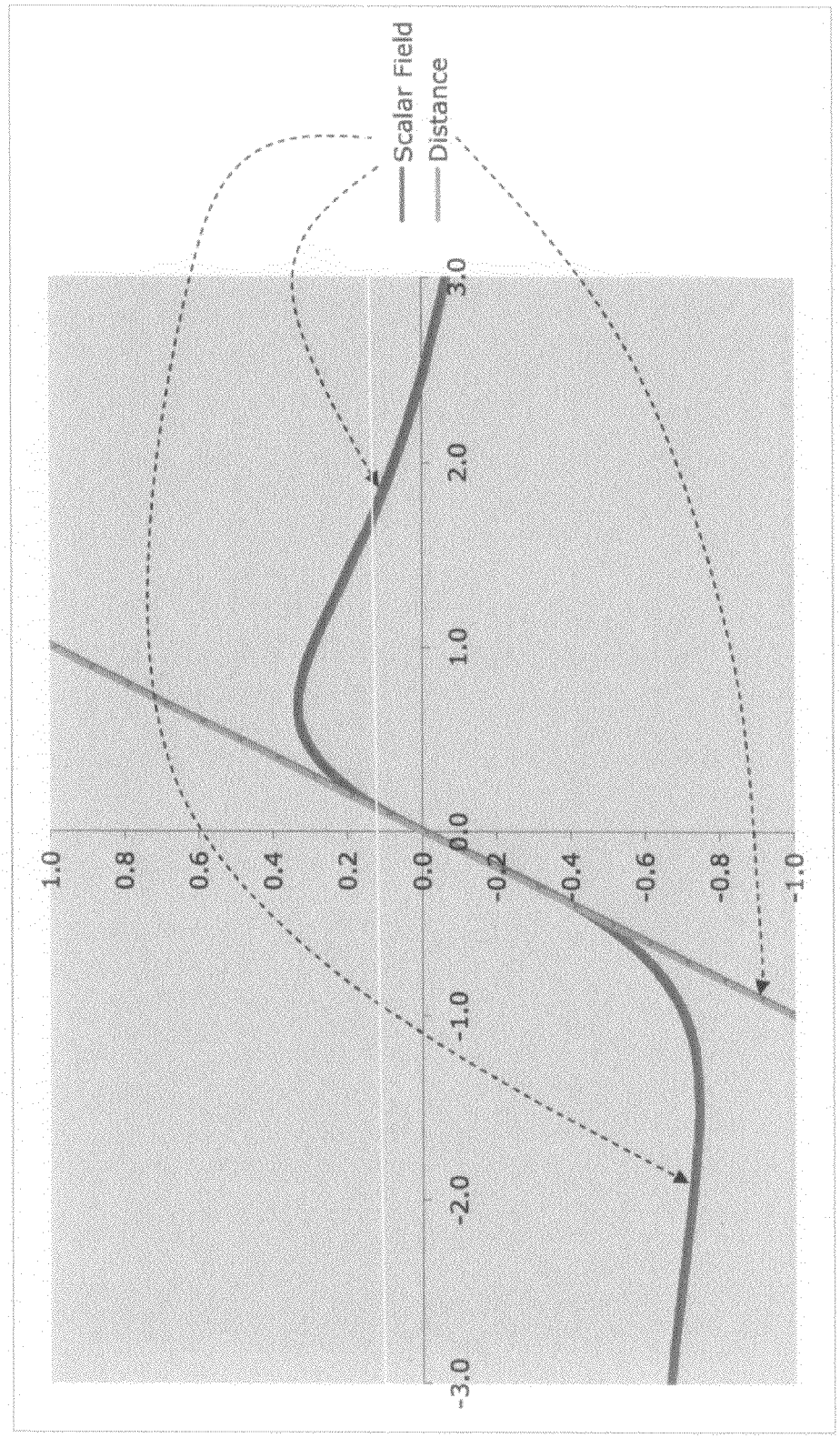
FIG. 25 illustrates scalar field as a function of distance from surface

The second weighting component is a function of the distance. The farther the volume point is from the surface the less confidence there is in the accuracy of the distance estimate. This weight decreases significantly faster than the distance increases. A function is used of the form: $w_i = 1/(d_i^2 + 1)$, where $w_i$ is the weight and $d_i$ is the distance. This is illustrated graphically in FIG. 24. This weight is also used to differentiate between volume points that are "near to" and "far from" the surface. The value of the scalar field for camera i, is a function of the form: $s_i = (d_i * w_i - k * (1 - w_i)) * n_i$, where $d_i$ is the distance from the volume point to the surface, $w_i$ is the distance weighting function, k is the scalar value for points "far away", and $n_i$ is the normal weighting function. This is illustrated graphically in FIG. 25. The value of the scalar field is the weighted sum of the scalar fields for all cameras: s=sum $(s_i*w)$. See, e.g., A Volumetric Method for Building Complex Models from Range Images Brian Curless and Marc Levoy, Stanford University, http://graphics.stanford.edu/papers/volrange/paper1level/paper.html, which is incorporated herein by reference.

It should be noted that other known functions with similar characteristics to the functions described above may also be employed. For example, rather than a cosine-squared function as described above, a cosine squared function with a threshold may be employed. In fact, virtually any other function which produces a graph shaped similarly to those illustrated in FIGS. 23-25 may be used (e.g., a graph which falls towards zero at a high angle).

In one embodiment of the invention, the "Marching Cubes" algorithm and its variant "Marching Tetrahedrons" finds the zero crossings of a scalar field and generates a surface mesh. See, e.g., Lorensen, W. E. and Cline, H. E., Marching Cubes: a high resolution 3D surface reconstruction algorithm, Computer Graphics, Vol. 21, No. 4, pp 163-169 (Proc. of SIGGRAPH), 1987, which is incorporated herein by reference. A volume is divided up into cubes. The scalar field is known or calculated as above for each corner of a cube. When some of the corners have positive values and some have negative values it is known that the surface passes through the cube. The standard algorithm interpolates where the surface crosses each edge. One embodiment of the invention improves on this by using an improved binary search to find the crossing to a high degree of accuracy. In so doing, the scalar field is calculated for additional points. The computational load occurs only along the surface and greatly improves the quality of the resulting mesh. Polygons are added to the surface according to tables. The "Marching Tetrahedrons" variation divides each cube into six tetrahedrons. The tables for tetrahedrons are much smaller and easier to implement than the tables for cubes. In addition, Marching Cubes has an ambiguous case not present in Marching Tetrahedrons.

The resulting mesh often has a number of undesirable characteristics. Often there is a ghost surface behind this desired surface. There are often false surfaces forming a halo around the true surface. And finally the vertices in the mesh are not uniformly spaced. The ghost surface and most of the false surfaces can be identified and hence removed with two similar techniques. Each vertex in the reconstructed surface is checked against the range information from each camera. If the vertex is close to the range value for a sufficient number of cameras (e.g., 1-4 cameras) confidence is high that this vertex is good. Vertices that fail this check are removed. Range information generally doesn't exist for every point in the field of view of the camera. Either that point isn't on the surface or that part of the surface isn't painted. If a vertex falls in this "no data" region for too many cameras (e.g., 1-4 cameras), confidence is low that it should be part of the reconstructed surface. Vertices that fail this second test are also removed. This test makes assumptions about, and hence restrictions on, the general shape of the object to be reconstructed. It works well in practice for reconstructing faces, although the underlying principles of the invention are not limited to any particular type of surface. Finally, the spacing of the vertices is made more uniform by repeatedly merging the closest pair of vertices connected by an edge in the mesh. The merging process is stopped when the closest pair is separated by more than some threshold value. Currently, 0.5 times the grid spacing is known to provide good results.

Figure 26:
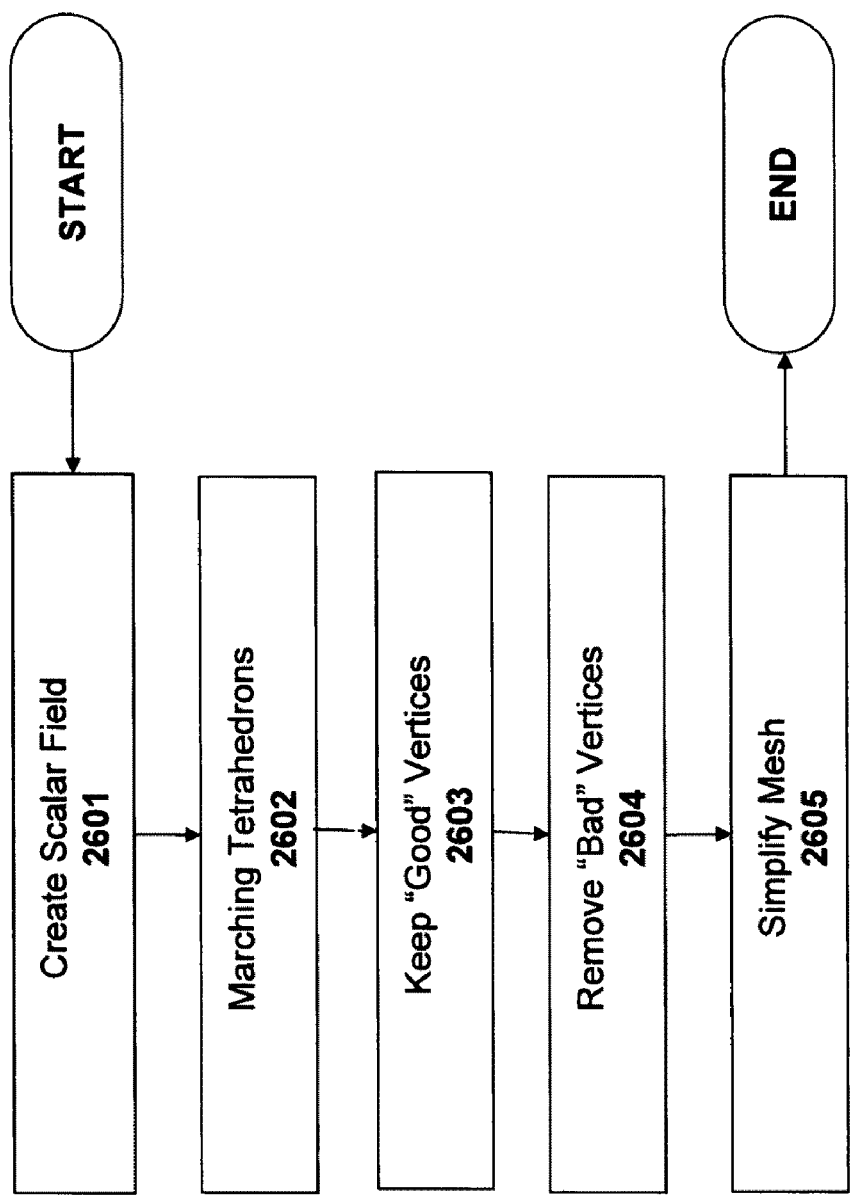
FIG. 26 illustrates one embodiment of a process for constructing a 3-D surface from multiple range data sets.

FIG. 26 is a flowchart which provides an overview of foregoing process. At 2601, the scalar field is created/calculated. At 2602, the marching tetrahedrons algorithm and/or marching cubes algorithm are used to determine the zero crossings of the scalar field and generate a surface mesh. At 2603, "good" vertices are identified based on the relative positioning of the vertices to the range values for a specified number of cameras. The good vertices are retained. At 2604, "bad" vertices are removed based on the relative positioning of the vertices to the range values for the cameras and/or a determination as to whether the vertices fall into the "no data" region of a specified number of cameras (as described above). Finally, at 2605, the mesh is simplified (e.g., the spacing of the vertices is made more uniform as described above) and the process ends.

Vertex Tracking Embodiments

"Vertex tracking" as used herein is the process of tracking the motion of selected points in a captured surfaces over time. In general, one embodiment utilizes two strategies to tracking vertices. The Frame-to-Frame method tracks the points by comparing images taken a very short time apart. The Reference-to-Frame method tracks points by comparing an image to a reference image that could have been captured at a very different time or possibly it was acquired by some other means. Both methods have strengths and weaknesses. Frame-to-Frame tracking does not give perfect results. Small tracking errors tend to accumulate over many frames. Points drift away from their nominal locations. In Reference-to-Frame, the subject in the target frame can be distorted from the reference. For example, the mouth in the reference image might be closed and in the target image it might be open. In some cases, it may not be possible to match up the patterns in the two images because it has been distorted beyond recognition.

Figure 27:
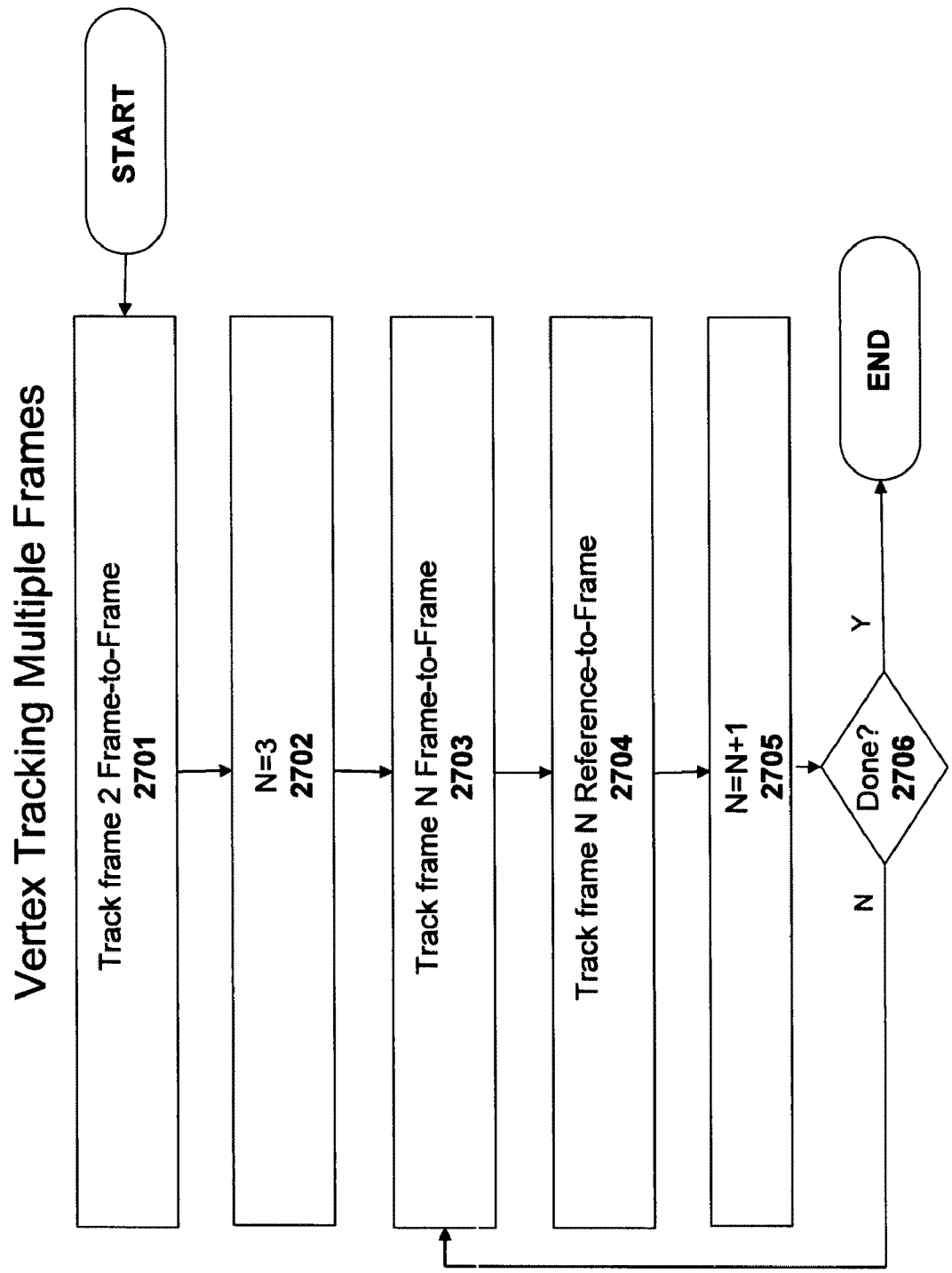
FIG. 27 illustrates one embodiment of a method for vertex tracking for multiple frames.

To address the foregoing limitations, in one embodiment of the invention, a combination of Reference-to-Frame and Frame to Frame techniques are used. A flowchart describing this embodiment is illustrated in FIG. 27. At 2701, Frame-to-Frame tracking is used to find the points within the first and second frames. At 2703, process variable N is set to 3 (i.e., representing frame 3). Then, at 2704, Reference-to-Frame tracking is used to counter the potential drift between the frames. At 2705, the value of N is increased (i.e., representing the Nth frame) and, if another frame exists, determined at 2706, the process returns to 2703 where Frame-to-Frame tracking is employed followed by Reference-to-Frame tracking at 2704.

In one embodiment, for both Reference-to-Frame and Frame-to-Frame tracking, the camera closest to the normal of the surface is chosen. Correlation is used to find the new x,y locations of the points. See, e.g., APPARATUS AND METHOD FOR PERFORMING MOTION CAPTURE USING A RANDOM PATTERN ON CAPTURE SURFACES," Ser. No. 11/255,854, Filed Oct. 20, 2005, for a description of correlation techniques that may be employed. The z value is extracted from the reconstructed surface. The correlation technique has a number of parameters that can be adjusted to find as many points as possible. For example, the Frame-to-Frame method might search for the points over a relatively large area and use a large window function for matching points. The Reference-to-Frame method might search a smaller area with a smaller window. However, it is often the case that there is no discernible peak or that there are multiple peaks for a particular set of parameters. The point cannot be tracked with sufficient confidence using these parameters. For this reason, in one embodiment of the invention, multiple correlation passes are performed with different sets of parameters. In passes after the first, the search area can be shrunk by using a least squares estimate of the position of a point based on the positions of nearby points that were successfully tracked in previous passes. Care must be taken when selecting the nearby points. For example, points on the upper lip can be physically close to points on the lower lip in one frame but in later frames they can be separated by a substantial distance. Points on the upper lip are not good predictors of the locations of points on the lower lip. Instead of the spatial distance between points the geodesic distance between points when travel is restricted to be along edges of the mesh is a better basis for the weighting function of the least squares fitting. In the example, the path from the upper lip to the lower lip would go around the corners of the mouth—a much longer distance and hence a greatly reduced influence on the locations of points on the opposite lip.

Figure 28:
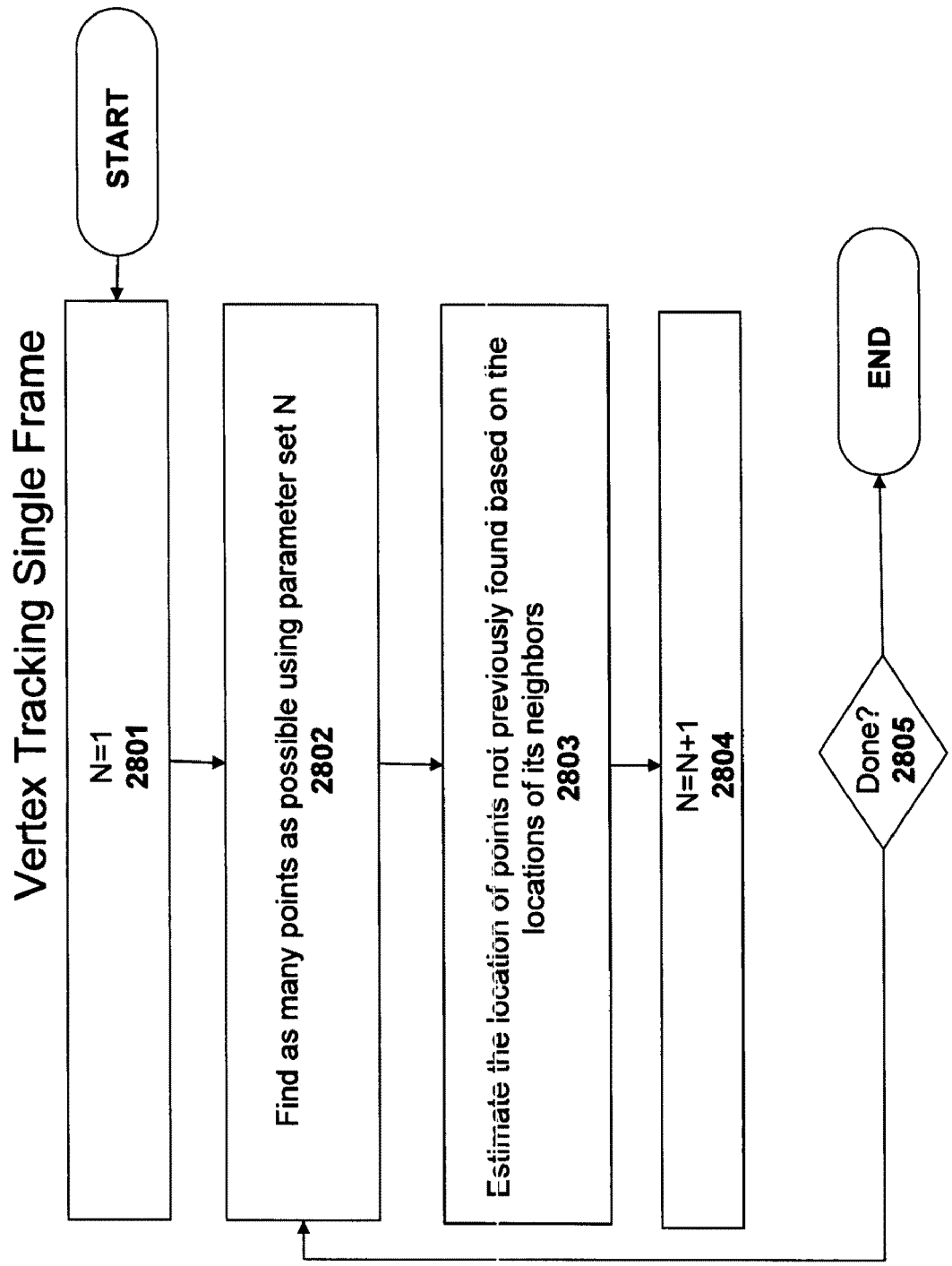
FIG. 28 illustrates one embodiment of a method for vertex tracking of a single frame.

FIG. 28 provides an overview of the foregoing operations. In 2801, the first set of parameters is chosen. In 2802, an attempt is made to track vertices given a set of parameters. Success is determined using the criteria described above. In 2802, the locations of the vertices that were not successfully tracked are estimated from the positions of neighboring vertices that were successfully tracked. In 2804 and 2805, the set of parameters is updated or the program is terminated. Thus, multiple correlation passes are performed using different sets of parameters.

At times the reconstruction of a surface is imperfect. It can have holes or extraneous bumps. The location of every point is checked by estimating its position from its neighbor's positions. If the tracked location is too different it is suspected that something has gone wrong with either the tracking or with the surface reconstruction. In either case the point is corrected to a best estimate location.

Retrospective Tracking Marker Selection

Many prior art motion capture systems (e.g. the Vicon MX40 motion capture system) utilize markers of one form or another that are attached to the objects whose motion is to be captured. For example, for capturing facial motion one prior art technique is to glue retroreflective markers to the face. Another prior art technique to capture facial motion is to paint dots or lines on the face. Since these markers remain in a fixed position relative to the locations where they are attached to the face, they track the motion of that part of the face as it moves.

Typically, in a production motion capture environment, locations on the face are chosen by the production team where they believe they will need to track the facial motion when they use the captured motion data in the future to drive an animation (e.g. they may place a marker on the eyelid to track the motion of blinking). The problem with this approach is that it often is not possible to determine the ideal location for the markers until after the animation production is in process, which may be months or even years after the motion capture session where the markers were captured. At such time, if the production team determines that one or more markers is in a sub-optimal location (e.g. located at a location on the face where there is a wrinkle that distorts the motion), it is often impractical to set up another motion capture session with the same performer and re-capture the data.

In one embodiment of the invention users specify the points on the capture surfaces that they wish to track after the motion capture data has been captured (i.e. retrospectively relative to the motion capture session, rather than prospectively). Typically, the number of points specified by a user to be tracked for production animation will be far fewer points than the number of vertices of the polygons captured in each frame using the surface capture system of the present embodiment. For example, while over 100,000 vertices may be captured in each frame for a face, typically 1000 tracked vertices or less is sufficient for most production animation applications.

For this example, a user may choose a reference frame, and then select 1000 vertices out of the more than 100,000 vertices on the surface to be tracked. Then, utilizing the vertex tracking techniques described previously and illustrated in FIGS. 27 and 28, those 1000 vertices are tracked from frame-to-frame. Then, these 1000 tracked points are used by an animation production team for whatever animation they choose to do. If, at some point during this animation production process, the animation production team determines that they would prefer to have one or more tracked vertices moved to different locations on the face, or to have one or more tracked vertices added or deleted, they can specify the changes, and then using the same vertex tracking techniques, these new vertices will be tracked. In fact, the vertices to be tracked can be changed as many times as is needed. The ability to retrospectively change tracking markers (e.g. vertices) is an enormous improvement over prior approaches where all tracked points must be specified prospectively prior to a motion capture session and can not be changed thereafter.

Embodiments of the invention may include various steps as set forth above. The steps may be embodied in machine-executable instructions which cause a general-purpose or special-purpose processor to perform certain steps. Various elements which are not relevant to the underlying principles of the invention such as computer memory, hard drive, input devices, have been left out of the figures to avoid obscuring the pertinent aspects of the invention.

Alternatively, in one embodiment, the various functional modules illustrated herein and the associated steps may be performed by specific hardware components that contain hardwired logic for performing the steps, such as an application-specific integrated circuit ("ASIC") or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system and method. It will be apparent, however, to one skilled in the art that the system and method may be practiced without some of these specific details. Accordingly, the scope and spirit of the present invention should be judged in terms of the claims which follow.

What is claimed is:

1. A computer-implemented system for performing motion capture of a subject comprising:
   a plurality of cameras for capturing a sequence of image frames of the subject over a period of time, each frame having a plurality of vertices defining a captured surface of the subject;
   a computing system for processing the sequence of image frames, the computing system having a memory for storing program code and a processor for processing the program code to perform the operations of:
   establishing a reference frame having one or more of the plurality of vertices and specifying a location for each of the vertices;
   performing frame-to-frame tracking to identify locations of vertices within an N'th frame based on locations of vertices within an (N−1)'th frame or an earlier frame;
   performing reference-to-frame tracking to identify locations of vertices within the N'th frame based on the locations of vertices in the reference frame to counter potential drift between the frames;
   storing the locations of vertices for use in subsequent reconstruction of the motion of the subject; and
   performing the frame-to-frame and reference-to-frame tracking again using a different set of parameters, the parameters defining a search area for the vertices of each frame
   wherein multiple correlation passes are performed with the different sets of parameters; and
   wherein for passes after the first, the search area is shrunk by using an estimate of the position of a vertex based on the position of nearby vertices that were successfully tracked in the previous passes.

2. The system as in claim 1 wherein
   a camera closest to a normal of the surface on which each vertex is located is selected to perform the frame-to-frame and reference-to-frame tracking.

3. The system as in claim 1 wherein the frame-to-frame tracking is performed using a relatively larger window for matching vertices and the reference-to-frame tracking is performed using a relatively smaller window for matching vertices.

4. The system as in claim 1 further comprising:
   estimating the location of vertices not found in each frame N based on known locations of neighboring vertices.

5. The system as in claim 1 wherein the computing system includes additional program code executed by the processor to perform the additional operations of: correlating lines or random patterns captured by one of the plurality of cameras with images from other of the plurality of cameras.

6. The system as in claim 5 further comprising:
   generating range information for each vertex based on the correlation.

7. The system as in claim 6 wherein range information from multiple cameras is combined by performing the operations of:
   treating a 3-dimensional (3D) capture volume of the subject as a scalar field;
   using a marching cubes or marching tetrahedrons process to locate an isosurface of the scalar field and create a polygon mesh representing the surface of the subject; and
   removing false surfaces.

8. The system as in claim 7 wherein a scalar value of each point in the 3D capture volume is computed based on a weighted sum of scalar values from each of the plurality of cameras.

9. The system as in claim 8 wherein a first weighting component is associated with each camera based on an angle at which the camera is pointed relative to the isosurface normal.

10. The system as in claim 9 wherein a second weighting component is a function of distance of the vertex from the isosurface.

11. The system as in claim 1 wherein the subject is a performer and wherein a random pattern of material is applied to regions of the performer's face to create the vertices to be tracked.

12. The system as in claim 11 wherein the material is phosphorescent paint.

13. The system as in claim 11 further comprising:
    a light source to be strobed on and off in response to control signals from the computer system, the light source charging the random pattern when on; and wherein shutters of the plurality of cameras are strobed synchronously with the strobing of the light source to capture sequences of images of the random pattern ("glow frames") as the performer moves or changes facial expressions during a performance, wherein the shutters of the plurality of cameras are open when the light source is off and the shutters are closed when the light source is on.

14. The system as in claim 13 further comprising:
    a second plurality of cameras having shutters strobed synchronously with the strobing of the light source to capture images of the performer ("lit frames"), wherein the shutters of the second plurality of cameras are open when the light source is on and the shutters of the second plurality of cameras are closed when the light source is off.

15. The system as in claim 14 wherein the first plurality of cameras are grayscale cameras and the second plurality of cameras are color cameras.

16. The system as in claim 13 wherein the light source comprises a light emitting diode (LED) array.

17. The system as in claim 13 wherein strobing the shutters comprises opening the shutters for a first period of time and closing the shutters for a second period of time, the second period of time being of a different duration than the first period of time.

18. The system as in claim 17 wherein the first period of time is longer than the second period of time.

19. The system as in claim 14 wherein the lit frames and glow frames are separated to generate two separate sets of image data.

20. The system as in claim 14 wherein cameras capturing the lit frames have a sensitivity which is different from cameras capturing the glow frames.

21. The system as in claim 13 wherein the shutters are opened for a first period of time when the light source is on and for a second period of time when the light source is off, wherein the first and second periods of time are unequal.

22. The system as in claim 11 wherein applying the random pattern comprises:
    applying phosphorescent material to a sponge; and
    applying the sponge upon the performer's face.

23. The system as in claim 11 wherein applying the random pattern comprises:
    spraying the random pattern on the performer's face with an airbrush.

24. The system as in claim 11 wherein applying the random pattern comprises:
    applying paint to the performer's face through a stencil.

25. The system as in claim 11 wherein the material is phosphorescent paint and wherein applying the random pattern comprises flicking a wire brush containing the phosphorescent paint such that droplets of phosphorescent paint are splattered onto the performer's face.

26. The system as in claim 1 wherein the estimate comprises a least squares estimate.

* * * * *